(12) United States Patent
Choi et al.

(10) Patent No.: US 12,296,256 B2
(45) Date of Patent: May 13, 2025

(54) USER INTERFACE WITH CONTEXTUAL MENU HOME BUTTONS

(71) Applicant: SAMSUNG ELECTRONICS CO., LTD., Suwon-si (KR)

(72) Inventors: Kilsoo Choi, Suwon-si (KR); Kwansik Yang, Suwon-si (KR); Sehyun Kim, Suwon-si (KR); Hyeeun Park, Suwon-si (KR); Jongin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/752,873

(22) Filed: Jun. 25, 2024

(65) Prior Publication Data

US 2024/0342592 A1    Oct. 17, 2024

Related U.S. Application Data

(63) Continuation of application No. 18/622,151, filed on Mar. 29, 2024, which is a continuation of application No. PCT/KR2022/014842, filed on Sep. 30, 2022.

(30) Foreign Application Priority Data

Sep. 30, 2021 (KR) .................. 10-2021-0130285

(51) Int. Cl.
*G06F 3/0482* (2013.01)
*A63F 13/32* (2014.01)
(Continued)

(52) U.S. Cl.
CPC ............ *A63F 13/32* (2014.09); *A63F 13/497* (2014.09); *H04N 21/4221* (2013.01);
(Continued)

(58) Field of Classification Search
CPC ........ A63F 13/22; A63F 13/235; A63F 13/48; A63F 13/493; A63F 13/49; A63F 13/77;
(Continued)

(56) References Cited

U.S. PATENT DOCUMENTS

| 7,577,978 B1 | 8/2009 | Wistendahl et al. |
| 8,840,478 B2 | 9/2014 | Nogami et al. |

(Continued)

FOREIGN PATENT DOCUMENTS

| CN | 107333075 | 11/2017 |
| EP | 3 254 737 A1 | 12/2017 |

(Continued)

OTHER PUBLICATIONS

U.S. Appl. No. 18/622,151, filed Mar. 29, 2024; Choi et al.
(Continued)

*Primary Examiner* — Lawrence S Galka
(74) *Attorney, Agent, or Firm* — Nixon & Vanderhye P.C.

(57) ABSTRACT

A display device according to an embodiment includes: a display, a communication interface comprising communication circuitry configured to communicate with at least one of a first control device including a first key and a second control device including the first key, and at least one processor, individually and/or collectively, configured to execute at least one instruction to cause the display device to: receive a first control signal corresponding to the first key, perform a first operation to output a first full screen by executing the first control signal based on the first control signal being received from the first control device while first content is being played, and perform a second operation different from the first operation to output a second full screen different from the first full screen based on the first control signal being received from the second control device while the first content is being played.

23 Claims, 37 Drawing Sheets

(51) Int. Cl.
*A63F 13/497* (2014.01)
*G06F 3/04842* (2022.01)
*G06F 3/0488* (2022.01)
*H04N 21/422* (2011.01)
*H04N 21/431* (2011.01)
*H04N 21/478* (2011.01)

(52) U.S. Cl.
CPC ... *H04N 21/42225* (2013.01); *H04N 21/4312* (2013.01); *H04N 21/4781* (2013.01)

(58) Field of Classification Search
CPC .......... A63F 2300/535; A63F 2300/636; A63F 2250/52; G06F 3/0482; G06F 3/04842; H04N 21/4221
See application file for complete search history.

(56) References Cited

U.S. PATENT DOCUMENTS

| | | | |
|---|---|---|---|
| 9,075,880 | B2 | 7/2015 | Tsuda et al. |
| 9,232,169 | B2 | 1/2016 | Ko et al. |
| 9,319,734 | B2 | 4/2016 | Hong et al. |
| 9,734,233 | B2 | 8/2017 | Chung |
| 9,844,722 | B2 | 12/2017 | Tsuchiya et al. |
| 10,212,471 | B2 | 2/2019 | Gao et al. |
| 10,212,481 | B2 | 2/2019 | Keene et al. |
| 10,545,633 | B2 | 1/2020 | Kim et al. |
| 11,474,487 | B2 | 10/2022 | Pouw et al. |
| 2004/0095316 | A1 | 5/2004 | Shibamiya et al. |
| 2006/0197873 | A1 | 9/2006 | Terada et al. |
| 2007/0300273 | A1 | 12/2007 | Turner |
| 2008/0186411 | A1 | 8/2008 | Kondo et al. |
| 2015/0128042 | A1* | 5/2015 | Churchill .............. G06F 3/0488 715/718 |
| 2018/0027281 | A1* | 1/2018 | Kim ...................... G06F 3/0482 715/745 |
| 2020/0346107 | A1 | 11/2020 | Urbanus et al. |

FOREIGN PATENT DOCUMENTS

| | | |
|---|---|---|
| JP | 2006246246 | 9/2006 |
| JP | 6063975 | 1/2017 |
| JP | 6100453 | 3/2017 |
| KR | 101135036 | 4/2012 |
| KR | 101218816 | 1/2013 |
| KR | 10-2014-0084446 | 7/2014 |
| KR | 10-2015-0004156 | 1/2015 |
| KR | 10-2015-0048660 | 5/2015 |
| KR | 10-2017-0106055 | 9/2017 |
| KR | 10-2018-0037314 | 4/2018 |
| KR | 102034590 | 10/2019 |
| WO | 2015/042827 | 4/2015 |

OTHER PUBLICATIONS

Office Action dated Dec. 18, 2022 in Korean Patent Application No. 10-2021-0130285 and English language translation.
Notice of Allowance issued Jun. 20, 2023 in Korean Patent Application No. 10-2021-0130285 and English language translation.
International Search Report and Written Opinion for PCT/KR2022/014842 mailed Jan. 2, 2023, 9 pages.
Extended European Search Report dated Nov. 21, 2024 for EP Application No. 22876982.4.
Anonymous Gamepad: "Gamepad - Wikipedia", Aug. 2, 2021 (2021-08-02), pp. 1-6, XP093222540, Retrieved from the Internet: URL:https://en.wikipedia.org/w/index.php?title=Gamepad&oldid=1036703040.

* cited by examiner

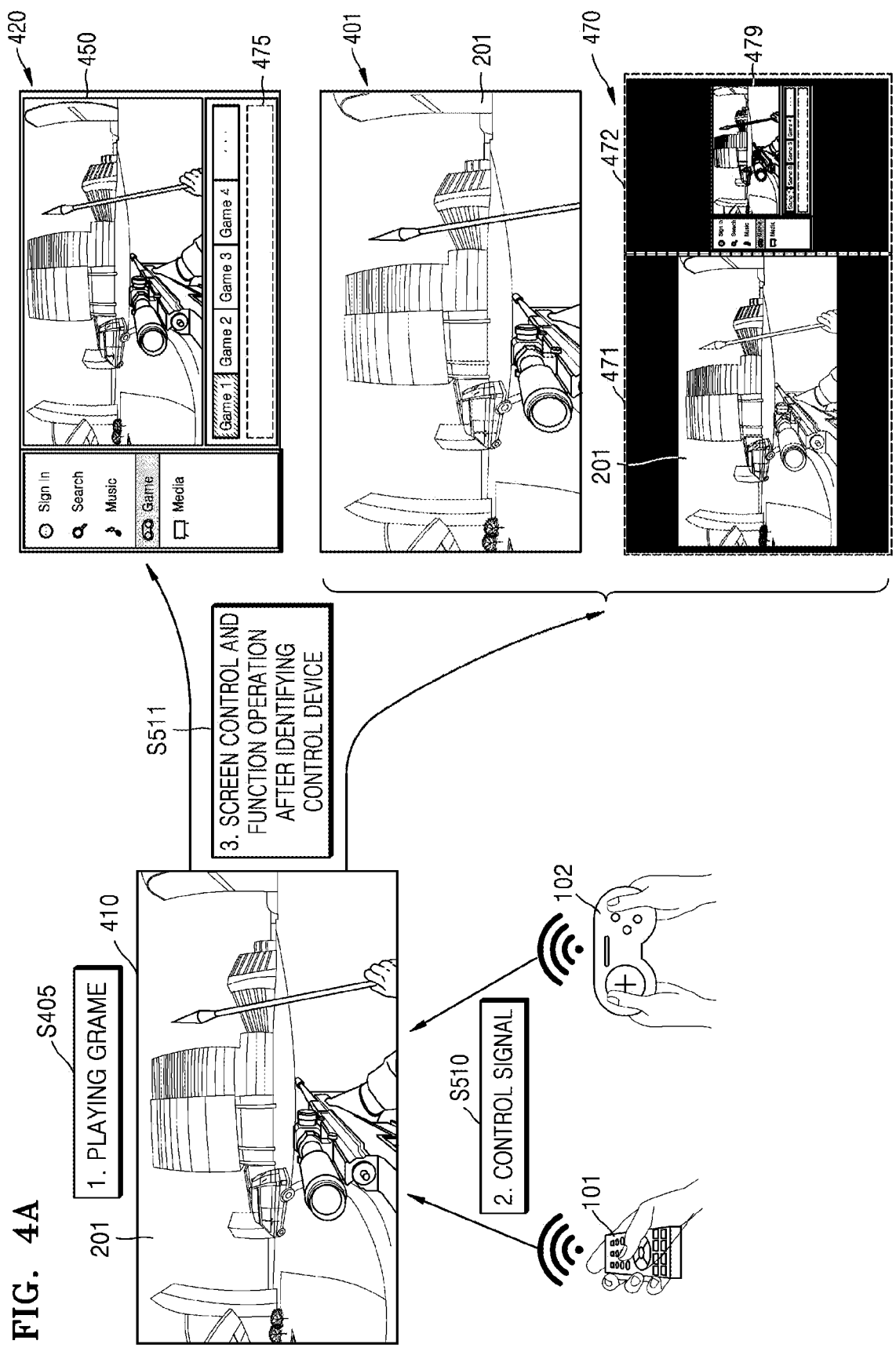

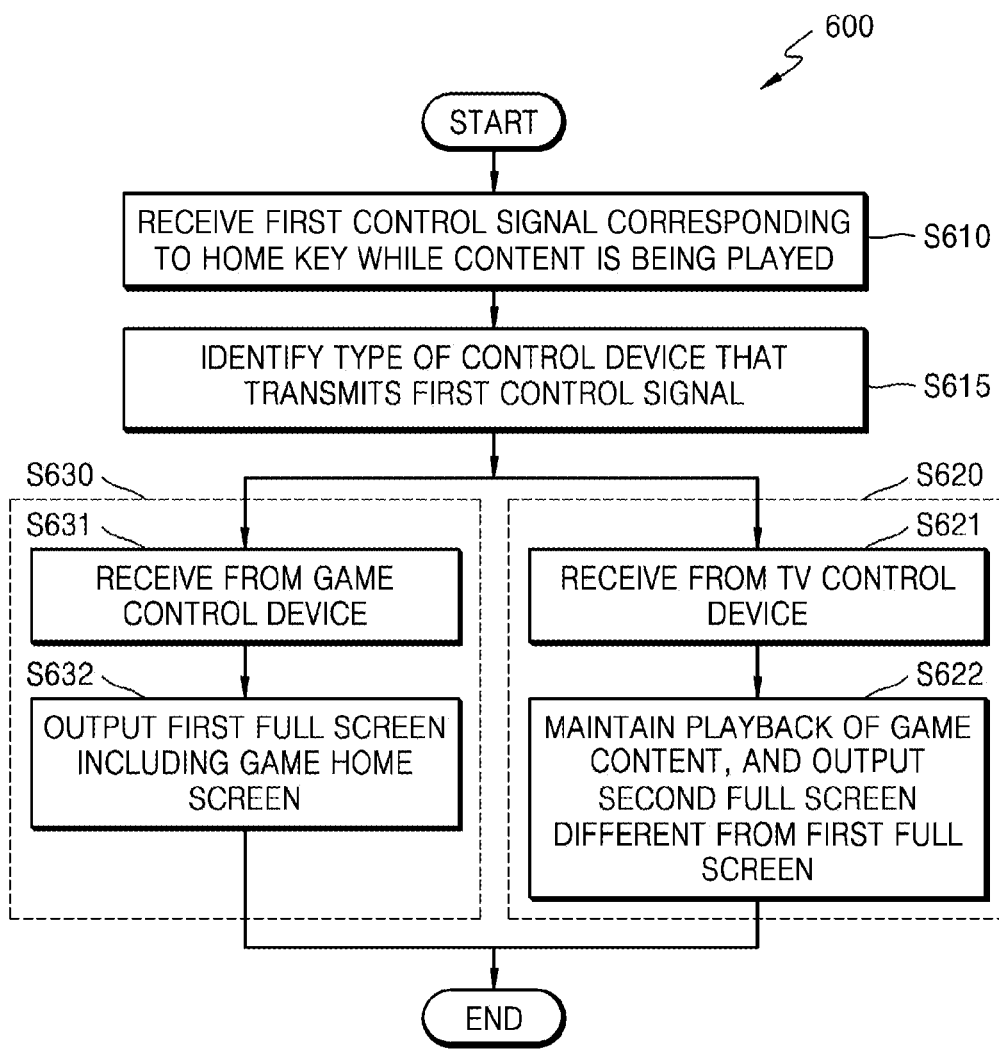

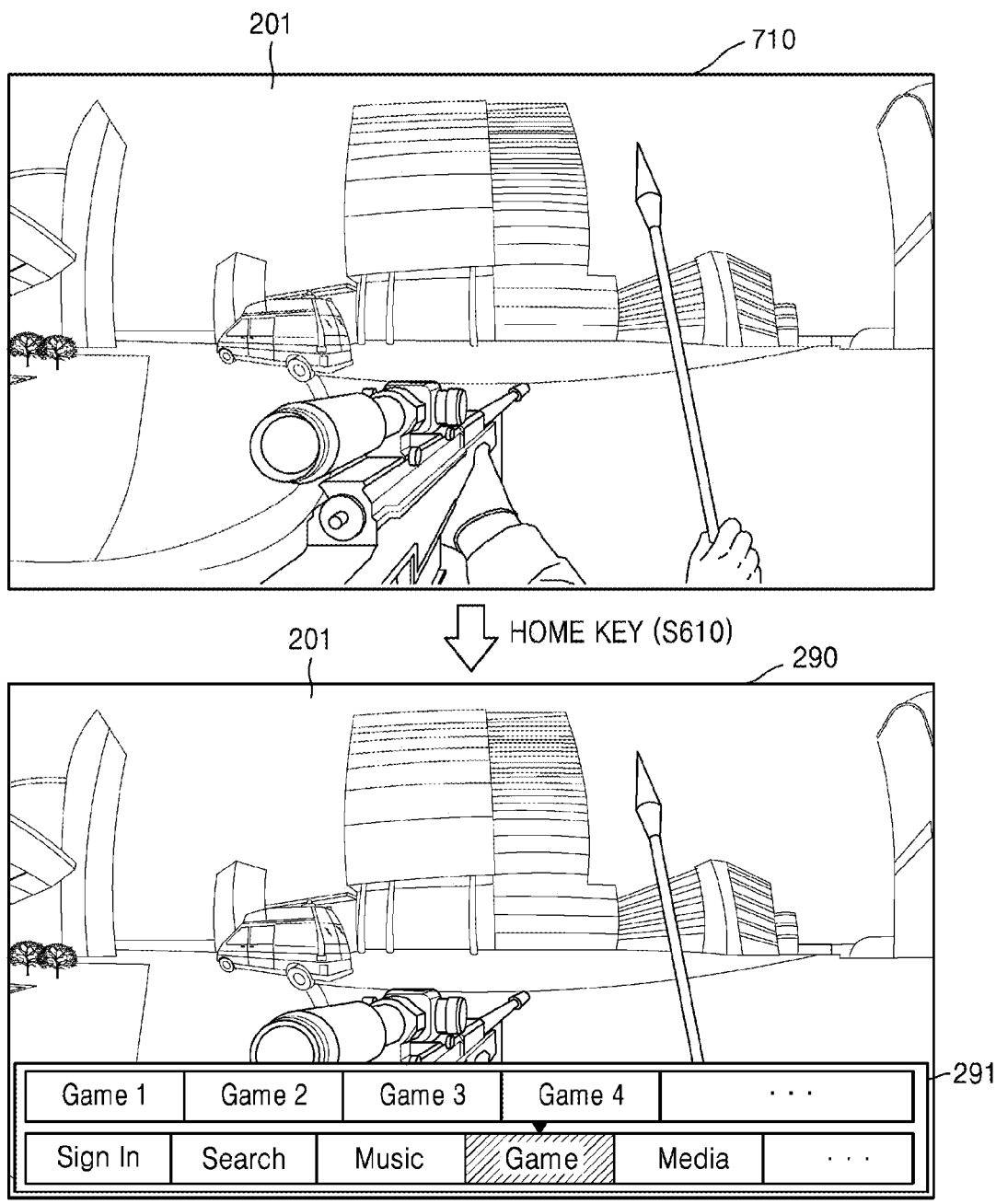

USER INTERFACE WITH CONTEXTUAL MENU HOME BUTTONS

CROSS-REFERENCE TO RELATED APPLICATIONS

This application is a Continuation of U.S. application Ser. No. 18/622,151, filed Mar. 29, 2024, which is a Continuation of International Application No. PCT/KR2022/014842 filed Sep. 30, 2022, which claims priority to KR 10-2021-0130285 filed Sep. 30, 2021, the entire contents of which are all hereby incorporated herein by reference in their entireties.

BACKGROUND

Field

The disclosure relates to a display device capable of playing game content and an operation method of the display device.

For example, the disclosure relates to a display device capable of playing game content controllable by a game controller and an operation method of the display device.

Description of Related Art

With technological developments in display devices, display devices capable of performing various functions have been developed.

A representative example of a display device is a TV. Conventional TVs simply received broadcast signals and played corresponding broadcast content (e.g., news, dramas, and music programs).

With the recent technology development of display devices, various applications or programs may be stored and installed on TVs to perform various functions, and various functions and services in addition to broadcast content playback functions may be provided through the installed applications. For example, a game application may be stored and installed on a TV and game content may be executed through the game application.

With the development of communication technology or communication connection functions of display devices, display devices have been developed to provide various functions or services through wired or wireless communication with external devices. For example, a display device may be connected to an external device (e.g., a game console device) through wired or wireless communication and may receive content (e.g., game content) from the external device (e.g., the game console device) through the wired or wireless communication.

As described above, as functions of a display device become more diverse, a plurality of remote control devices for controlling the display device may be used. For example, in addition to receiving and playing broadcast signals, a smart TV may perform various functions such as playing game content and making video calls. Here, a smart TV may refer to a TV equipped with an operating system (OS) to provide various functions or services in addition to functions of receiving and playing broadcast signals.

When one display device may be connected to a plurality of remote control devices and may be controlled by each of the plurality of remote control devices, the display device may receive a control signal from at least one of the plurality of remote control devices. In this case, there is a need to provide a method and device for processing the control signal received by the display device to better meet a user's intention and increase user satisfaction.

SUMMARY

Embodiments of the disclosure provide a display device capable of increasing satisfaction of a user using content through the display device, and an operation method of the display device.

Embodiments of the disclosure provide a display device capable of processing a control signal received from any one of a plurality of remote control devices to increase the satisfaction of a user using a game through the display device, and an operation method of the display device.

Embodiments of the disclosure provide a display device capable of, when receiving a control signal corresponding to a control key from any one of a plurality of remote control devices including the same control key, processing the received control signal to meet the intention of a user using content through the display device, and an operation method of the display device.

A display device according to an example embodiment includes: a display, a communication interface comprising circuitry configured to interface with at least one of a first control device including a first key and a second control device including the first key, and at least one processor, comprising processing circuitry, individually and/or collectively, configured to execute at least one instruction to: receive a first control signal corresponding to the first key, perform a first operation to output a first full screen by executing the first control signal, based on the first control signal being received from the first control device while first content is being played, and perform a second operation different from the first operation to output a second full screen different from the first full screen, based on the first control signal being received from the second control device while the first content is being played.

For example, at least one processor, individually and/or collectively, may be further configured to execute the at least one instruction to: perform the second operation to maintain playback of the first content, based on the first control signal being received from the second control device while the first content is being played.

For example, at least one processor, individually and/or collectively, may be further configured to execute the at least one instruction to: perform the second operation to ignore the first control signal while maintaining playback of the first content, based on the first control signal being received from the second control device while the first content is being played.

For example, at least one processor, individually and/or collectively, may be further configured to execute the at least one instruction to: generate a first user interface screen corresponding to the first control signal, and perform the second operation to output the first user interface screen through the display while maintaining playback of the first content, based on the first control signal being received from the second control device while the first content is being played.

For example, at least one processor, individually and/or collectively, may be further configured to execute the at least one instruction to: maintain playback of the first content, based on the first control signal being received from the second control device while the first content is being played, and determine whether to generate the first user interface screen, based on a result of identifying whether the first control signal is a control signal for requesting video output.

For example, at least one processor, individually and/or collectively, may be further configured to execute the at least one instruction to: based on identifying that the first control signal is not a control signal for requesting video output, perform an operation corresponding to the first control signal in a background environment while playback of the first content is maintained.

For example, at least one processor, individually and/or collectively, may be further configured to execute the at least one instruction to: based on identifying that the first control signal is a control signal for requesting video output, generate the first user interface screen while playback of the first content is maintained, and control the display to display the second full screen including a playback image of the first content and the first user interface screen.

For example, at least one processor, individually and/or collectively, may be further configured to execute the at least one instruction to: based on identifying that the first control signal is a control signal for requesting video output corresponding to a full screen, split a full screen of the display device into a plurality of partial screens, and control the playback image and the first user interface screen to be respectively output on the plurality of partial screens.

For example, at least one processor, individually and/or collectively, may be further configured to execute the at least one instruction to: determine a layout of the second full screen, based on a resolution of an image corresponding to the first content.

For example, at least one processor, individually and/or collectively, may be further configured to execute the at least one instruction to: determine a layout of the second full screen, based on at least one of a resolution of the playback image and an attribute of the first user interface screen.

For example, the first key may include a home key, the first content may include game content, and the first control device may include a game control device configured to exclusively perform control related to a game service.

For example, at least one processor, individually and/or collectively, may be further configured to execute the at least one instruction to: control the first full screen including a game home screen including at least one game-related menu to be output on the display, based on the first control signal corresponding to the home key being received from the first control device while the game content is being played, and control the second full screen different from the first full screen to be output while maintaining playback of the game content, based on the first control signal corresponding to the home key being received from the second control device while the game content is being played.

For example, at least one processor, individually and/or collectively, may be further configured to execute the at least one instruction to: control the first full screen including a game home screen including at least one game-related menu to be output on the display, based on the first control signal corresponding to the home key being received from the first control device while the game content is being played in response to provision of the game service, and control a full screen including a home menu screen including a plurality of menus respectively corresponding to a plurality of categories to be output, based on the first control signal corresponding to the home key being received from the first control device while a service different from the game service from among a plurality of services provided by the display device is being provided.

A method of operating a display device according to an example embodiment includes: receiving a first control signal while the display device is playing first content, through a communication interface configured to communicate with at least one of a first control device including a first key and a second control device including the first key, identifying a type of a control device that transmits the first control signal, performing a first operation to output a first full screen by executing the first control signal, based on the first control signal being received from the first control device while the first content is being played, and performing a second operation different from the first operation to output a second full screen different from the first full screen, based on the first control signal being received from the second control device while the first content is being played.

According to a display device and an operation method thereof according to an example embodiment, the satisfaction of a user using content through the display device may be increased.

According to a display device and an operation method thereof according to an example embodiment, the display device receiving a control signal from any one of a plurality of different control devices including the same key may operate to better meet a user's intention, thereby increasing user satisfaction.

According to a display device and an operation method thereof according to an example embodiment, a control signal received from any one of a plurality of remote control devices may be processed so that playback of a game is not stopped regardless of the intention of a user playing the game. Accordingly, because the game is not suddenly stopped regardless of the intention of the user playing the game through the display device, the game user may not experience inconvenience. Accordingly, according to the display device and the operation method thereof according to an example embodiment, the satisfaction of the user playing the game through the display device may be increased.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4A is a diagram illustrating example operations performed by a display device and screens output in response to the operations, according to various embodiments;

FIG. 6 is a flowchart illustrating an example method of operating a display device, according to various embodiments;

FIG. 7A is a diagram illustrating an example screen switching operation of a display device performed based on reception of a control signal according to various embodiments;

DETAILED DESCRIPTION

Figure 1:
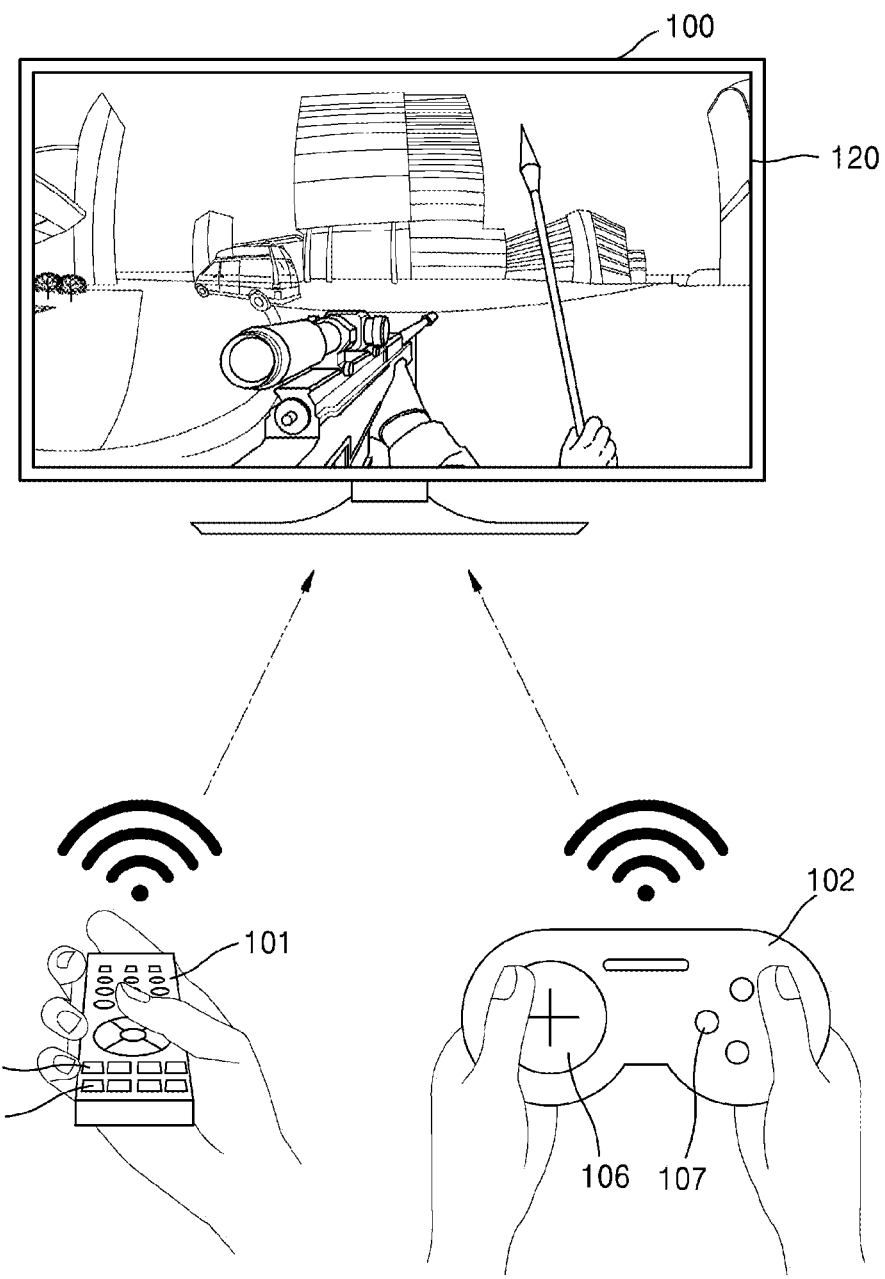
FIG. 1 is a diagram illustrating a plurality of control devices that may be used to control a display device for playing game content according to various embodiments.

The present disclosure will now be described more fully with reference to the accompanying drawings. However, the present disclosure may be embodied in many different forms and is not limited to the various embodiments of the present disclosure set forth herein. For clarity, portions irrelevant to the descriptions of the present disclosure may be omitted in the drawings, and like components are denoted by like reference numerals throughout the disclosure. In the drawings, like reference numerals denote like elements.

Throughout the disclosure, when a component is referred to as being "connected" to another component, it will be understood to include that the component is "directly connected" to the other component or is "electrically connected" to the other component with another component therebetween. When a part "includes" an element, another element may be further included, rather than excluding the existence of the other element, unless otherwise described.

Expressions such as 'in some embodiments' or 'in an embodiment' mentioned throughout the disclosure are not intended to indicate the same embodiment.

Various embodiments may be represented by functional block components and various process operations. Some or all of functional blocks may be implemented by various numbers of hardware and/or software components for performing specific functions. For example, functional blocks of the present disclosure may be implemented using one or more processors or microprocessors, or circuit components for intended functions. Furthermore, for example, the functional blocks may be implemented in various programing or scripting languages. The functional blocks may be implemented in an algorithm executed by one or more processors. In addition, the present disclosure may employ the prior art for electronic configuration, signal processing, and/or data processing, etc. The terms such as 'module', 'component', and the like may be used broadly and may not be limited to mechanical and physical elements.

Connection lines or connection members between components illustrated in the drawings are merely illustrative of functional connections and/or physical or circuit connections. In an actual device, connections between components may be represented by various functional connections, physical connections, or circuit connections that are replaceable or added.

In addition, the expression 'at least one of a, b, and c' indicates only a, only b, only c, both a and b, both a and c, both b and c, or all of a, b, and c.

In a disclosed embodiment, a display device may refer to any electronic device capable of displaying a screen corresponding to content provided to a user (e.g., a playback screen of content or a menu screen for content). Content may be a game, a lecture, a movie, a home training service, or the like.

For example, a display device according to an embodiment of the present disclosure may include, without limitation, any of various electronic devices capable of displaying at least one content such as a TV, a smart TV, a digital broadcasting terminal, a tablet PC, a smartphone, a mobile phone, a computer, a laptop computer, or the like. Also, a display device may be of a movable or user-portable type as well as a fixed type.

FIG. 1 is a diagram illustrating a plurality of control devices that may be used to control a display device for playing game content according to various embodiments.

With the development of technology of display devices, display devices capable of performing various functions have been developed. For example, a display device (e.g., a smart TV) may provide a uses with various additional functions or additional services in addition to a function of providing broadcast content according to broadcast reception, which is a representative function. For example, a smart TV may perform games, video calls, and home training services. As described above, when a smart TV provide additional functions such as games, video calls, and home training services, a dedicated control device for controlling the provided functions or services may be used. That is, a TV control device for controlling an operation of a smart TV itself and an additional function-specific control device (e.g., a game control device) for controlling an additional function (e.g., a game function) or content corresponding to the additional function may be connected to the smart TV.

In FIG. 1, a display device according to a disclosed embodiment is a TV, and the following will be described assuming that a display device 100 provides a game function to play game content.

Referring to FIG. 1, the display device 100 may be generally controlled by a control device 101 located at a remote location. The control device 101 may be a control device used to generally control the display device 100. For example, when the display device 100 is a TV, the control device 101 may be a control device manufactured and sold by a manufacturer of the TV to control an overall function of the TV. Alternatively, the control device 101 may be an integrated control device capable of controlling overall functions of the TV.

For example, the control device 101 may include at least one key 104 and 105 such as a key for turning on or off the TV, a channel change key, a sound control key, a home menu key, a configuration key, and a plurality of numeric keys for channel designation. When a user presses or touches a certain key included in the control device 101, the control device 101 may transmit a control signal corresponding to the selected key to the display device 100. When the display device 100 is a TV, a control device for generally controlling functions of the TV may be referred to as a 'TV control device' or an 'integrated control device'.

When the display device 100 provides an additional function such as a game, in order to exclusively control the additional function, a separate control device 102 different from the control device 101 may be separately used. For example, when the display device 100 provides a game function, the display device 100 may be controlled by the control device 102 for controlling game content or a game function. In detail, the control device 102 is a control device used to exclusively control a game function or game content and may be referred to as a 'game control device'.

Also, for convenience of explanation, a control device for exclusively controlling a specific function (e.g., a game function) may be referred to as a first control device 102, and a control device for generally controlling functions of the display device 100 may be referred to as a second control device 101.

In general, in the case of a game control device, at least one key included in the control device 101 may have a key configuration different from that of the control device 102. For example, the control device 102 that is a game control device includes at least one key 106 and 107 required to control a game function, set game-related settings, or play a game. For example, the control device 102 may include at least one key for controlling a game function (e.g., a game start key, a game end key, and a game pause key), at least one key required to set game settings (e.g., a game configuration key), at least one key required to play a game (e.g., a direction key, a position movement key, a vibration intensity control key, and a joystick), and/or at least one key for performing an additional function related to a game (e.g., a communication connection key for sharing a game with other users, a communication connection setting key, a game playback screen recording key, and a game playback screen sound recording key). Also, the control device 102 may be a control device used by a user playing a game.

Also, the game control device 102 may include at least one key that is the same as the TV control device 101. For example, the game control device 102 may include a home key, a setting key, a volume up key, and/or a volume down key. In the above example, the TV control device 101 may include at least one key (e.g., a home key, a setting key, a volume up key, and/or a volume down key) that is the same as at least one key included in the game control device 102.

In a disclosed embodiment, the display device 100 may be paired with a plurality of control devices (e.g., 101 and 102), and may receive a control signal from each of the plurality of control devices (e.g., 101 and 102).

The following will be described assuming that the control device 101 or 102 is a 'remote control device' that wirelessly communicates with the display device 100, is located at a remote location, and may control the display device 100.

Also, the control device 101 or 102 may include a hardware component such as a keypad, a mouse, a touch pad, a touchscreen, a track ball, or a jog switch to receive a control signal. The control device 101 or 102 may identify a control signal corresponding to a selected or input key and may accordingly transmit the control signal to the display device 100. Alternatively, the control device 101 or 102 may include a microphone that receives sound, and may recognize sound (e.g., a user voice) received through the microphone, may generate a control signal for the sound, and may transmit the control signal to the display device 100.

Hereinafter, for convenience of explanation, the control device 102 for exclusively performing control related to specific content, a specific function, a specific service, and/or a specific application is referred to as a 'first control device 102'.

Also, for convenience of explanation, a control device used for overall control of the display device 100 is referred to as a 'second control device 101'. For example, the second control device 101 may refer to a control device that does not exclusively perform control related to specific content, a specific function, a specific service, and/or a specific application. Alternatively, the control device 101 may be a control device for exclusively performing control related to other functions, other content, other services, and/or other applications distinguished from specific content, a specific function, a specific service, and/or a specific application.

For example, the first control device 102 may refer to a control device for exclusively performing control related to specific content (e.g., game content), and the second control device 101 may be a control device different from the first control device. In another example, the first control device 102 may be a control device for exclusively performing control related to a specific function (e.g., a game providing function), and the second control device 101 may be a control device that does not exclusively perform control related to the specific function (e.g., the game providing function). Alternatively, the second control device 101 may be a control device for overall control of the display device 100.

In another example, the first control device 102 may be a control device for exclusively performing control related to a specific application (e.g., a game application installed and executed in the display device 100), and the second control device 101 may be a control device for exclusively performing control related to another application (e.g., an application for providing an internet search service).

Also, hereinafter, for example, the following will be described assuming that a specific function or specific content is a game, and the first control device 102 is a game control device. Also, the following will be described assuming that the second control device 101 is an integrated control device capable of controlling overall functions of a TV.

FIGS. 2A to 2H are views illustrating an example of a change in an output screen corresponding to reception of a control signal. In detail, each of FIGS. 2A to 2H is a view illustrating an example of a full screen output from a display device when a control signal is received from one control device for controlling the display device while game content is being played.

For example, each of FIGS. 2A to 2H is a view illustrating an example of a full screen output from the display device 100 described with reference to FIG. 1. For example, the display device 100 may receive a control signal from at least one of a plurality of control devices (e.g., 101 and 102), and may output a full screen based on the reception of the control signal. The output full screen may be a full screen illustrated in each of FIGS. 2A to 2H.

While game content is being played, a control signal may be received by the display device 100. The control signal may be transmitted from any one of the first control device 102 and the second control device 101 described with reference to FIG. 1. For example, the control signal may be a control signal corresponding to a home key for requesting to enter a home menu.

For example, the home key may be a control key for requesting to output a home menu screen provided by the display device 100. The home menu screen may be configured differently according to the display device 100. In general, the home menu screen may be a user interface screen including a plurality menus corresponding to a plurality of functions that may be provided by the display device 100. The home menu screen may be formed differently according to a manufacturer, a model, product specifications, etc. of the display device 100. Also, the home menu screen may have a pre-defined form in the display device 100.

FIGS. 2A, 2B, 2C and 2D described below are diagrams illustrating examples of a home menu screen output from a display device, according to various embodiments.

Figure 2A:
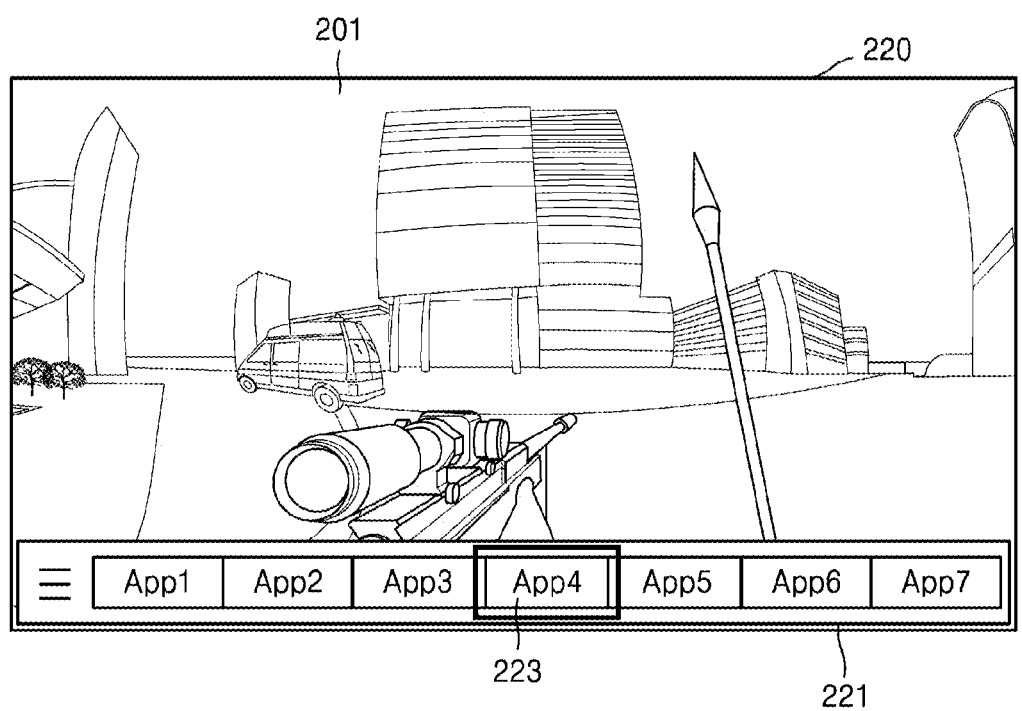
FIG. 2A is a diagram illustrating an example of a home menu screen output from a display device according to various embodiments.

FIG. 2A is a view illustrating an example of a home menu screen output from a display device.

Referring to FIGS. 1 and 2A, the display device 100 may play game content to provide a game function. Accordingly, the display device 100 may output a full screen (e.g., 220) including an image 201 corresponding to playback of game content on a display 120 of the display device 100. Hereinafter, for convenience of explanation, an image corresponding to playback of game content is referred to as a 'game image 201'.

When a control signal corresponding to a home key is received, the display device 100 may output a home menu screen 220. The home menu screen 220 is a user interface screen including a home menu 221, and the home menu 221 may be output to overlap at least a partial area of a full screen. Alternatively, the home menu 221 itself may be output as a full screen. FIG. 2A illustrates an example where the home menu 221 is output on a partial area of a full screen including the game image 201 that is a previously output full screen.

Referring to the example of FIG. 2A, the home menu 221 may include a plurality of application menus corresponding to a plurality of applications provided by the display device 100. Also, the display device 100 may display one menu included in the home menu 221 as a basic menu. For example, the home menu screen 220 of the display device 100 may be display the basic menu, for example, a basic application, set in the display device 100 to be distinguished from other menus. For example, when the basic application is set to an application 4 App4 223, the display device 100 may display the basic application App4 223 using a color, symbol, icon, shape, and/or highlighting process different from other applications (e.g., App1, App2, App3, App5, App6, and App7). FIG. 2A illustrates an example where the basic application App4 223 is highlighted.

For example, in the example of FIG. 2A, the home menu screen 220 may be a screen that includes the home menu 221 including a plurality of menus respectively corresponding to a plurality of applications provided by the display device 100 and where App4 223 is set as a basic menu.

Figure 2B:
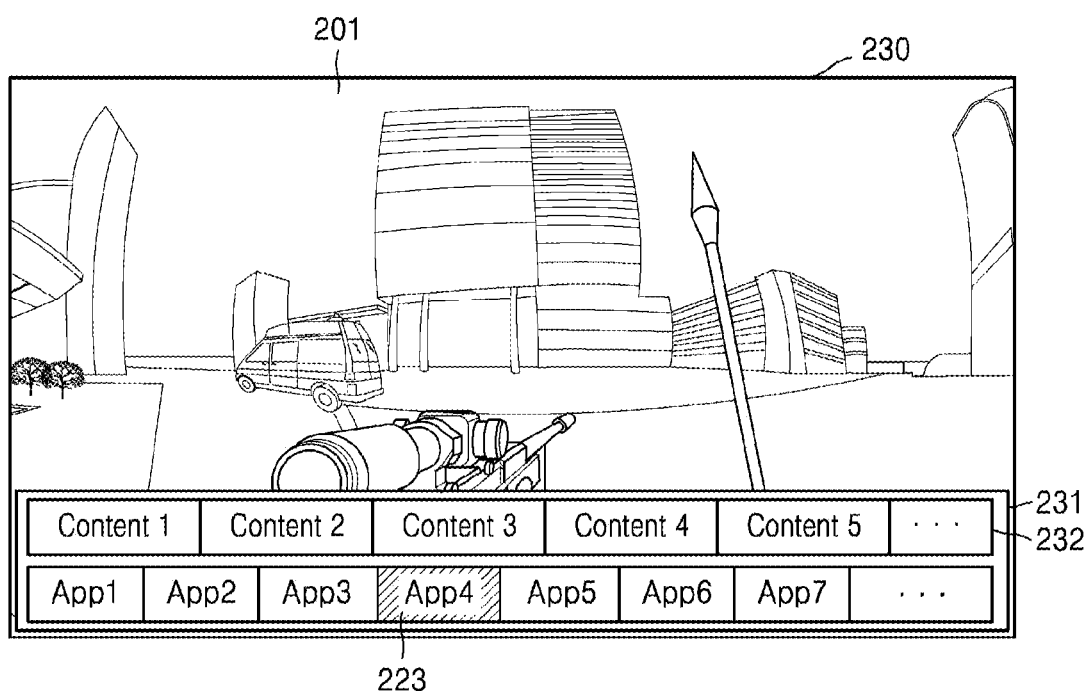
FIG. 2B is diagram illustrating an example of a home menu screen output from a display device according to various embodiments.

FIG. 2B is a diagram illustrating an example of a home menu screen output from a display device according to various embodiments. The same elements in FIG. 2B as those in FIG. 2A are denoted by the same reference numerals.

In the example of FIG. 2B, a home menu screen 230 may be a screen including a home menu 231 displayed overlapping on the game image 201 that is a previously displayed image.

The home menu 231 may further display a plurality of sub-menus 232 corresponding to a basic menu (e.g., a basic application) compared to the home menu 221 of FIG. 2A. FIG. 2B illustrates an example where App4 223 that is a basic application is displayed in a different color from other applications.

For example, when App4 223 is set as a basic menu, the home menu 231 may further include the plurality of sub-menus 232 displaying a plurality of pieces of content provided through the basic menu App4 223. For example, when the basic menu App4 223 is an application for providing media, a plurality of pieces of media content may be provided through the basic menu App4 223. The plurality of sub-menus 232 may be menus for selecting the plurality of pieces of media content provided through the menu App4 223. For example, the sub-menus 232 may include menus for selecting Content 1, Content 2, Content 3, Content 4, and Content 5 which are the plurality of pieces of media content provided through the menu App4 223.

Figure 2C:
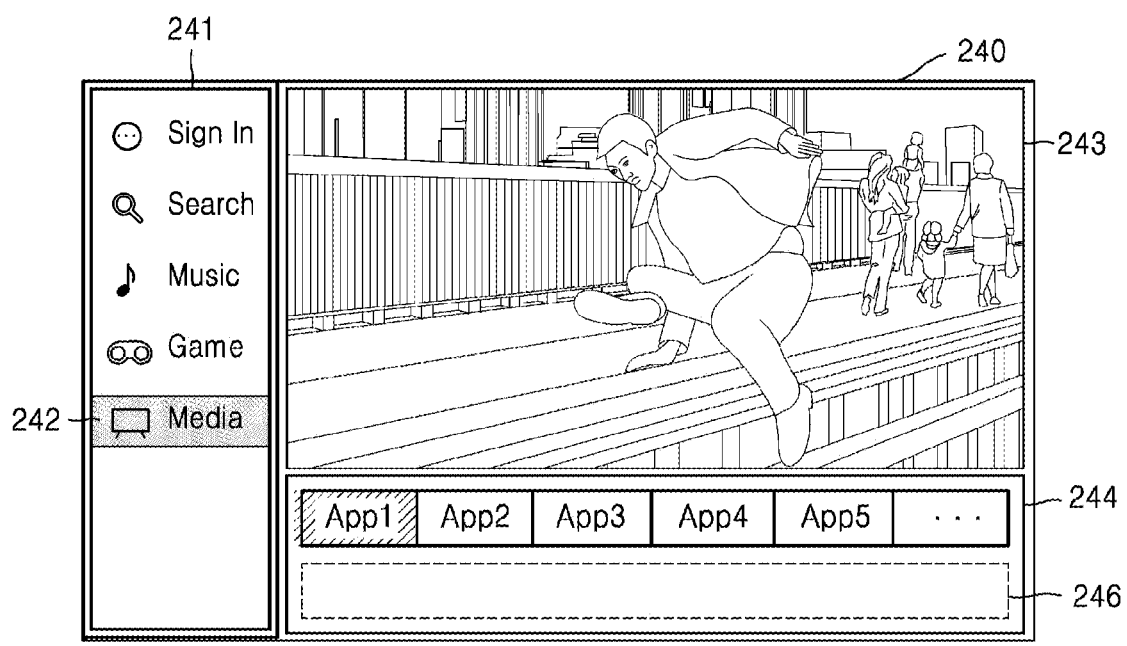
FIG. 2C is a diagram illustrating an example of a home menu screen output from a display device according to various embodiments.

FIG. 2C is a diagram illustrating an example of a home menu screen output from a display device according to various embodiments.

Referring to the example of FIG. 2C, a home menu screen 240 may be output as a full screen. Also, a plurality of menus respectively corresponding to a plurality of services or functions provided by the display device 100 may be displayed in a partial area 241 of the home menu screen 240.

For example, when a function provided to the display device 100 is classified into a plurality of categories, the home menu screen 240 may include a plurality of menus corresponding to the plurality of categories. For example, the plurality of menus included in the home menu screen 240 may include a sign in menu for user login, a search menu for searching for a function, provided content, and stored data of the display device 100, a music menu corresponding to a music providing function, a game menu corresponding to a game function, and a media menu corresponding to a media providing function. Also, each of the plurality of menus may include a corresponding page (or layout).

Also, the home menu screen 240 may be set to display a page corresponding to any one of the plurality of menus.

For example, FIG. 2C illustrates an example where a basic setting of the home menu screen 240 is to display a page corresponding to the media menu. Also, a menu designated as a basic setting of the home menu screen 240 may be referred to as a 'basic menu'.

For example, when a basic setting of the home menu screen is the game menu, the home menu screen may be configured as a screen (e.g., 260) of FIG. 2E described below. In this case, for convenience of explanation, the home menu screen in which the game menu is displayed as a basic setting may be referred to as a 'game home screen'. That is, the game home screen may be a user interface screen displaying a page corresponding to the game menu from among the plurality of menus corresponding to the plurality of categories included in the home menu screen. The game home screen will be described in greater detail below with reference to FIGS. 2E and 2F.

In the home menu screen 240, a basic menu set in the display device 100 may be displayed to be distinguished from other menus. For example, the basic menu may be a menu (or application) that provides media content, and the display device 100 may display a 'media' menu 242 that is a basic menu using a color, symbol, icon, shape, and/or highlighting process different from other menus. FIG. 2C illustrates an example where the media menu 242 that is a basic menu is displayed in a different color. Also, a certain area 244 included in the home menu screen 240 may be an area where sub-menus for selecting a plurality of sub-applications (e.g., pieces of media content) provided through the media menu 242 that is a basic menu are displayed. Also, the certain area 244 may further include an area 246 where additional information corresponding to any one (e.g., App1) of the plurality of sub-applications is displayed. Also, the home menu screen 240 may include an image 243 corresponding to any one (e.g., App1) of the plurality of sub-applications. For example, when any one of the sub-applications which may be provided in the media menu 242 corresponds to certain movie content, the home menu screen 240 may display the representative image 243 of the certain movie content.

Figure 2D:
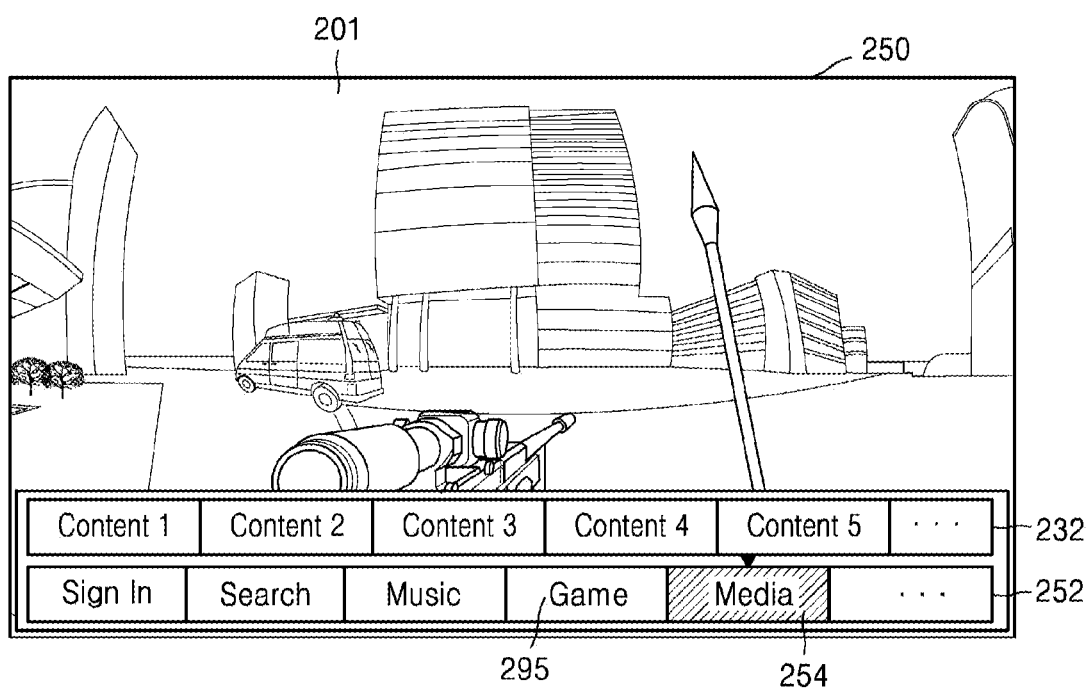
FIG. 2D is a diagram illustrating an example of a home menu screen output from a display device according to various embodiments.

FIG. 2D is a diagram illustrating an example of a home menu screen output from a display device according to various embodiments. The same elements in FIG. 2D as those in FIG. 2B are denoted by the same reference numerals.

In the example of FIG. 2D, a home menu screen 250 may display first a menu bar 252 where a plurality of application menus corresponding to a plurality of applications provided by the display device 100 are displayed. When any one menu (e.g., a media menu 254) included in the menu bar 252 is selected, a sub-menu bar 232 where sub-menus (or sub-applications) which may be provided in the selected menu are displayed may be additionally displayed.

Also, there may be a menu screen corresponding to any one of a plurality of functions, services, and applications that may be provided by the display device 100. For example, when the display device 100 provides a game function, a user interface screen for providing a game function may be referred to as a game home screen. For example, the game home screen may be configured differently according to a manufacturer, a model, product specifications, etc. of the display device 100. Also, the game home screen may have a pre-defined form in the display device 100.

Figure 2E:
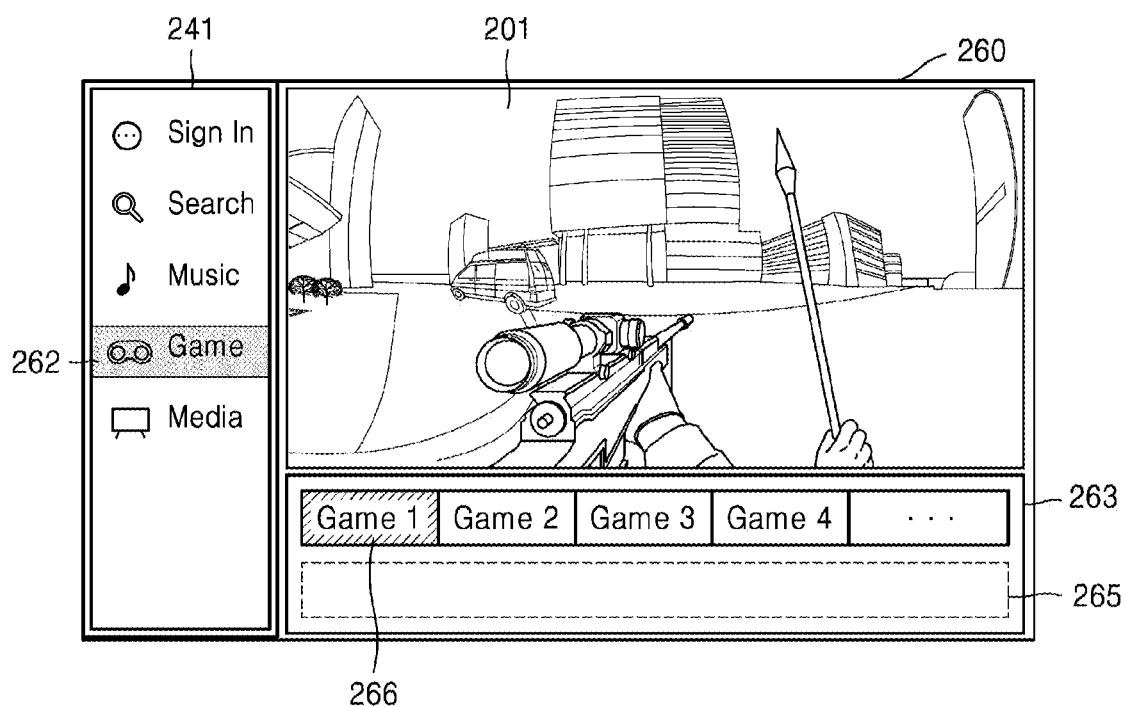
FIG. 2E is a diagram illustrating an example of a game home screen output from a display device according to various embodiments.
Figure 2F:
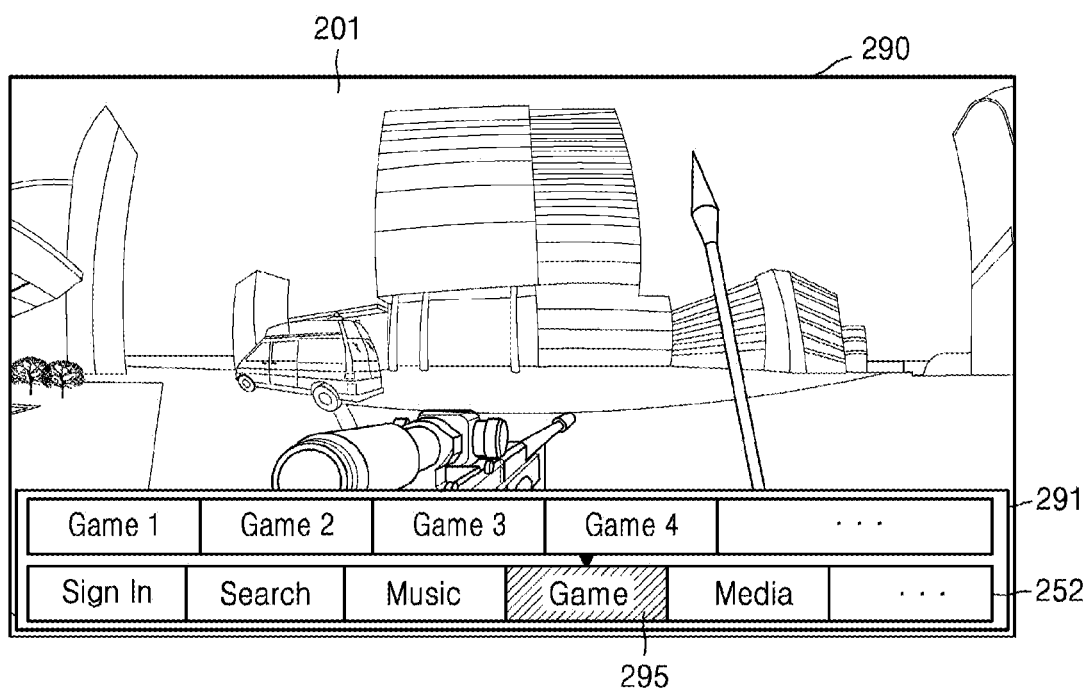
FIG. 2F is a diagram illustrating an example of a game home screen output from a display device according to various embodiments.

FIGS. 2E and 2F described below are diagrams illustrating examples of a game home screen output from a display device, according to various embodiments.

FIG. 2E is a diagram illustrating an example of a game home screen output from a display device, according to various embodiments. The same elements in FIG. 2E as those in FIG. 2C are denoted by the same reference numerals.

A game home screen 260 may have a form similar to that of the home menu screen 240 of FIG. 2C, and may be a user interface screen output when a game menu 262 is selected in the home menu screen 240.

For example, the game home screen 260 may include an indicator (e.g., a different color, symbol, icon, shape, and/or highlighting process) indicating that the game menu 262 has been selected, and a plurality of games that may be provided in the game menu 262 may be displayed in a certain area 263.

For example, when Game 1 266 is set or selected as a basic game from among the plurality of games that may be provided in the game menu 262, the game home screen 260 may further display at least one of an area 265 for displaying additional information about Game 1 266 and a representative image (e.g., 201) of Game 1.

FIG. 2F is a diagram illustrating an example of a game home screen output from a display device, according to various embodiments. The same elements in FIG. 2F as those in FIG. 2D are denoted by the same reference numerals.

In the example of FIG. 2F, a game home screen 290 may have a form similar to that of the home menu screen 250 of FIG. 2D, and may be a user interface screen output when a game menu 295 is designated or selected in the home menu screen 250. Also, the game home screen 290 may include a plurality of games that may be provided in the game menu 295 as a sub-menu window.

Figure 2G:
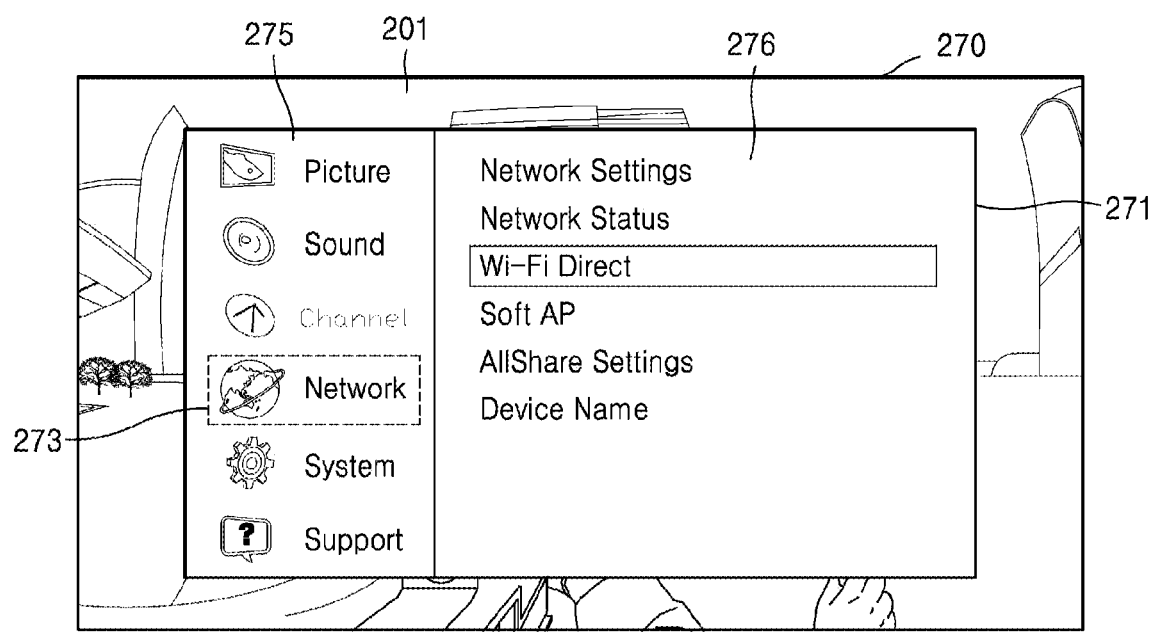
FIG. 2G is a diagram illustrating an example of a setting screen output from a display device according to various embodiments.

FIG. 2G is a diagram illustrating an example of a setting screen output from a display device, according to various embodiments.

A control signal received by the display device 100 may be a control signal corresponding to a key (e.g., a setting key) for requesting to output a configuration menu required for an operation of the display device 100. The display device 100 may receive a control signal corresponding to a setting key included in a control device, and may output a setting screen 271 that is a user interface screen for settings of the display device 100 based on reception of the control signal. The setting screen 271 is a user interface screen for settings of the display device 100, and a detailed configuration may be formed differently according to a manufacturer, model, product specifications, etc. of the display device 100. Also, the setting screen may have a pre-defined form in the display device 100.

Referring to FIG. 2G, the setting screen 271 may include an area 275 where a plurality of menus that may be set by a user in the display device 100 are displayed. Also, the setting screen 271 may include an area 276 where sub-menus corresponding to any one of the plurality of menus are displayed. For example, any one of the plurality of menus may be set as a basic menu. Also, a plurality of sub-menus corresponding to the set basic menu may be displayed in the area 276. Alternatively, when any one of the plurality of menus is selected by the user, sub-menus corresponding to the selected menu may be displayed in the area 276.

FIG. 2G illustrates an example where when a network setting menu 273 is set as a basic menu from among the plurality of menus that may be set by the user in the display device 100, sub-menus corresponding to the network setting menu 273 are displayed in the area 276.

Also, the setting screen 271 may be displayed overlapping on a full screen 270. Alternatively, the setting screen 271 itself may be displayed as a full screen (not shown).

Figure 2H:
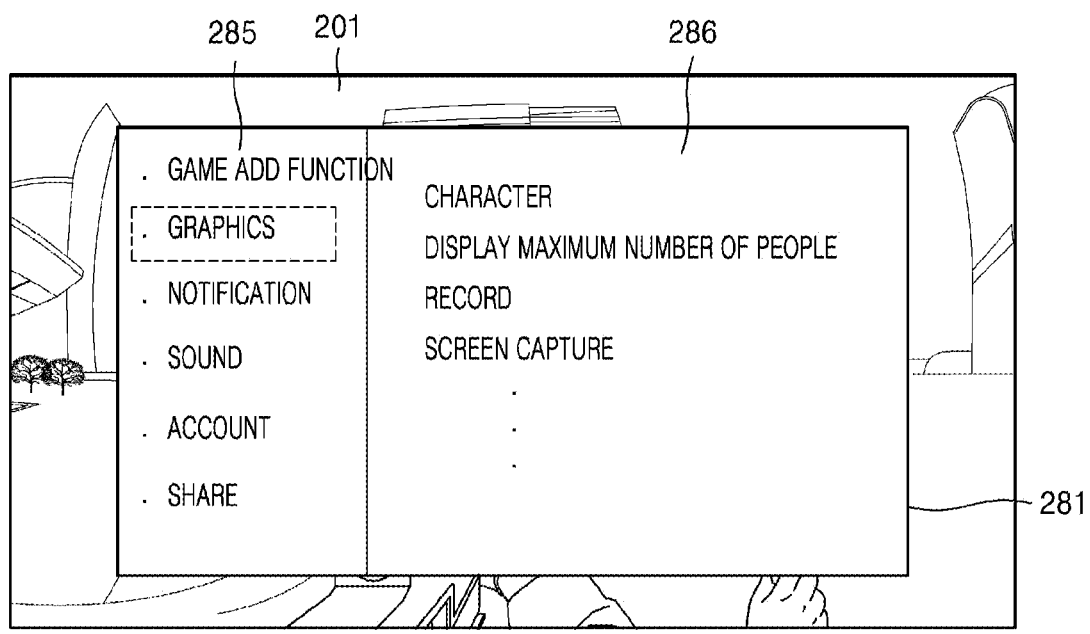
FIG. 2H is a diagram illustrating an example of a game setting screen output from a display device according to various embodiments.

FIG. 2H is a diagram illustrating an example of a game setting screen output from a display device, according to various embodiments.

In the example of FIG. 2H, a game setting screen 281 may be a user interface screen for game setting. For example, a detailed configuration of the game setting screen 281 may be formed differently according to a manufacturer, model, product specifications, etc. of the display device 100. In another example, a detailed configuration of the game setting screen 281 may be formed differently according to a game content provider and/or a type of game content.

For example, the game setting screen 281 may include an area 285 where a plurality of menus required for a configuration required to play a game are displayed. Also, the game setting screen 281 may include an area 286 where sub-menus corresponding to any one of the plurality of menus are displayed. For example, any one of the plurality of menus may be set as a basic menu. Also, a plurality of sub-menus corresponding to the set basic menu may be displayed in the area 286. Alternatively, when any one of the plurality of menus is selected by a user, sub-menus corresponding to the selected menu may be displayed in the area 286.

For convenience of explanation, a user interface screen (e.g., 271 of FIG. 2G) for a configuration for overall functions provided to a display device is referred to as a 'TV setting screen', and a user interface screen (e.g., 281 of FIG. 2H) for a configuration for a game is referred to as a 'game setting screen'.

When both the first control device 102 and the second control device 101 which are a plurality of control devices are used to control the display device 100, user satisfaction may vary according to how the display device 100 operates according to a control signal.

For example, while a game user (hereinafter, referred to as a 'first user') is playing a game through the display device 100 using the first control device 102, a second user different from the first user who is the game user may select a certain key included in the second control device 101. Then, a control signal corresponding to the selected key is transmitted from the second control device 101 to the display device 100. In the above example, in a general case, when a control signal is received, the display device 100 unconditionally pauses an operation of content that is currently being played and performs an operation corresponding to the control signal. In detail, when a control signal corresponding to a home key is received by the display device 100, the display device 100 may stop playing game content, may perform a home menu entry operation, and may display the home menu 221 on a full screen (e.g., 220).

In the above example, even though the first user was playing a game through the display device 100 and had no intention of stopping the game, playback of the game content is stopped according to the second user's operation of the second control device 101. Accordingly, the above method may cause inconvenience to the first user due to game interruption regardless of the intention of the first user who was playing the game while watching the game content.

Also, the first control device 102 and the second control device 101 may include at least one same key. For example, the first control device 102 and the second control device 101 may include the same home menu key. In this case, conventionally, when the same key is selected and received from each of the first control device 102 and the second control device 101, there was no definition as to whether the same user interface screen is output or to perform the same operation. When the same key is selected and received from each of the first control device 102 and the second control device 101, the display device 100 needs to operate to increase user satisfaction.

A disclosed embodiment may provide a display device operating to increase user satisfaction while solving the problems causing user inconvenience as described above. In detail, there are provided a display device that operates, when a control signal is input while certain content corresponding to a certain function or service is being played through the display device 100, to increase the satisfaction of a user receiving the certain function or service, and an operation method of the display device. Hereinafter, a disclosed embodiment will be described in greater detail below with reference to FIGS. 3A to 23.

Figure 3A:
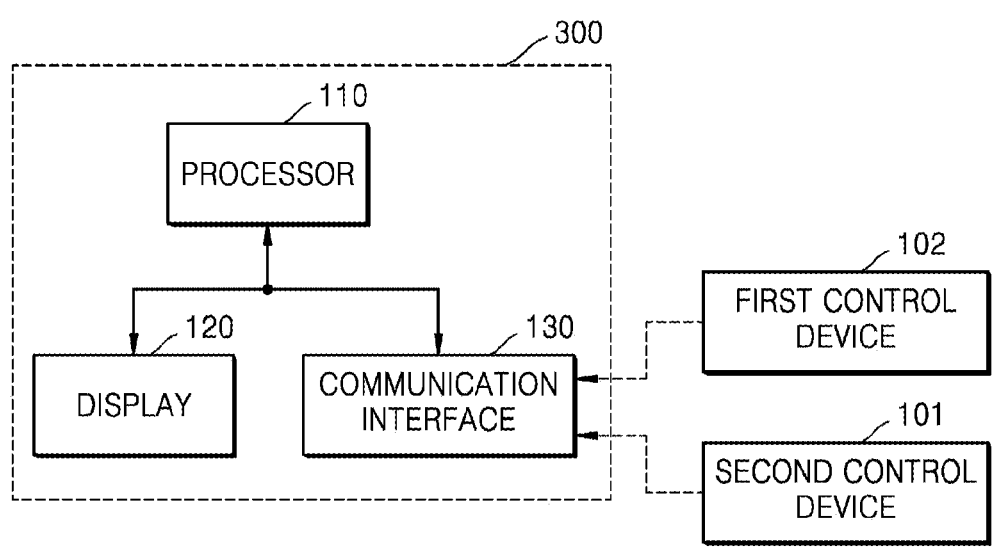
FIG. 3A is a block diagram illustrating an example configuration of a display device, according to various embodiments.

FIG. 3A is a block diagram illustrating an example configuration of a display device, according to various embodiments.

Referring to FIG. 3A, a display device 300 according to a disclosed embodiment may correspond to the display device 100 of FIG. 1. Also, the same elements in FIG. 3A as those in FIG. 1 are denoted by the same reference numerals. Accordingly, when the display device 300 of FIG. 3A is described, the same description as that made with reference to FIGS. 1 to 2H will be omitted.

Referring to FIG. 3A, the display device 300 includes a display 120, a communication interface (e.g., including communication circuitry) 130 communicating with an external device, and a processor (e.g., including processing circuitry) 110 configured to execute at least one instruction.

In a disclosed embodiment, the communication interface 130 may include various communication circuitry and communicates with a first control device including a first key and a second control device including the first key. In detail, each of the first control device and the second control device may be a control device that may be paired and communicate with the display device 300. The first control device and the second control device may include the same key. For example, the first control device and the second control device may include the first key that is the same key.

In a disclosed embodiment, the processor 110 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 110 may, for example, execute the at least one instruction to perform operations described below. For example, the processor 110 may receive a first control signal corresponding to the first key, and performs a first operation to output a first full screen by executing the first control signal, based on the first control signal being received from the first control device while first content is being played. The processor 110 may perform a second operation different from the first operation to output a second full screen different from the first full screen, based on the first control signal being received from the second control device while the first content is being played. The first operation may include an operation of executing the first control signal. The second operation may include an operation performed to output the second full screen different from the first full screen while maintaining playback of the first content that is being played.

For example, the first content may be content provided through a first service (or a first function or a first application). In detail, the first service may be any one of a plurality of services or functions that may be provided by the display device 300. For example, the first service may be a game service (or function). In another example, the first service may be a broadcast content providing function.

For example, the processor 110 may perform the second operation to maintain playback of the first content, based on the first control signal being received from the second control device while the first content is being played. As the second operation is performed, the display device 300 may output the second full screen. The second full screen may include a playback image of the first content.

For example, the display device 300 may be a TV, and the display device 300 may provide various services or functions in addition to a function of receiving and providing broadcast content. For example, the display device 300 may provide a game, a lecture, a movie, or a home training services.

The following will be described assuming that the first service is a game service, a game function, or a game application for providing a game. Accordingly, the following will be described assuming that the first content is game content.

For example, the first operation may refer to an operation of executing a request of the first control signal. For example, when the first key is a key for requesting to output a first user interface screen, the first operation may be an operation of outputting the first full screen including the first user interface screen by executing the first control signal. For example, the first user interface screen does not refer to a specific screen, and may refer to a user interface screen generated based on a request corresponding to the first key. For example, when the first key is a home key and the home key is mapped or set to a key for requesting to output a home menu screen, the first user interface screen may be the home menu screen.

Also, in a disclosed embodiment, the processor 110 may map a user interface screen corresponding to the first key differently according to an operation situation of the display device 300. For example, when the display device 300 is currently playing game content and a control signal corresponding to a home key is received, the display device 300 may recognize the received control signal as a control signal for requesting to output a game home screen (e.g., 260 of FIG. 2E). Alternatively, when the display device 300 is currently playing general broadcast content rather than game content and a control signal corresponding to a home key is received, the display device 300 may recognize the received control signal as a control signal for requesting to output a home menu screen (e.g., 240 of FIG. 2C).

In another example, when the display device 300 is currently playing game content and a control signal corresponding to a setting key is received, the display device 300 may recognize the received control signal as a control signal for requesting to output a game setting screen (e.g., 281 of FIG. 2H). Alternatively, when the display device 300 receives general broadcast content rather than game content and a control signal corresponding to a setting key is received, the display device 300 may recognize the received control signal as a control signal for requesting to output a TV setting screen (e.g., 271 of FIG. 2G).

When a user is currently playing a game through the display device 300, a user input received from the user (e.g., a user input that selects a certain key included in a control device) may be interpreted as including a request for the game. Accordingly, as in the above examples, it may be identified which user interface screen is requested to be output by the first control signal corresponding to the first key according to whether game content is being played.

Also, the second operation may be an operation that does not execute a request of the first control signal as it is and ignores the first control signal. In another example, the second operation may be an operation to output the second full screen including a playback image corresponding to the first content and the first user interface screen so that the first user interface is output while maintaining playback of the first content.

For example, when the first key is a home key, the first key may be a key for requesting to output a home menu and the first control signal may be a control signal for requesting to output a home menu screen (or a full screen including the home menu screen) that is the first full screen. In the above example, the first operation may be a request to output a home menu screen on a display of the display device by executing the first control signal. In the above embodiment, the second operation may be an operation to output the second full screen different from the home menu screen (or full screen including the home menu screen) that is the first full screen. For example, the second full screen may be a full screen that does not include the home menu screen and continuously displays a previously output game image. In another example, regarding the second full screen, an entire area (or a full screen) of the display may be split into two partial areas, a previously output image may be continuously displayed in one partial area and a home menu screen may be displayed in the other partial area. In another example, the second full screen may display a home menu screen within a non-data area (e.g., a black area) included in the screen while continuously outputting a previously output game image.

For example, the first control device may be a control device for exclusively controlling a game function, and the second control device may be a control device for generally controlling functions of the display device 300. In another example, the first control device may be a control device for exclusively controlling a game function, and the second control device may be a control device other than the control device for exclusively controlling a game function.

For example, a type of a control device may be distinguished according to whether the control device is a control device for exclusively controlling a specific function, a specific service, and/or specific content that is currently being executed by the display device 300. In another example, a type of a control device may be distinguished according to whether the control device is exclusively performing control related to content that is currently being played by the display device 300. In another example, a type of a control device may be distinguished according to whether the control device is a control device for exclusively controlling content that is currently being played by the display device 300.

A type of a control device may be distinguished according to whether the control device is an integrated control device for overall control of a TV or a control device corresponding to a specific function or a specific service that is currently being executed by the display device 300.

A type of a control device may be distinguished or classified into a control device for exclusively performing control related to the first content that is currently being played by the display device 300 and another control device. In another example, a type of a control device may be classified into a control device for exclusively performing control related to the first content that is currently being played by the display device 300 and a control device that does not exclusively perform control related to the first content.

A type of a control device may be classified into any one of an integrated control device for overall control of a TV and a control device for exclusively performing control related to a game function that is currently being executed by the display device 300. In another example, a type of a control device may be distinguished according to whether the control device is a control device for exclusively performing control related to a game function.

In a disclosed embodiment, the first control signal is a control signal generated when the first key is selected and may be transmitted from the first control device 102 or the second control device 101. In a disclosed embodiment, the processor 110 may perform different operations according to whether the first control signal is transmitted from the first control device 102 or from the second control device 101 while the first content is being played.

Different operations (e.g., first and second operations) performed by the processor 110 will be described below in detail with reference to FIGS. 4A, 4B, and 5A.

The processor 110 may receive the first control signal through the communication interface 130 while the first content is being played; may identify a type (e.g., the first control device or the second control device) of the control device that transmits the first control signal; and may perform an operation corresponding to the first control signal while maintaining playback of the first content, based on the first control signal being received from the second control device different from the first control device 102 for exclusively performing control related to the first content. The 'operation corresponding to the first control signal while maintaining playback of the first content' may correspond to the second operation described above. In detail, according to a result of identifying the type of the control device, the processor 110 may perform an operation corresponding to the first control signal while maintaining playback of the first content, based on the first control signal being identified to be received from the second control device 101 different from the first control device 102 for exclusively performing control related to the first content.

In this case, the processor 110 may perform an operation corresponding to the first control signal while maintaining playback of game content, based on the first control signal being received from the second control device 101 different from the first control device 102 that is a game control device.

In a disclosed embodiment, the processor 110 executes at least one instruction to perform an intended operation. Here, the at least one instruction may be stored in an internal memory (not shown) included in the processor 110 or a memory (not shown) included in the display device 300 separately from the processor 110.

For example, the processor 110 may execute the at least one instruction to control at least one element included in the display device 300 to perform an intended operation. Accordingly, even when it is described that the processor 110 performs certain operations, it may refer, for example, to the processor 110 controlling at least one element included in the display device 300 to perform the certain operations. Also, although the processor 110 includes one processor, the processor 110 may include a plurality of processors.

For example, the processor 110 may include a RAM (not shown) used to store a signal or data input from the outside of the display device 300 or as a storage area corresponding to various tasks performed in the display device 300, a ROM (not shown) used to store a control program for controlling the display device 300, an application for providing a certain function or service, and/or a plurality of instructions, and at least one processor (not shown). The processor (not shown) may include a graphics processing unit (not shown) for processing graphics corresponding to video. The processor (not shown) may be implemented as a system on chip (SoC) in which a core (not shown) and a GPU (not shown) are integrated. Also, the processor 110 may include a multi-core over a single core. For example, the processor 110 may include a dual core, a triple core, a quad core, a hexa core, an octa core, a deca core, a dodeca core, and a hexadecimal core.

The display 120 outputs an image on a screen. In detail, the display 120 may output an image corresponding to video data, through a display panel that is internally included so that a user visually recognizes the video data. In detail, video data that forms content may include a plurality of frame images, and the display 120 may play video content by continuously displaying the plurality of frame images under the control of the processor 110.

For example, the display 120 may output a screen a game image corresponding to game content on a screen under the control of the processor 110.

The communication interface 130 may communicate with at least one external device through a wired or wireless communication network. For example, the external device may be the first control device 102 and/or the second control device 101. Also, the external device (not shown) may be a source device, a server device, or a storage device which may provide content. Alternatively, the external device (not shown) may be an internet server that may provide content.

For example, the communication interface 130 may include at least one wireless communication module, wireless communication circuit, or wireless communication device that performs wireless communication with an external device, for example, a control device.

For example, the communication interface 130 may include a short-range communication module, for example, an infrared (IR) communication module, which may receive a control command from a remote control device (not shown). In this case, the communication unit 132 may receive a control signal from the remote control device (not shown).

In another example, the communication interface 130 may include at least one communication module (not shown) that performs communication according to a wireless communication standard such as Bluetooth, Wi-Fi, Bluetooth Low Energy (BLE), NFC/RFID, Wi-Fi Direct, UWB, or ZIGBEE. Alternatively, the communication interface 130 may further include a communication module (not shown) that performs communication with a server (not shown) for supporting long-range communication according to a long-range communication standard. For example, the communication interface 130 may include a communication module (not shown) that performs communication through a network for Internet communication. Also, the communication interface 130 may include a communication module (not shown) that performs communication through a communication network according to a communication standard such as 3G, 4G, 5G, and/or 6G.

In another example, the communication interface 130 may include at least one port (not shown) to be connected to an external device through a wired cable in order to communicate with the external device in a wired manner. For example, the communication interface 130 may include at least one of a high-definition multimedia interface (HDMI) port, a component jack, a PC port, and a USB port. Accordingly, the communication interface 130 may communicate with an external device connected by wire through at least one port (not shown).

For example, the communication interface 130 may perform communication with a remote control device (e.g., the first control device 102 or the second control device 101) based on at least one of infrared (IR) communication, Bluetooth, Wi-Fi, BLE, NFC/RFID, and Wi-Fi Direct.

For example, the communication interface 130 may perform BLE communication or Wi-Fi communication with the first control device 102, and may perform IR communication with the second control device 101. In another example, the communication interface 130 may perform IR communication with the first control device 102, and may perform BLE communication with the second control device 101.

In another example, the communication interface 130 may include a plurality of communication modules (e.g., Bluetooth communication modules) following the same communication standard. In this case, the communication interface 130 may communicate with the first control device 102 through one communication module following the same communication standard, and may communicate with the second control device 101 through another communication module following the same communication standard.

In another example, the communication interface 130 may include a communication module (e.g., a Bluetooth communication module) implemented as multiple modules that follow the same communication standard and enable communication with a plurality of external devices at the same time. In this case, the communication interface 130 may communicate with the first control device 102 through one communication module following the same communication standard, and may communicate with the second control device 101 through another communication module following the same communication standard.

In a disclosed embodiment, the processor 110 of the display device 300 may include an application for providing game content. For example, when content to be provided through the display device 300 is game content, the processor 110 may include a game application for playing or executing the game content. For example, a game application may be implemented as at least one instruction or program so that game content is played and a game function or game service is provided to a user. Hereinafter, an application for providing game content is referred to as a 'game application'.

For example, a game application may be distributed (e.g., downloaded or uploaded) online through an application store and installed in the display device 300. When distributed online, the game application may be distributed through a server of a manufacturer of the display device 300, a server of a store of the application store, or a relay server.

In another example, the game application may be a program stored and installed in the display device 300 when the display device 300 is manufactured.

In the above examples, a user who wants to play a game through the display device 300 may receive game content by executing a game application installed in the display device 300. For example, when the display device 300 outputs the home menu screen 250 of FIG. 2D, the user may select a game menu 295 in the home menu screen 250. Then, the display device 300 may receive a user input that selects the game menu 295. Then, the processor 110 may execute a game application, based on the received user input.

The following will be described assuming that the display device 300 displays an image corresponding to the game content for the user who wants to play the game.

The game content played or executed through the display device 300 may be received from an external device communicating with the display device 300 through the communication interface 130.

For example, the communication interface 130 may include at least one port (e.g., an HDMI port) for wired communication connection, and may be connected to a game console (not shown) or a storage device that stores game content through a wired cable (e.g., an HDMI cable) inserted and connected to the at least one port (e.g., the HDMI port). For example, the display device 300 may receive game content from the game console (not shown) through the communication interface 130.

In another example, the communication interface 130 may include a wireless communication module, and may be connected to an Internet server, an external storage device, or a content providing server device connected through the wireless communication module. The display device 300 may receive game content from the internet server, the external storage device, or the content providing server device through the communication interface 130.

Alternatively, game content played in the display device 300 may be stored in a memory (not shown) included in the display device 300.

Figure 3B:
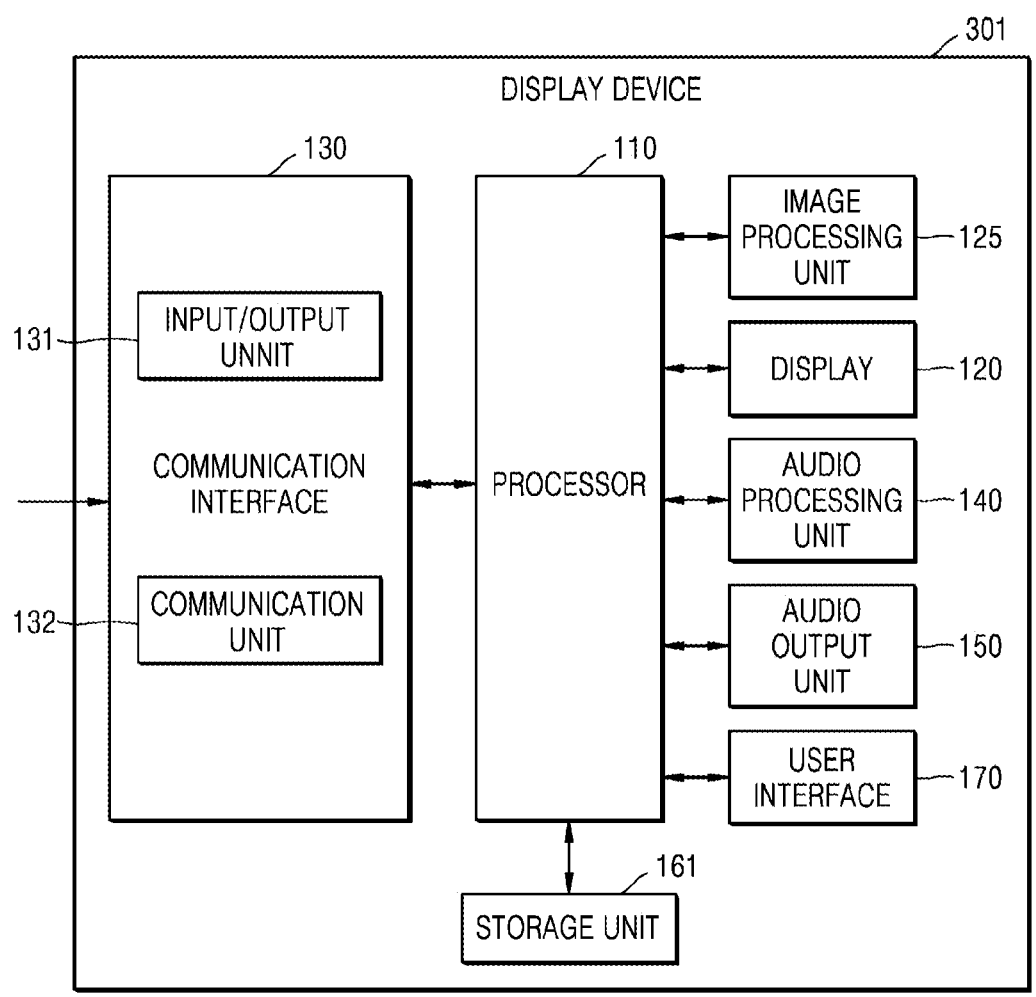
FIG. 3B is a block diagram illustrating an example configuration of a display device, according to various embodiments.

FIG. 3B is a block diagram illustrating an example configuration of a display device, according to various embodiments. The same elements in FIG. 3B as those in FIG. 3A are denoted by the same reference numerals. Also, a display device 301 of FIG. 3B may correspond to the display device 300 of FIG. 3A. Accordingly, when the display device 301 is described, the same description as that made with reference to FIGS. 1 to 3A may not be repeated.

Referring to FIG. 3B, the display device 301 may further include an image processing unit (e.g., including image processing circuitry) 125, an audio processing unit (e.g., including audio processing circuitry) 140, and an audio output unit (e.g., including audio output circuitry) 150 compared to the display device 300 of FIG. 3B. Also, the display device 301 may further include at least one of a storage unit (e.g., including a memory) 161 and a user interface (e.g., including user interface circuitry) 170 compared to the display device 300 of FIG. 3B.

The communication interface 130 may include various communication circuitry and receive an image signal and an audio signal from a source device according to a connected protocol and may output the image signal and the audio signal to the image processing unit 125 and the audio processing unit 140 under the control of the processor 110.

The communication interface 130 may include at least one of at least one communication module for transmitting and receiving data and/or a signal to and from an external device (not shown) and at least one port. In detail, the communication interface 130 may include a communication unit 132 and an input/output unit 131.

The input/output unit 131 may include various input/output circuitry including, for example, at least one of a high-definition multimedia interface (HDMI) port (not shown), a component jack (not shown), a PC port (not shown), and a USB port. Also, the input/output unit 131 may include a combination of an HDMI port, a component jack, a PC port, and a USB port. In this case, the input/output unit 131 may directly receive video data (e.g., game content) to be played on the display device 301 through the HDMI port, the component jack, the PC port, or the USB port.

The communication unit 132 may include various communication circuitry and communicates with an external device through at least one wired or wireless communication network. In a disclosed embodiment, the communication unit 132 may communicate with a source device 501. In detail, the communication unit 132 may include at least one communication module and a communication circuit, and may transmit and receive data to and from an external device through the communication module and/or the communication circuit.

In a disclosed embodiment, the communication unit 132 may receive a first control signal from an external device (not shown) while first content is being played. For example, the communication unit 132 may receive the first control signal from a remote control device (not shown) while game content is being played through the display device 301.

The communication unit 132 may include at least one communication module (not shown) that performs communication according to a communication standard such as Bluetooth, Wi-Fi, BLE, NFC/RFID, Wi-Fi Direct, UWB, or ZIGBEE. Also, the communication unit 132 may include a communication module (not shown) that performs communication through a network for Internet communication. Also, the communication unit 132 may include a communication network that follows a communication standard such as 3G, 4G, 5G, and/or 6G.

For example, the communication unit 132 may include a communication module (e.g., an IR communication module) that may receive a control signal or a control command from a remote control device (not shown) located in a short distance. In this case, the communication unit 132 may receive a control command from the remote control device (not shown).

The image processing unit 125 may include various circuitry and process an image signal corresponding to content and may output the same to the display 120 under the control of the processor 110. For example, the image processing unit 125 may process an image signal corresponding game content received through the communication interface 130 and may output the same to the display 120 under the control of the processor 110.

For example, the image processing unit 125 may generate a user interface screen under the control of the processor 110. For example, the image processing unit 125 may generate a game home screen and a home menu screen described below and may output the same to the display 120 under the control of the processor 110.

For example, the image processing unit 125 may generate a plurality of images displayed on a plurality of partial areas split from a screen and may output the same to the display 120 under the control of the processor 110.

The display 120 may display an image signal received from the image processing unit 125 on a screen. For example, the display 120 may output a playback screen of game content (e.g., a screen including a game image).

The audio processing unit 140 may include various audio processing circuitry and convert an audio signal received from the communication interface 130 into an analog audio signal and may output the analog audio signal to the audio output unit 150 under the control of the processor 110.

The audio output unit 150 may include various audio output circuitry and output the received analog audio signal through a speaker.

The storage unit 161 may include a memory and store various data generated during an operation of the display device 301 and a program related to an operation of the display device 301. Alternatively, the storage unit 161 may store content received from an external device. Alternatively, the storage unit 161 may store data or information required for an operation of the display device 301.

The storage unit 161 may include at least one memory. The at least one memory may include at least one type of storage medium from among a flash memory type, a hard disk type, a multimedia card micro type, a card type memory (e.g., an SD or XD memory), a random-access memory (RAM) a static random-access memory (SRAM), a read-only memory (ROM), an electrically erasable programmable read-only memory (EEPROM), a programmable read-only memory (PROM), a magnetic memory, a magnetic disk, and an optical disk.

The user interface 170 may include various user interface circuitry and receive a user input for controlling the display device 301. The user interface 170 may include, but is not limited to, a user input device including a touch panel that detects a user's touch, a button that receives the user's push operation, a wheel that receives the user's rotation operation, a keyboard, and a dome switch.

The user interface 170 may include a voice recognition device (not shown) for voice recognition. For example, the voice recognition device may be a microphone, and the voice recognition device may receive the user's voice command or voice request. Accordingly, the processor 240 may control an operation corresponding to the voice command or the voice request to be performed.

The user interface 170 may include a motion detection sensor (not shown). For example, the motion detection sensor (not shown) may detect movement of the display device 301 and may receive the detected movement as a user input. Also, the voice recognition device (not shown) and the motion detection sensor (not shown) may not be included in the user interface 170 but may be included in the display device 301 as a module independent of the user interface 170.

In a disclosed embodiment, the processor 110 may control an overall operation of the display device 301, may process an image signal and an audio signal corresponding to game content and display the image signal and the audio signal on the display 120, and may control the image signal and the audio signal to be output through the audio output unit 150. For example, when game content is provided through a game application, the processor 110 may store and execute the game application. In another example, when a game application is stored in the storage unit 161, the processor 110 may control game content to be provided to the user by executing the game application stored in the storage unit 161.

FIG. 4A is a diagram illustrating example operations performed by a display device and screens output in response to the operations, according to various embodiments.

Figure 4B:
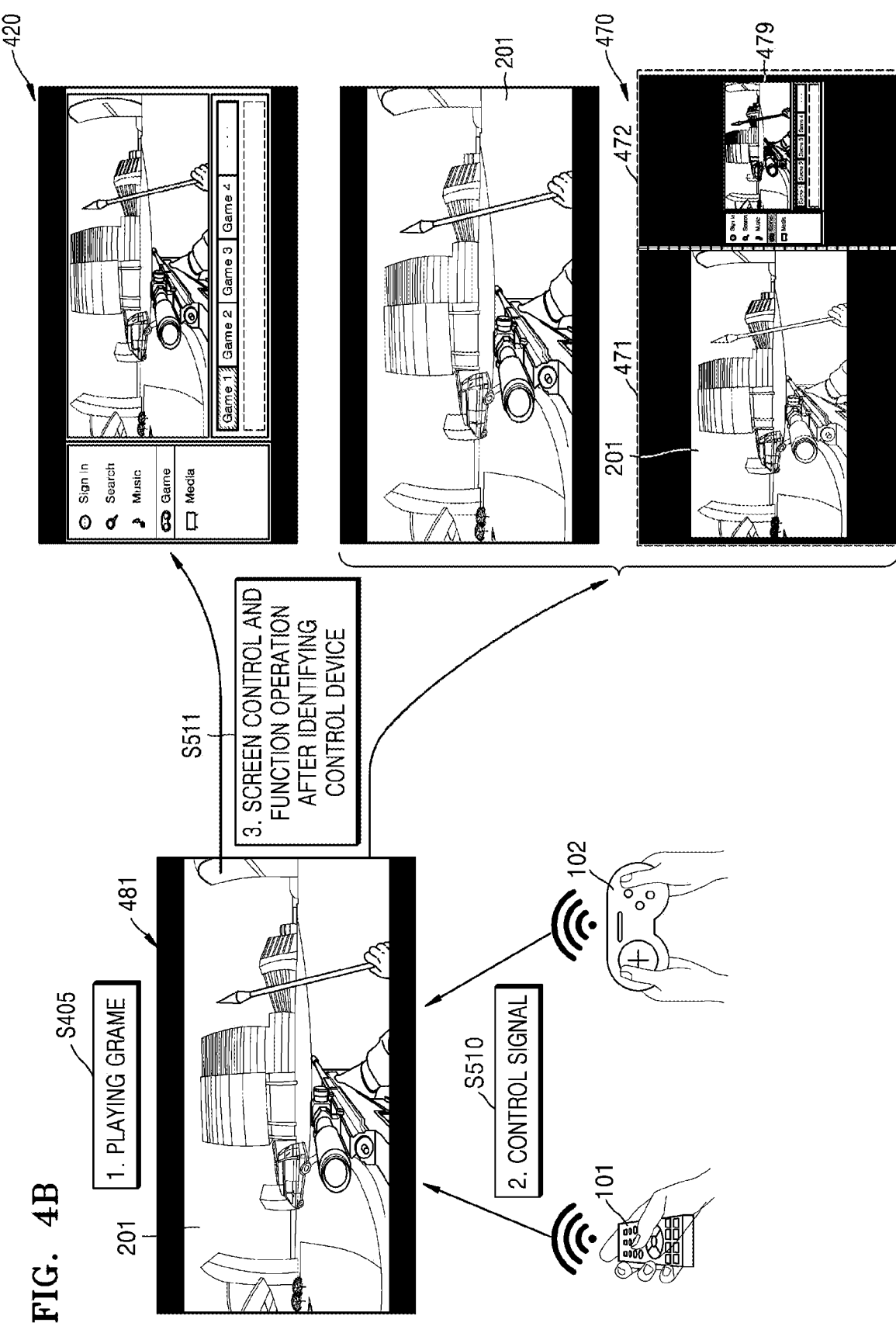
FIG. 4B is a diagram illustrating example operations performed by a display device and screens output in response to the operations, according to various embodiments.

FIG. 4B is a diagram illustrating example operations performed by a display device and screens output in response to the operations, according to various embodiments.

The same elements in FIGS. 4A and 4B as those in FIG. 3A may not be repeatedly described. Also, FIGS. 4A and 4B are diagrams illustrating an example operation performed by a display device (e.g., 100, 300) and an output full screen, according to various embodiments.

For convenience of explanation, the following will be described assuming that screens of FIGS. 4A and 4B are output from the display device 400 of FIG. 3B.

Referring to FIG. 4A, a first user who is a game user is playing a game through the display device 400 using the first control device 102 (S405). That is, the display device 400 is currently performing a game function.

Accordingly, the display device 400 displays a game playback screen 410 including the game image 201 corresponding to game content. While the display device 400 is executing or playing the game content, a first control signal may be received by the display device 400 (S510).

According to a disclosed embodiment, the processor 110 may identify a control device that transmits the first control signal, and then may perform a first operation or a second operation according to whether the identified control device is the first control device 102 or the second control device 101 (S511).

For example, the processor 110 may identify a control device that transmits the first control signal and may determine whether to execute an operation corresponding to the first control signal based on an identification result.

For example, when the processor 110 receives the first control signal from the first control device 102, the processor 110 may perform the first operation to output a first full screen by executing the first control signal. FIG. 4A illustrates an example where the first control signal is a control signal generated and transmitted in response to selection of a home key included in the first control device 102.

In a disclosed embodiment, when the display device 400 is playing game content and a home key is selected in a control device, a control signal for requesting to output a game home menu (e.g., 260 of FIG. 2E or 290 of FIG. 2F) may be generated and transmitted in response to the selected home key. Also, when the display 400 is not playing game content and a home key is selected in a control device, a control signal for requesting to output a home menu screen (e.g., 220 of FIG. 2A, 230 of FIG. 2B, 240 of FIG. 2C, or 250 of FIG. 2D) may be generated and transmitted in response to the selected home key.

In the above example, a user may select and input a home key included in the first control device 102 while game content is being played. Then, the first control device 102 may generate a first control signal corresponding to the selected home key and may transmit the first control signal to the display device 400. When the first control signal is received from the first control device 102, the processor 110 may output a game home screen 420 by executing the first control signal. The game home screen 420 corresponds to the game home screen 260 described with reference to FIG. 2E, and thus, a detailed description thereof will be omitted. Although a game image 450 of Game1 that is the same as a game that was previously being executed is displayed on the game home screen 420 in FIG. 4A, a game image (not shown) of a game (e.g., Game 3) different from the game that was previously being executed may be displayed instead of the game image 450. For example, when Game 3 is set as a basic game, a game image of Game 3 may be displayed instead of the game image 450 and information about Game 3 may be displayed in an area 475.

In a disclosed embodiment, the processor 110 may perform the second operation to maintain playback of the first content, based on the first control signal being received by the processor 110 from the second control device while the first content is being played. As the second operation is performed, the display device 300 may output a second full screen. Here, the second full screen may include a playback image of the first content. For example, the processor 110 may perform the second operation to maintain playback of the game content, based on the first control signal being received from the second control device 101 different from a game control device that is the first control device 102.

For example, the processor 110 may perform the second operation to ignore the first control signal while maintaining playback of the first content, based on the first control signal being received from the second control device while the first content is being played.

Referring to the example of FIG. 4A, the processor 110 may perform the second operation to ignore the first control signal while maintaining playback of the game content, based on the first control signal being received from the second control device 101 different from a game control device that is the first control device 102. Here, the second operation may be an operation of ignoring the first control signal while maintaining playback of the game content. Accordingly, a screen 401 that is a second full screen corresponding to the second operation may be output. That is, the screen 401 may be a screen where the game image 201 previously being played is output as a full screen.

In another example, the processor 110 may generate a first user interface screen corresponding to the first control signal, and may perform the second operation to output the first user interface screen through the display 120 while maintaining playback of the first content, based on the first control signal being received from the second control device while the first content is being played. The second operation may be an operation of generating the first user interface screen corresponding to the first control signal and outputting the first user interface screen through the display 120 while maintaining playback of the first content. Referring to the example of FIG. 4A, the processor 110 may execute the first control signal and may generate a game home screen 479 that is a first user interface screen in response to the first control signal. Also, because playback of the game content is maintained, the output of the game image 201 may be maintained. Accordingly, the processor 110 may operate to output a second full screen 470 including the game home screen 479 and the game image 201. For example, the second full screen 470 may include two partial areas or two partial screens 471 and 472, and the game home screen 479 and the game image 201 may be respectively displayed in the two partial screens 471 and 472.

In a disclosed embodiment, the display device 400 may simultaneously perform a plurality of tasks. The term 'task' is an element of a work executed or performed on a computing device and may refer to a unit of execution in a specific work of the computing device. Also, a task may refer to a process for performing a specific work, a thread for performing a specific work, or a program for performing a specific work. Also, concurrent execution of multiple tasks may be referred to as multi-tasking.

In a disclosed embodiment, the display device 400 may include the processor 110 capable of performing multi-tasking, and may simultaneously perform at least two tasks. For example, the display device 400 may simultaneously perform a playback operation of the game content and another operation corresponding to the received first control signal.

Referring to the example of FIG. 4A, when it is identified that the first control signal is received from the second control device 101, the processor 110 may control the second full screen 401 or 470 that maintains playback of the game content to be output.

For example, in order to output the second full screen 470, the processor 110 may simultaneously perform a task for playing the game content and a task for performing an operation corresponding to the first control signal.

For example, the processor 110 may maintain playback of the first content, based on the first control signal being received from the second control device 101. In a state where playback of the first content is maintained, the processor 110 may determine whether to a first partial screen corresponding to the first control signal, based on a result of identifying whether the first control signal is a control signal for requesting video output. The first partial screen may include a first user interface screen corresponding to the first control signal.

Also, the control signal for requesting video output may refer to a control signal for causing an image not included in a currently output full screen to be newly displayed when an operation corresponding to the control signal is performed. Alternatively, the control signal for requesting video output may refer to a control signal for causing a screen that is not completely the same as a currently output full screen (e.g., a game image) to be output when an operation corresponding to the control signal is performed. For example, the control signal for requesting video output may be a control signal generated when a home key for requesting to output a home menu screen is selected, a control signal generated when a setting key for requesting to output a setting screen is selected, or a control signal generated when a channel list key for requesting to output a content list is selected.

When it is identified that the first control signal is a control signal for requesting video output, the processor 110 may generate a first user interface screen while playback of the first content is maintained, and may control the display 120 to display a full screen (e.g., 470) including a playback screen (e.g., 471) of the first content and the first user interface screen (e.g., 472).

Referring to FIG. 4B, the same elements as those in FIG. 4A are denoted by the same reference numerals. Accordingly, a repeated description may not be repeated.

Although the game image 201 has the same aspect ratio as that of a full screen (e.g., 410) of the display 120 in FIG. 4A, as shown in the example of FIG. 4B, the game image 201 may have an aspect ratio different from that of a full screen 481 of the display 120. Accordingly, the full screen 481 may have a non-data area (e.g., a black area) as shown in FIG. 4B. FIG. 4B is the same as FIG. 4A except that an aspect ratio of the game image 201 and an aspect ratio of the full screen 481 of the display 120 are different from each other. Accordingly, a detailed description thereof will be omitted. Also, when the full screen 481 includes a black area, an example of a second full screen that may be output by the display device 400 will be described in greater detail below with reference to FIG. 13.

In another example, a control signal may be a control signal corresponding to a key (e.g., a setting key) for requesting to output a configuration menu. In this case, the control signal requests to output an interface screen including the configuration menu, and thus, may be referred to as a control signal for requesting video output. In the above embodiment, when the processor 110 receives the first control signal from the second control device 101, the processor 110 may maintain playback of the first content.

Because it is identified that the first control signal is a control signal for requesting video output, the processor 110 may generate a first user interface screen including a configuration menu (not shown) corresponding to the first control signal while playback of the game content is maintained, and may control the display 120 to display a second full screen including the first user interface screen including the configuration menu and a playback screen of the first content.

In a disclosed embodiment, the second full screen (e.g., 470) may be generated to have various arrangements or layouts. For example, the second full screen 470 may be split into the left partial screen 471 and the right partial screen 472, and the second full screen 470 may be generated to include the game image 201 and the first user interface screen 479. Here, the first user interface screen 479 may be a screen including a game home screen.

In another example, in a state where playback of the first content is maintained, the processor 110 may determine that the first control signal is a control signal that does not request video output, as a result of identifying whether the first control signal is a control signal for requesting video output. Then, based on the first control signal being identified not to be a control signal for requesting video output, the processor 110 may perform an operation corresponding to the first control signal in a background environment while playback of the first content is maintained.

For example, the control signal may be a control signal that does not request video output such as a control signal corresponding to a volume key for requesting to control a volume, a control signal corresponding to a recording key, or a control signal corresponding to a sound recording key. In this case, because there is no need to output a separate screen different from a current screen according to the control signal, the processor 110 may perform an operation corresponding to the first control signal in a background environment while playback of the first content is maintained, based on the first control signal being identified not to be a control signal for requesting video output. For example, when the control signal is a control generated by selecting a volume key for requesting volume up, the processor 110 may control the audio processing unit 140 and the audio output unit 150 to increase a volume of audio output while playback of the game content is maintained.

When the processor 110 performs the operation corresponding to the first control signal in the background environment, the processor 110 may control a message, a mark, or a sign indicating the operation performed in response to the first control signal to be output on the display 120 as a popup message, a floating window, or a sub-window. In the above example, the processor 110 may control the image processing unit 125 to output a popup message saying 'volume has been adjusted to 11' on a game playback screen temporarily or for a certain period of time (e.g., 3 seconds).

While a game user (e.g., a first user) is playing a game through the display device 100 using the first control device 102, a second user different from the first user who is the game user may select a certain key (e.g., a setting key) included in the second control device 101. Because the first user was playing the game through the display device 100, the first user may not have intended to stop playing the game. In this case, when playback of game content is stopped according to the second user's operation of the second control device 101, the first user currently playing the game using the display device 400 may feel uncomfortable or unpleasant.

In a disclosed embodiment, as described with reference to FIG. 4A, the intention of the first user currently using a certain function, service, or content through the display device 400 may be reflected and a received control signal may be processed so as not to interrupt the use of the content (e.g., game content) currently being used by the first user. Accordingly, a display device and a method of controlling the same according to a disclosed embodiment may increase the satisfaction of the first user by minimizing/reducing inconvenience of the first user who is currently using the certain function, service, or content through the display device.

When a control signal is generated by a user who is currently playing a game through the display device 400, a first control signal may be executed to immediately reflect the game user's intention. A game user who is currently playing a game through the display device 400 may be playing the game using the first control device 102 that is a game-specific control device. Accordingly, when a first control signal is received through the first control device 102 while game content is being played, it may refer, for example, to the game user receiving the game content inputs a certain request to the display device 400. Accordingly, the received first control signal may be executed to immediately reflect the request of the game user who is currently using the display device 400.

A display device and an operation method thereof according to a disclosed embodiment may process a control signal received from any one of a plurality of remote control devices so as not to stop playing a game regardless of the intention of a user who is currently playing the game through the display device 400. For example, when the display device 400 receives a first control signal from a control device, for example, the second control device 101, different from the first control device 102 that is a control device of a game user currently using game content, the display device 400 may maintain playback of the game content through screen splitting so that playback of the game content used by the game user is maintained without interruption. In another example, when a first control signal is received from the second control device 101, the display device 400 may ignore the first control signal so that playback of the game content used by the game user is maintained without interruption. Accordingly, the game being played is not suddenly stopped regardless of the intention of the user who is playing the game through the display device, thereby preventing/reducing the game user from experiencing inconvenience.

As described above, because a display device and an operation method thereof according to a disclosed embodiment processes a control signal received from any one of a plurality of control devices to meet the intention of a user using content currently being provided or played by the display device 400, the satisfaction and convenience of the user currently using the display device may be increased.

Figure 5A:
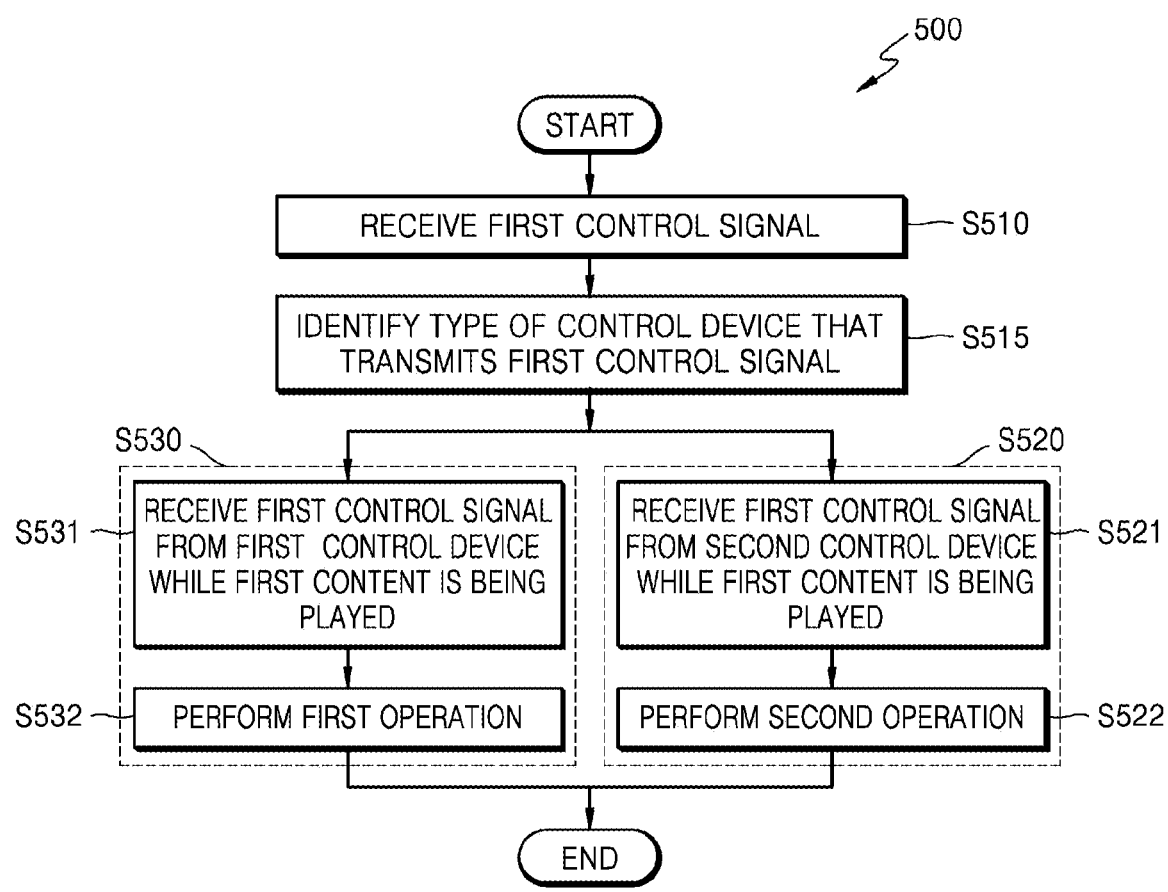
FIG. 5A is a flowchart illustrating an example method of operating a display device, according to various embodiments.

FIG. 5A is a flowchart illustrating an example method of operating a display device, according to various embodiments.

Hereinafter, an operation method 500 of a display device will be described with reference to FIGS. 5A and 4A. The operation method 500 of the display device of FIG. 5A may be a flowchart illustrating operations performed by the display device 100, 300 according to a disclosed embodiment described with reference to FIGS. 1 to 3B. Accordingly, when operations included in the operation method 500 of the display device are described, the same description as that made for operations of the display device 100, 300, or 301 of FIGS. 1 to 3B may not be repeated.

The following will be described assuming that the operation method 500 of the display device is performed by the display device 301 of FIG. 3B. In the operation method 500 of the display device, the following will be described assuming that a received control signal (e.g., a first control signal) is received from the first control device 102 or the second control device 101 described with reference to FIGS. 4A and 4B, and the same elements as those in FIGS. 4A and 4B are denoted by the same reference numerals. For example, operation S511 in FIGS. 4A and 4B may correspond to operations S515, S520, and S530.

In the operation method 500 of the display device, the following will be described assuming that first content that is content played on the display device 301 is game content, the first control device 102 is a game control device, and the second control device 101 is an integrated control device or a TV control device.

Referring to FIG. 5A, the operation method 500 of the display device may receive a first control signal through the communication interface 130 (e.g., the communication unit 132) of the display device 301 (S510). For example, the operation method 500 of the display device may receive the first control signal while first content is being played (S510). Operation S510 may be performed by the communication interface 130 under the control of the processor 110. For example, the communication unit 132 included in the communication interface 130 may receive the first control signal from any one of a plurality of control devices communicating with the display device 301 and configured to remotely control the display device 301 while game content is being played through the display device 301.

The operation method 500 of the display device may identify a type of a control device that transmits the first control signal (S515). Operation S515 may be performed by the processor 110. For example, the processor 110 may identify a type of a control device that transmits the first control signal according to whether the control device is a control device for exclusively performing control on a specific function, a specific service, and/or specific content which is currently being executed or played by the display device 300. For example, the processor 110 may identify whether the first control signal is received from the first control device 102 that is a control device for controlling game content that is currently being played.

The operation method 500 of the display device may perform a first operation to output a first full screen by executing the first control signal, based on the first control signal being received from the first control device while the first content is being played (S530). Operation S530 may be performed by the processor 110.

For example, in operation S530, when it is identified that the first control signal is received from the first control device while the first content is being played according to an identification result of operation S515 (S531), the first operation may be performed to output the first full screen by executing the first control signal (S532). For example, the first operation may include an operation of performing an operation requested by the first control signal.

For example, when it is identified that the first control signal is received from the first control device 102, the processor 110 may perform an operation requested by the first control signal. In detail, when a user who is currently playing a game through the display device 301 inputs a control signal through the first control device 102, it may be said that the first user wishes to perform an operation corresponding to the control signal on the display device 301 regardless of interruption of the game that is currently being played. Accordingly, when the first control signal is received from the first control device 102, the processor 110 may perform an operation corresponding to the first control signal without determining whether to maintain the content currently being played. For example, even when the first control signal is a control signal that stops playback of the content that is being played or outputs an interface screen that entirely covers a screen of the content that is being played, an operation corresponding to the first control signal may be performed without needing to maintain the content that is currently being played.

The operation method 500 of the display device may perform a second operation different from the first operation to output a second full screen different from the first full screen, based on the first control signal being received from the second control device while the first content is being played (S520). Operation S520 may be performed by the processor 110.

For example, in operation S520, when it is identified that the first control signal is received from the second control device while the first content is being played according to an identification result of operation S515 (S521), the second operation different from the first operation may be performed to output the second full screen different from the first full screen (S522).

For example, in operation S520, based on the first control signal being received from the second control device different from the first control device 102 for exclusively performing control related to the first content, an operation corresponding to the first control signal may be performed or the first control signal may be ignored while maintaining playback of the first content (S520). Operation S520 may be performed by the processor 110.

For example, the processor 110 may determine that the first control signal is received from the second control device 101 different from the first control device 102 for exclusively performing control related to the first content based on an identification result of operation S515. Then, the processor 110 may perform an operation corresponding to the first control signal while maintaining playback of the first content, based on the determination result.

By performing operation S520, in a disclosed embodiment, when a control signal is received from the second control device 101 different from a game control device used by a game user during game playback, it may be determined that the control signal is not a control signal generated by the game user currently using a game function. Accordingly, the second operation may be performed so that the game being played by the game user does not suddenly stop.

Figure 5B:
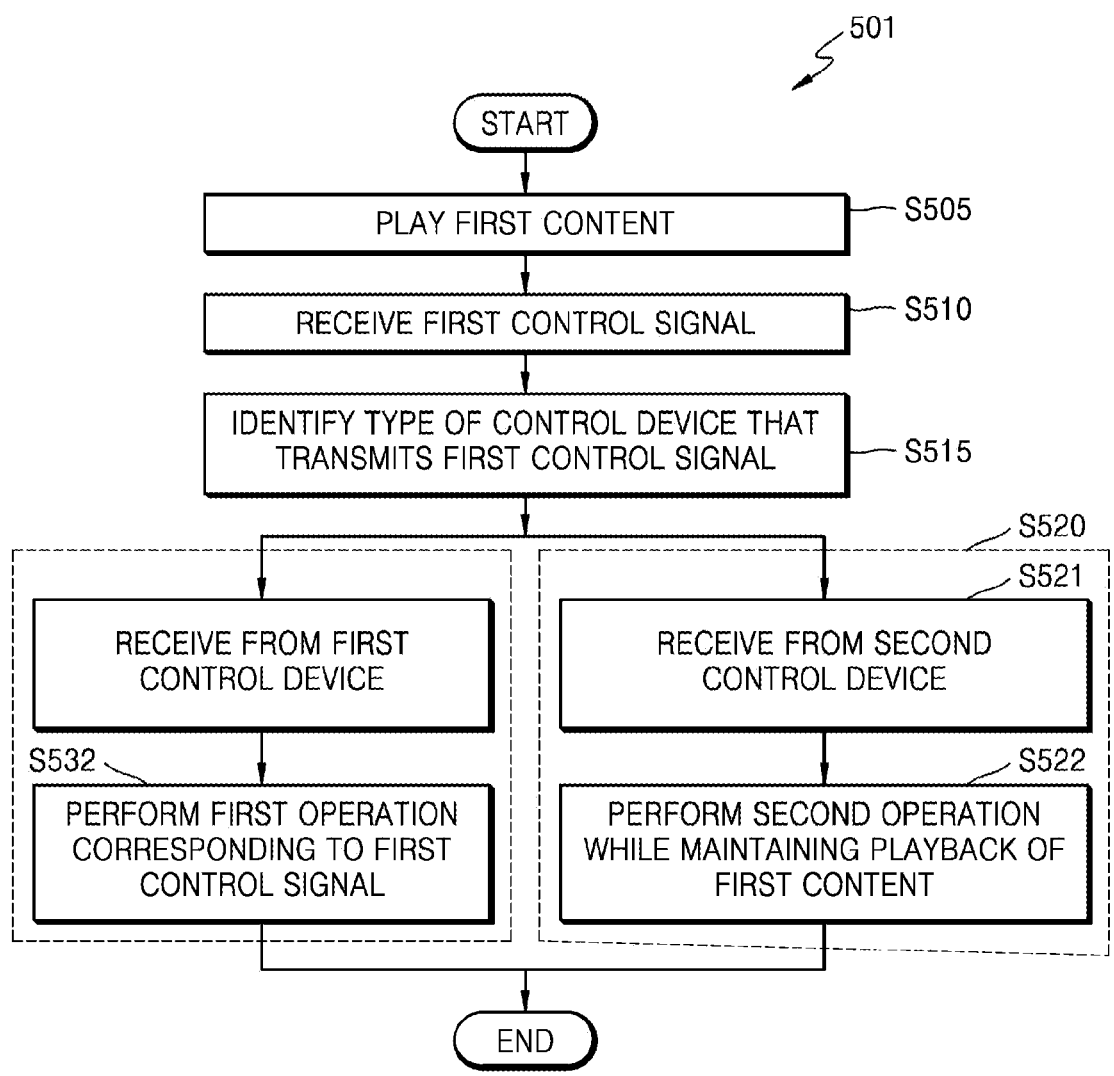
FIG. 5B is a flowchart illustrating an example method of operating a display device, according to various embodiments.

FIG. 5B is a flowchart illustrating an example method of operating a display device, according to various embodiments. The same elements in FIG. 5B as those in FIG. 5A are denoted by the same reference numerals.

Referring to FIG. 5B, an operation method 501 of a display device may further include operation S505 compared to the operation method 500 of the display device of FIG. 5A.

For example, the operation method 501 of the display device may start playing first content (S505). The processor 110 may provide content to a user based on the user's request.

For example, the processor 110 may start playing game content, and thus, the display 120 may display a playback image of the game content (e.g., the game image 201).

For example, the user may select desired game content through a game home screen (e.g., 260 of FIG. 2E). Accordingly, the processor 110 of the display device 301 may receive a user input that selects game content through the communication unit 132 or the user interface 170. Then, the processor 110 may execute a game application to play the selected game content, based on the received user input. Accordingly, the game application may start playing the game content.

Operation S510 and others performed after operation S505 have been described with reference to FIG. 5A, and thus, a detailed description may not be repeated here.

FIG. 6 is a flowchart illustrating an example method of operating a display device, according to various embodiments. An operation method 600 of a display device of FIG. 6 may be a flowchart illustrating operations performed by the display device 100, 300, or 301 according to a disclosed embodiment described with reference to FIGS. 1 to 3B. Accordingly, when operations included in the operation method 600 of the display device are described, the same description as that made for operations of the display device 100, 300, or 301 described with reference to FIGS. 1 to 5B may not be repeated.

The following will be described assuming that the operation method 600 of the display device is performed by the display device 301 of FIG. 3B.

Operations S610, S615, S620, and S630 of FIG. 6 may respectively correspond to operations S510, S515, S520, and S530 of FIGS. 5A and 5B. For example, first content, a first control signal, a first control device, and a second control device mentioned in the operation method 500 or 501 described with reference to FIGS. 5A and 5B may be respectively game content, a control signal generated and transmitted in response to selection of a home key, a game control device for exclusively controlling a game service, and a TV control device (or another control device other than the game control device, or an integrated control device) in the operation method 600 of the display device to be described with reference to FIG. 6.

Referring to FIG. 6, the method 600 of the display device may receive, by the display device 301, a first control signal corresponding to a home key while the display device 301 is executing or playing game content (S610).

The method 600 of the display device may identify a type of a control device that transmits the first control signal received in operation S610 (S615). For example, the processor 110 may identify whether a control device that transmits the first control signal is the first control device 102 that is a game control device or the second control device 101 different from the game control device. For example, the processor 110 may identify whether a control device that transmits the first control signal is the first control device 102 that is a game control device or another control device.

The method 600 of the display device may perform operation S630 or operation S620 based on an identification result of operation S615.

For example, in the method 600 of the display device, when the first control signal corresponding to the home key is received from the first control device 102 that is a game control device while the game content is being played (S631), a first full screen including a game home screen (e.g., 260 of FIG. 2E) including at least one menu related to a game may be output on the display 120 (S632). For example, based on the first control signal corresponding to the home key being received from the first control device 102 that is a game control device, the processor 110 may perform a first operation to output the first full screen including the game home screen (e.g., 260 of FIG. 2E) including at least one menu related to the game on the display 120 (S632).

For example, operation S632 may be performed under the control of the processor 110, which will be described in greater detail below with reference to FIGS. 7A, 7B and 7C.

In the method 600 of the display device, when the first control signal corresponding to the home key is received from the second control signal 101 that is a TV control device while the game content is being played (S621), a second full screen different from the first full screen is output while maintaining playback of the game content (S622). For example, based on the first control signal corresponding to the home key being received from the second control device 101, the processor 110 may perform a second operation to output the second full screen different from the first full screen to maintain output of a game image that was previously output on the display 120. In detail, the second operation may perform an operation corresponding to the first control signal or ignoring the first control signal while maintaining playback of the content.

For example, operation S622 may be performed under the control of the processor 110, which will be described below in detail with reference to FIGS. 4A, 4B, 7E, and 7F. The same elements in FIGS. 7A, 7B, 7C, 7D, 7E and 7F described below as those in FIGS. 2A to 4B are denoted by the same reference numerals, and thus, a repeated description thereof may not be repeated here.

Also, in a disclosed embodiment, screens illustrated in FIGS. 2A to 2F may be output according to control of a home application executed under the control of the processor 110 of the display device 301. For example, when a home key included in a remote control device (e.g., the first control device or the second control device) is selected, the remote control device may generate a first control signal corresponding to the home key. The first control signal generated in the remote control device and transmitted to the display device 301 may be a control signal for calling the home application. For example, the processor 110 may call the home application in response to the first control signal.

For example, when the processor 110 executes the first control signal without ignoring the first control signal, the processor 110 may call the home application by executing the first control signal.

For example, an application may refer to a program or a processor that performs a service, a function, or a specific operation. In detail, an application may include at least one instruction for performing a service, a function, or a specific operation. Also, an application may be stored in the storage unit 161 or the processor 110 included in the display device 301. In a disclosed embodiment, an application for controlling to output a home menu screen may be referred to as a 'home application'.

For example, a home application may be an application for controlling to output a home menu screen. Referring back to the example of FIG. 2C, a home application may control a home menu screen to be output based on a current operation state of the display device 301 in response to reception of a first control signal corresponding to a home key.

For example, when the display device 301 is currently playing game content, the home application may control a game home screen displaying a page corresponding to a game menu from among a plurality of menus corresponding to a plurality of categories included in the home menu screen to be output in response to reception of the first control signal corresponding to the home key.

In another example, when the display device 301 is not currently playing game content and is executing a function or a service unrelated to a game function, the home application may control a home menu screen (e.g., 240 of FIG. 2C) displaying a page corresponding to a basic menu (e.g., media menu 242 of FIG. 2C) from among a plurality of menus corresponding to a plurality of categories included in the home menu screen to be output in response to reception of the first control signal corresponding to the home key.

In another example, when the display device 301 is not currently playing game content but is outputting a screen related to a game function, the home application may control a game home screen to be output in response to reception of the first control signal corresponding to the home key. In detail, when the display device 400 is not currently playing game content but is outputting a user interface screen for game setting in relation to a game function, the home application may control a game home screen to be output in response to reception of the first control signal corresponding to the home key.

Alternatively, in a disclosed embodiment, when the display device 301 does not separately include a home application, operations performed by the home application may be performed by the processor 110. For example, the processor 110 may control a home menu screen or a game home screen to be output based on reception of a control signal corresponding to a home key.

Hereinafter, operations performed by the display device 301 when a first control signal corresponding to a home key is received will be described in greater detail below with reference to FIGS. 7A, 7B, 7C, 7D, 7E and 7F.

FIG. 7A is a diagram illustrating an example screen switching operation of a display device performed based on reception of a control signal according to various embodiments. In FIG. 7A, the same elements as those in FIGS. 2F and 6 are denoted by the same reference numerals.

Referring to the example of FIG. 7A, the display device 301 may display the game image 201 as a full screen 710 by executing game content. That is, the display device 301 is playing a game. While the game content is being played, a first control signal corresponding to a home key may be received by the display device 301 from the game control device 102 (S610). Accordingly, the processor 110 may perform a screen switching operation as shown in FIG. 7A.

For example, when it is identified that the first control signal corresponding to the home key is received from the game control device 1021 while the game content is being played (S631), the processor 110 may output the game home screen 290 that is a user interface screen corresponding to the first control signal by executing the first control signal corresponding to the home key (S632).

For example, when the control signal corresponding to the home key is received from the game control device 102, the received first control signal may be recognized as a control signal for requesting to output a game home screen (e.g., 260 of FIG. 2E). For example, the processor 110 may call a home application based on the received first control signal. The home application may control the game home screen 290 to be output as a first full screen. The game home screen 290 has been described in detail with reference to FIG. 2F, and thus, a detailed description thereof may not be repeated here.

Figure 7B:
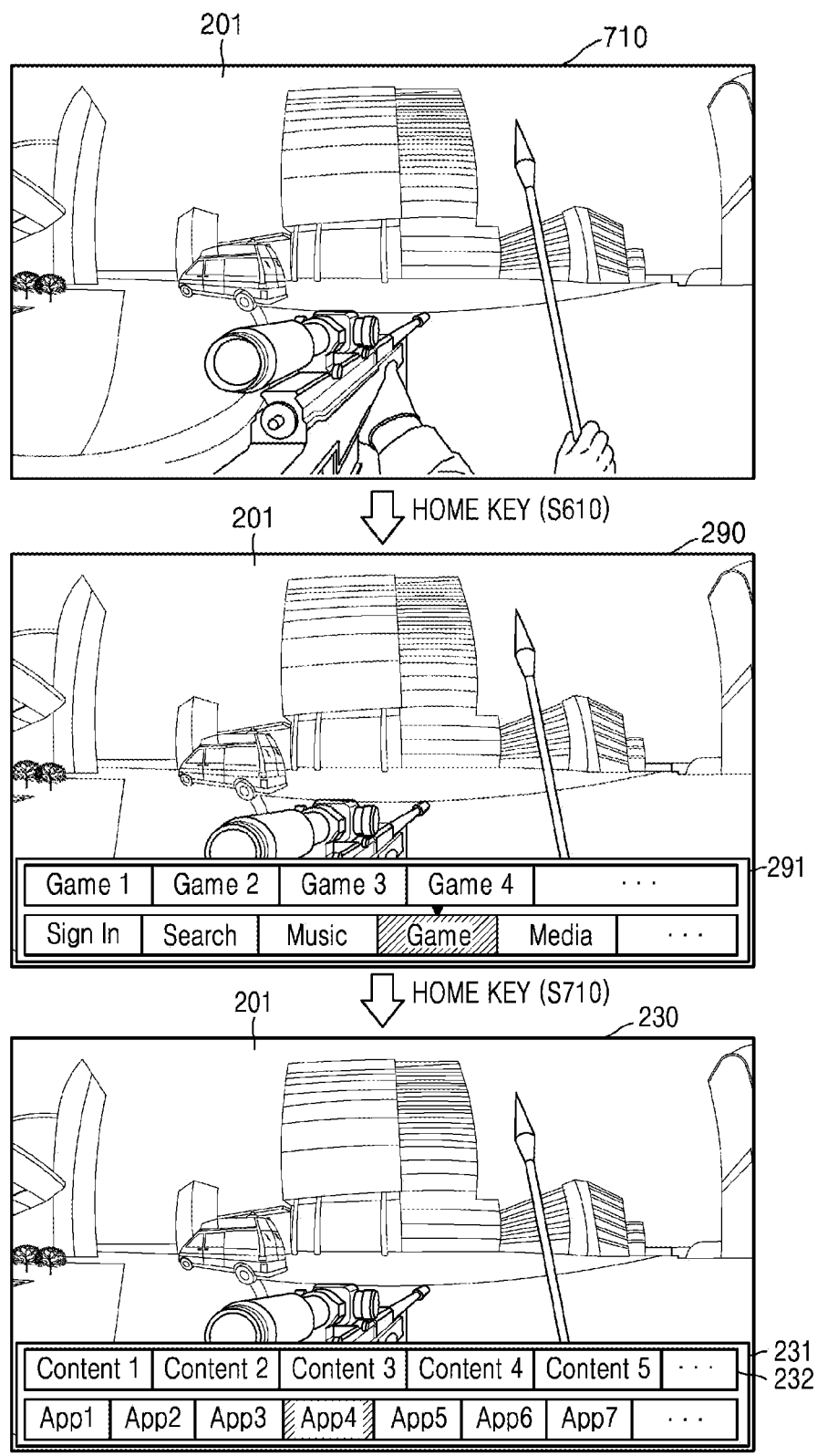
FIG. 7B is a diagram illustrating an example screen switching operation of a display device performed based on reception of a control signal according to various embodiments.

FIG. 7B is a diagram illustrating an example screen switching operation of a display device performed based on reception of a control signal according to various embodiments. In FIG. 7B, the same elements as those in FIG. 7A are denoted by the same reference numerals.

In operation S622, after the game home screen 290 is output as a first full screen, when a home key is selected from the game control device 102, the game control device 102 may generate a control signal corresponding to the home key and may transmit the control signal to the display device 301. Accordingly, the processor 110 may receive the control signal corresponding to the home key (S710). Then, the processor 110 may stop outputting the game home screen 290 and control a home menu screen (e.g., 230) to be output based on the received control signal.

In the example of FIG. 7B, when the first control signal corresponding to the home key is received from the game control device 102 while the game image 201 is being displayed according to playback of game content, the intention of a game user is most likely to access a home related to a game. Accordingly, in a disclosed embodiment, the game home screen 290 may be output to meet the intention of the game user. Also, after the game home screen 290 is output, when the first control signal corresponding to the home key is received from the game control device 102, the intention of the game user is highly like to access a general home, that is, a home menu screen, rather than the game home screen 290 that is currently being output. Accordingly, in a disclosed embodiment, the home menu screen 230 may be output to meet the intention of the game user. Also, in FIG. 7B, although the home menu screen 230 is a home menu screen described with reference to FIG. 2B, the home menu screen 220, 240, or 250 illustrated in FIG. 2A, 2C, or 2D, instead of the home menu screen 230 may be displayed as a full screen.

Figure 7C:
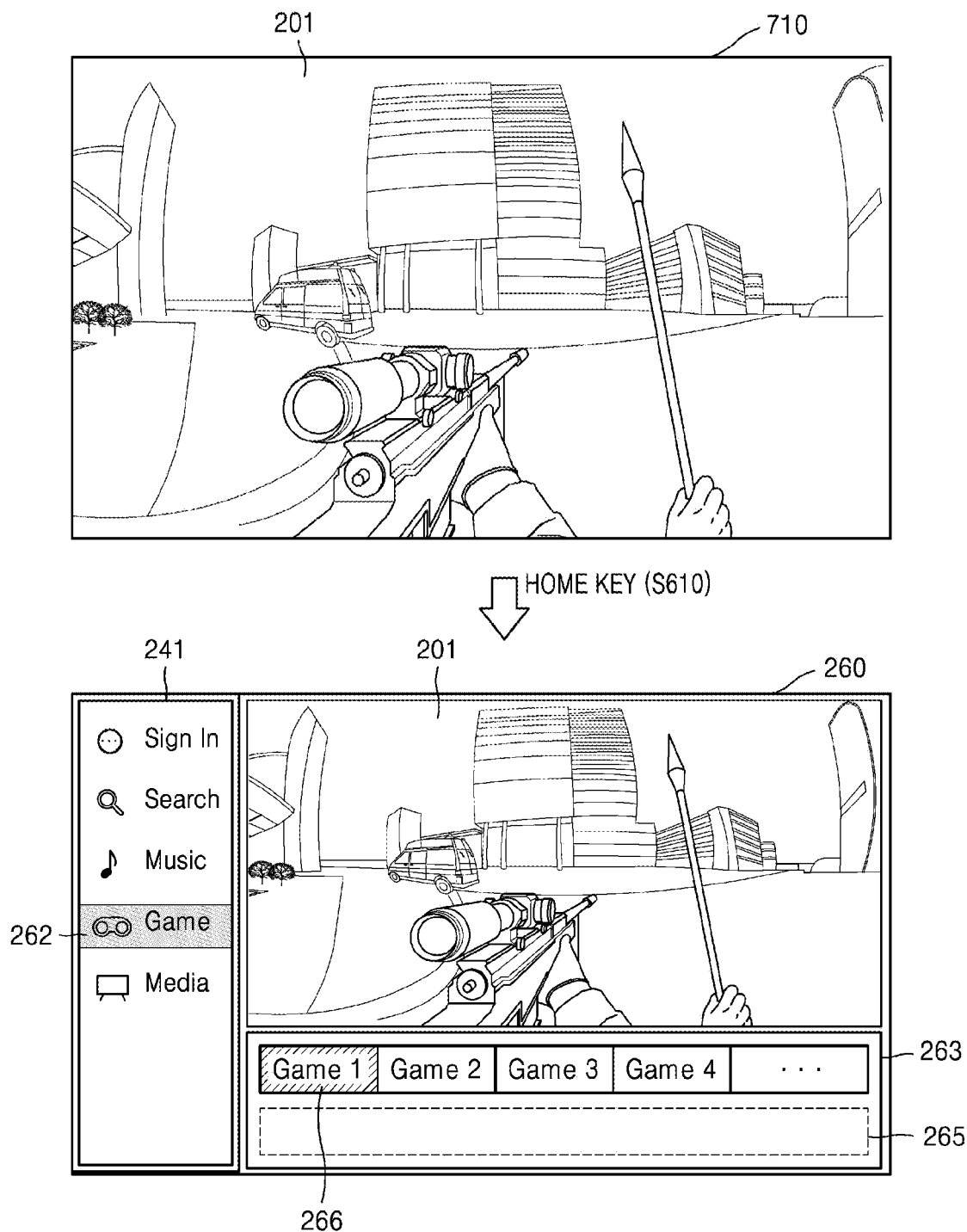
FIG. 7C is a diagram illustrating an example screen switching operation of a display device performed based on reception of a control signal according to various embodiments.

FIG. 7C is a diagram illustrating an example screen switching operation of a display device performed based on reception of a control signal according to various embodiments. In FIG. 7C, the same elements as those in FIGS. 2E and 7A are denoted by the same reference numerals.

For example, when it is identified that a first control signal corresponding to a home key is received from the game control device 102 while game content is being played (S631), the processor 110 may output the game home screen 260 that is a user interface screen corresponding to the first control signal by executing the first control signal corresponding to the home key (S632).

For example, when the control signal corresponding to the home key is received from the game control device 102, the received first control signal may be recognized as a control signal for requesting to output a game home screen (e.g., 260 of FIG. 2E). For example, the processor 110 may call a home application based on the received first control signal. The home application may control the game home screen 260 displaying a page corresponding to the game menu 262 from among a plurality of menus corresponding to a plurality of categories included in a home menu screen to be output as a first full screen. The game home screen 260 has been described in detail with reference to FIG. 2E, and thus, a detailed description thereof will be omitted.

Figure 7D:
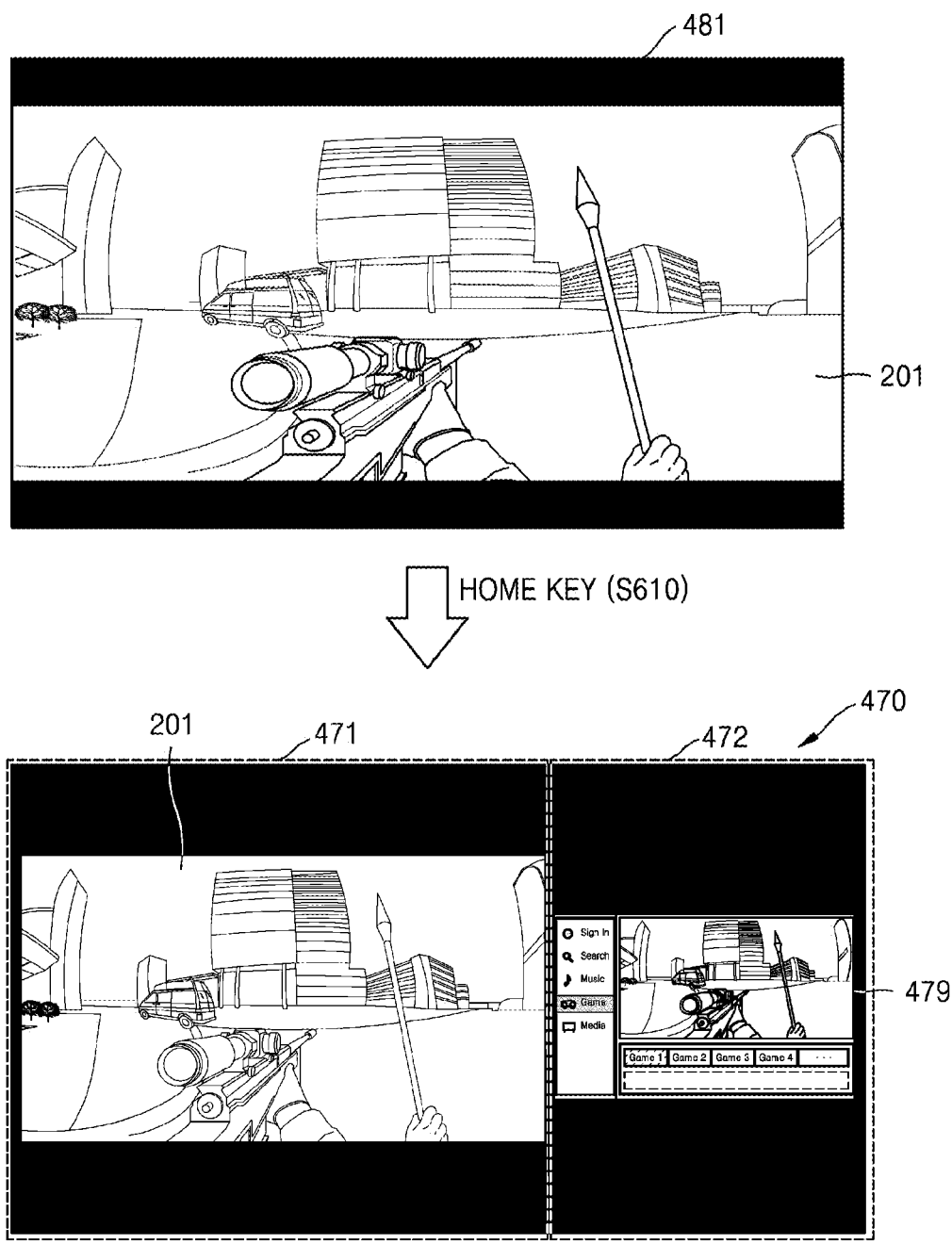
FIG. 7D is a diagram illustrating an example screen switching operation of a display device performed based on reception of a control signal according to various embodiments.

FIG. 7D is a diagram illustrating an example screen switching operation of a display device performed based on reception of a control signal according to various embodiments. In FIG. 7B, the same elements as those in FIGS. 4B and 6 are denoted by the same reference numerals.

Referring to the example of FIG. 7D, the display device 301 may display the game image 201 as the full screen 481 by executing game content. That is, the display device 301 is playing a game. While the game content is being played, the display device 301 may receive a first control signal corresponding to a home key from the TV control device 101 (S510 and S610). Accordingly, the processor 110 may perform a screen switching operation as shown in FIG. 7D.

Referring to FIG. 7D, the processor 110 may perform a second operation to output a game home screen through the display 120 while maintaining playback of the game content. The second operation may be an operation of generating the game home screen 479 corresponding to the first control signal and outputting the game home screen 479 through the display 120 while maintaining playback of the game content.

Referring to the example of FIG. 7D, the processor 110 may control the game home screen 479 corresponding to the first control signal to be generated by executing the first control signal. Also, because playback of the game content is maintained, the output of the game image 201 may be maintained. Accordingly, the processor 110 may operate to output the second full screen 470 including the game image 201 and the game home screen 479.

For example, the processor 110 may perform a screen splitting operation to generate a full screen including two partial areas. A screen splitting operation may be an operation of splitting a full screen into a plurality of partial areas and displaying a plurality of images in the divided plurality of partial areas. An operation of generating and outputting a full screen according to screen splitting will be described in greater detail below with reference to FIGS. 10 to 12 and 15.

For example, the second full screen 470 may include two partial areas or two partial screens 471 and 472, and the display 120 may respectively display the game home screen 479 and the game image 201 in the two partial screens 471 and 472 under the control of the processor 110. Although the game home screen 479 is displayed in one partial screen 472 in FIG. 7D, the game home screen 479 may have the same or similar form as the game home screen 260 or 290 of FIG. 2E or 2F.

Figure 7E:
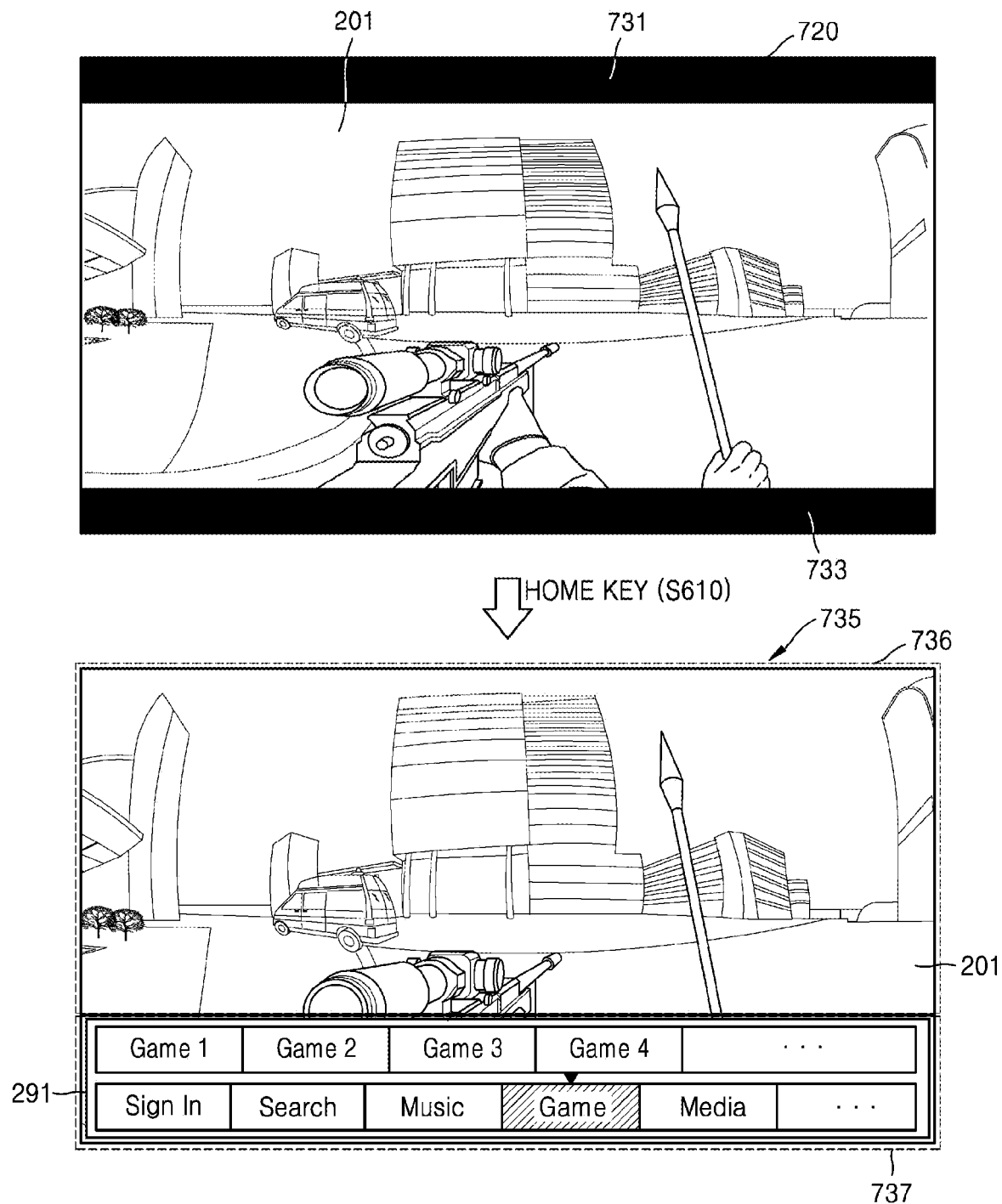
FIG. 7E is a diagram illustrating an example screen switching operation of a display device performed based on reception of a control signal according to various embodiments.

FIG. 7E is a diagram illustrating an example screen switching operation of a display device performed based on reception of a control signal according to various embodiments. In FIG. 7E, the same elements as those in FIGS. 2F, 4B, and 6 are denoted by the same reference numerals.

As in the example of FIG. 4B, when an aspect ratio of the game image 201 and an aspect ratio of a full screen 720 of the display 120 are different from each other, the full screen 720 may include a non-data area. For example, the non-data area may not be an area where a meaningful image is displayed, and the non-data area may include black areas 731 and 733.

Referring to the example of FIG. 7E, when the full screen 720 includes a black area, the display device 301 may output a second full screen 735 different from a first full screen while maintaining playback of game content (S622).

For example, when a user interface screen (e.g., a game home screen) corresponding to a first control signal may be located in an area corresponding to the black areas 731 and 733, as shown, the processor 110 may control the image processing unit 125 and the display 120 to generate and display the full screen 735 including the user interface screen corresponding to the first control signal (e.g., a game home screen 291) and the playback image 201 of the game content in an area 737 including the black areas 731 and 733. For example, the playback image 201 may be displayed in a portion of the full screen other than the black areas 731 and 733.

Operations of displaying a user interface screen corresponding to a first control signal in an area corresponding to a black area will be described in greater detail below with reference to FIG. 13.

Figure 8:
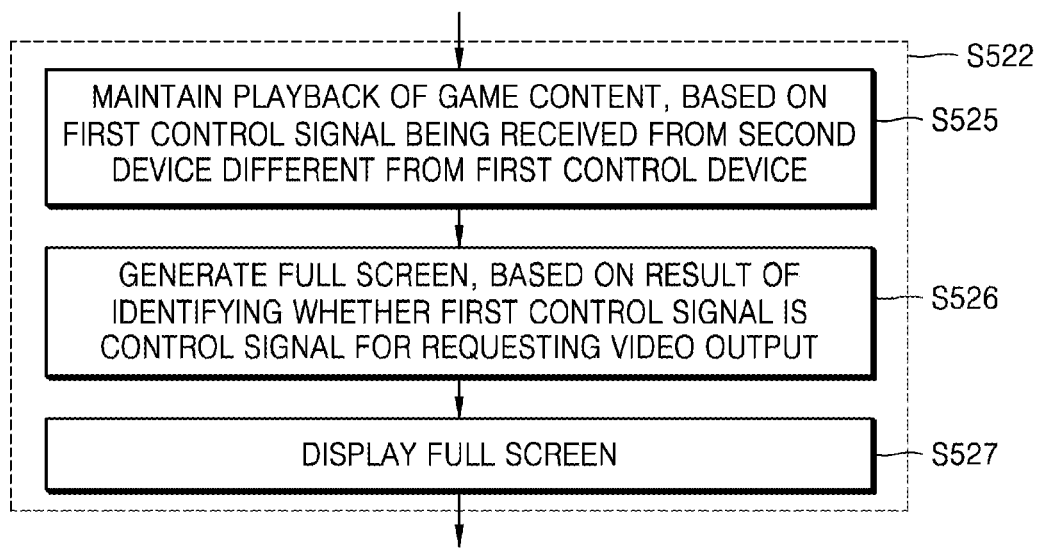
FIG. 8 is a flowchart illustrating an example of operation S522 of FIG. 5A according to various embodiments.

FIG. 8 is a flowchart illustrating an example method of operating a display device, according to various embodiments. In FIG. 8, the same elements as those in FIG. 5A are denoted by the same reference numerals. Hence, when operations illustrated in FIG. 8 are described, the same description as that made with reference to FIGS. 1 to 5A may not be repeated.

Also, the following will be described assuming that an operation method 800 of a display device is performed by the display device 301 of FIG. 3B and first content is game content.

Referring to FIG. 8, operation S520 included in the operation method 800 of the display device may include operations S525, S526, and S527.

Referring to FIG. 8, the operation method 800 of the display device may determine that a first control signal is received from the second control device 101 according to an identification result of operation S515. The operation method 800 of the display device may maintain playback of first content based on the first control signal being received from the second control device 101 (S525). For example, the processor 110 may maintain playback of the first content based on the first control signal being received from the second control device 101.

The operation method 800 of the display device may generate a full screen based on a result of identifying whether the first control signal is a control signal for requesting video output (S526). Operation S526 may be performed by the image processing unit 125 under the control of the processor 110. For example, when the control signal is a control signal for requesting video output, a full screen may be generated to include a video to be output in response to the control signal. When the control signal is a control signal that does not request video output, there is no video to be output in response to the control signal, and thus, a full screen may be generated to include only a playback screen of the game content whose playback is maintained in operation S525. For example, a meaningful image included in the full image may be only the playback image of the game content. Alternatively, a black screen (black display area) may be included in the full screen according to a resolution and an aspect ratio of an image output from the game content. For example, when a ratio between a horizontal length and a vertical length of the full screen is 16:9 or a ratio between a horizontal length and a vertical length of the image of the game content is 21:9, an upper portion and a lower portion of the full screen may be displayed as black screens.

The operation method 800 of the display device may display the full screen generated in operation S526 on the display 120 (S527). Operation S526 may be performed by the display 120 under the control of the processor 110.

When the first control signal is identified as a control signal for requesting video output in operation S526, the full screen including video output corresponding to the first control signal and a playback screen of the first content may be generated (S526).

For example, there are two methods to perform the video output corresponding to the first control signal while maintaining playback of the first content (S526).

The processor 110 may display the video output corresponding to the first control signal in a partial area of the playback screen of the first content while maintaining the playback screen of the first content. For example, when it is identified that the first control signal is a control signal for requesting video output, the processor 110 may generate a first partial screen while playback of the first content is maintained, and may control the display 120 to display a full screen displaying the first partial screen in a partial area of the playback screen of the first content. For convenience of explanation, this method will be referred to as an 'overlapping display method', which will be described below in detail with reference to FIG. 13. For example, the first partial screen may be a first user interface screen itself including the video output corresponding to the first control signal or a screen including the first user interface screen.

A full screen may be split into a plurality of partial screens, and the video output corresponding to the first control signal and the playback screen of the first content may be respectively displayed in the plurality of partial screens. For example, when it is identified that the first control signal is a control signal for requesting video output corresponding to a full screen, the processor 110 may split a screen of the display device into a plurality of partial screens and may control the playback screen and the first user interface screen to be respectively output on the plurality of partial screens. For convenience of explanation, this method will be referred to as a 'screen splitting display method', which will be described below in detail with reference to FIGS. 9, 10, 15, and 16.

When it is identified that the first control signal is a control signal for requesting video output, the processor 110 may determine whether to perform video output corresponding to the first control signal using an overlapping display method or a screen splitting method.

For example, based on at least one of an attribute of the first control signal, an attribute of video output corresponding to the first control signal, and an attribute of an application executed in response to the first control signal, the processor 110 may determine whether to display the video output corresponding to the first control signal using an overlapping display method or a screen splitting method.

For example, based on at least one of an attribute of the first control signal, an attribute of video output corresponding to the first control signal, and an attribute of an application executed in response to the first control signal, when the video output corresponding to the first control signal is a video output to be output as a full screen, the video output corresponding to the first control signal may not overlap a playback screen of the first content. This is because the video output corresponding to the first control signal is output as a full screen, and thus, the playback screen of the first content is completely covered. Accordingly, when it is determined or identified that the video output corresponding to the first control signal is video output to be output as a full screen, the processor 110 may control the video output corresponding to the first control signal to be displayed using a screen splitting method.

For example, when the first control signal is a control signal for requesting to output a full screen (e.g., when the first control signal is generated according to selection of a home key that requests to output a home menu screen displayed as a full screen), an attribute of the first control signal may include that output of a home menu screen is indicated and the home menu screen is a full screen. When the video output corresponding to the first control signal is identified as a full screen based on the attribute of the first control signal, the processor 110 may determine to display the video output corresponding to the first control signal using a screen splitting method rather than an overlapping display method.

Also, based on at least one of an attribute of the first control signal, an attribute of video output corresponding to the first control signal, and an attribute of an application executed in response to the first control signal, when the video output corresponding to the first control signal is a video output to be output on a partial area of a full screen, the video output corresponding to the first control signal may be displayed overlapping on a playback screen of the first content.

Accordingly, when it is determined or identified that the video output corresponding to the first control signal is displayed on only a portion of a full screen, the processor 110 may control the video output corresponding to the first control signal to be displayed using an overlapping display method.

Figure 9:
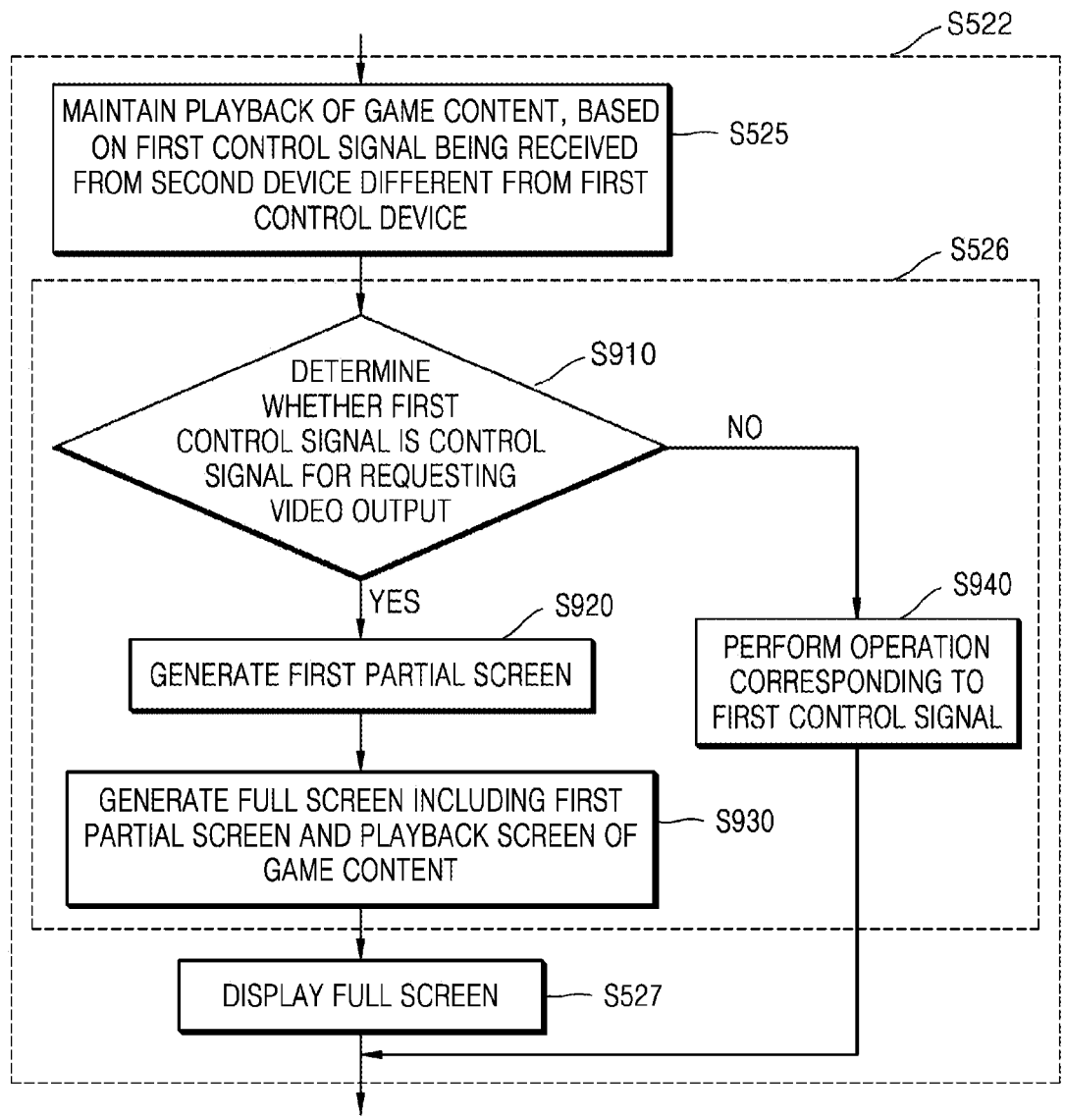
FIG. 9 is a flowchart illustrating an example of operation S522 of FIG. 5A according to various embodiments.

FIG. 9 is a flowchart illustrating an example method of operating a display device, according to various embodiments.

In FIG. 9, the same elements as those in FIG. 8 are denoted by the same reference numerals. Hence, when operations illustrated in FIG. 9 are described, the same description as that made with reference to FIGS. 1 to 8 may not be repeated. Also, the following will be described assuming that the operation method 800 of the display device is performed by the display device 301 of FIG. 3B and first content is game content.

Referring to FIG. 9, operation S526 included in an operation method 900 of a display device may include operations S910, S920, S930, and S940.

Referring to FIG. 9, after operation S525, the operation method 900 of the display device may identify whether a first control signal is a control signal for requesting video output (S910). For example, operation S910 may be performed by the processor 110.

For example, in a state where playback of first content is maintained, based on a result of identifying whether the first control signal is a control signal for requesting video output, the processor 110 may determine whether to generate a first user interface screen corresponding to the first control signal.

When it is identified in operation S910 that the first control signal is a control signal for requesting video output, the operation method 900 of the display device may generate a first user interface screen corresponding to the first control signal (S920). For example, when it is identified that the first control signal is a control signal for requesting video output, the processor 110 may generate the first user interface screen while playback of game content that is the first content is maintained.

The operation method 900 of the display device may generate a full screen including the first user interface screen generated inn operation S920 and a playback screen of the game content (S930).

Referring again to the second full screen 470 of FIG. 7D as an example, a control signal may be a control generated in response to selection of a home key. A control signal received during playback of game content requests to output a game home screen, and thus, may be referred to as a control signal for requesting video output. In the above example, when the first control signal is received from the second control device 101, the processor 110 may maintain playback of the first content. Also, because the first control signal is identified as a control signal for requesting video output, the processor 110 may generate the game home screen 479 corresponding to the first control signal while playback of the game content is maintained (S920), and may control the display 120 to display the full screen 470 including the partial screen 472 including the game home screen 479 and the partial screen 471 including the game image 201 that is a playback screen of the game content.

For example, the processor 110 may perform screen splitting to generate the full screen 470. In detail, in operation S910, the processor 110 may perform screen splitting based on the first control signal being identified as a control signal for requesting video output.

Screen splitting may refer to splitting a full screen of the display device 301 into a plurality of partial screens. A 'screen' of the display device 301 to be split may refer to the display 120 itself included in the display device 301 or a full area or a full screen of the display 120. In detail, a 'screen' of the display device 301 to be split may refer to a full area of the display 120 where an image may be displayed.

For example, when the first control signal is identified as a control signal for requesting video output, the processor 110 may perform screen splitting to split a full screen into two partial screens. For example, the processor 110 may split a full screen into two partial screens and may respectively display a playback screen of game content and a first user interface screen in the two partial screens.

Also, when the first control signal is identified as a control signal for requesting video output displayed as a full screen, the processor 110 may split a screen of the display device 301 into a plurality of partial screens and may control a playback screen of first content and a first user interface screen corresponding to the first control signal to be respectively displayed in the plurality of partial screens.

For example, whether 'a control signal is a control signal for requesting video output displayed as a full screen' may be determined according to at least one of an attribute of the control signal and an attribute of an interface screen output by the control signal. When the interface screen to be output by the control signal has the same size as a full screen, the control signal may be determined as a 'control signal for requesting video output corresponding to a full screen'.

Also, even when a size of the interface screen to be output by the control signal is less than that of a full screen, the control signal may be determined as a 'control signal for requesting video output corresponding to a full screen'. For example, when an attribute of the interface screen output by the control signal is output to a central area of a full screen by a certain size or more, the interface screen output by the control signal may be determined as a full screen. For example, the attribute of the interface screen may include information about a resolution, a size, and an aspect ratio of the interface screen. Also, when the control signal is received, the processor 110 may obtain the attribute of the interface screen according to the control signal.

For example, referring to a full screen illustrated in FIG. 2C, because the home menu screen 240 is output as a full screen 240, the game image 201 that was previously displayed is completely covered.

In another example, referring to the full screen 270 illustrated in FIG. 2G, the TV setting screen 271 included in the full screen 270 has a size less than that of the full screen 270. However, due to the TV setting screen 271, the game image 201 output on the full screen 270 is completely covered and may hardly be seen.

As in the above example, in the case of a user interface screen (e.g., the home menu screen 240) output as a full screen or a user interface screen (e.g., the TV setting screen 271) output on an area over a certain percentage of a full screen, the first control signal may be determined as a control signal for requesting video output corresponding to a full screen.

Also, when it is identified in operation S910 that the first control signal is a control signal that does not request video output, the operation method 900 of the display device may perform an operation corresponding to the first control signal while playback of the game content is maintained (S940).

Also, the full screen that is split may have various layouts. A layout of a full screen will be described in greater detail below with reference to FIG. 10.

Figure 10:
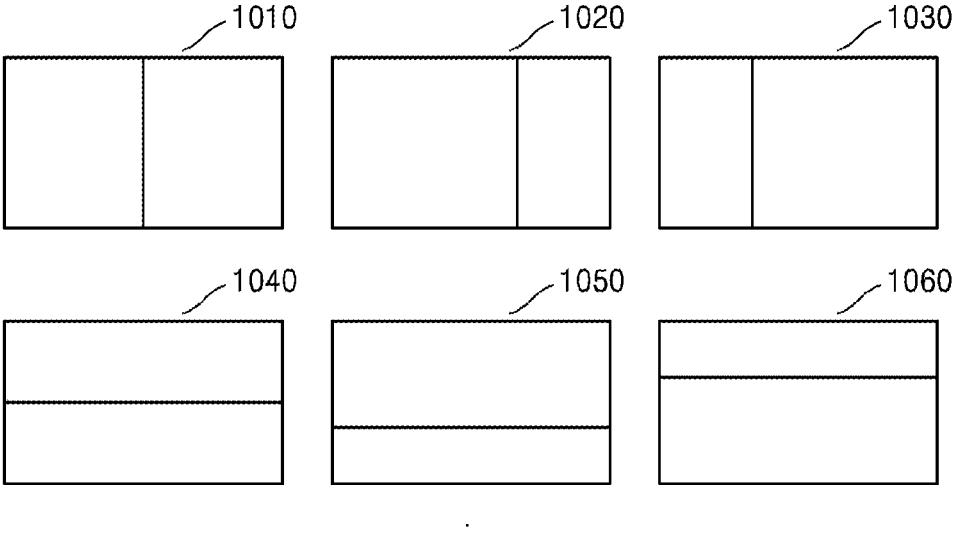
FIG. 10 is a diagram illustrating an example screen splitting operation performed by a display device, according to various embodiments.

FIG. 10 is a diagram illustrating an example screen splitting operation performed by a display device, according to various embodiments.

The processor 110 may perform screen splitting to generate a full screen including a first partial screen and a screen corresponding to first content. The full screen that is split may have various layouts 1010, 1020, 1030, 1040, 1050, and 1060 as shown in FIG. 10. Also, the full screen that is split does not have a pre-determined layout and may be set based on at least one of a shape, a resolution, an aspect, and a size of an effective data area of at least one of a partial screen and a playback screen of game content.

For example, the processor 110 may determine a layout of a playback screen of first content and a first partial screen corresponding to a first control signal in a full screen, based on a resolution of an image corresponding to the first content. A layout may include an arrangement structure of two partial screens, arrangement areas, and sizes of the two partial screens.

In another example, the processor 110 may determine a layout of a playback screen of first content and a first partial screen corresponding to a first control signal in a full screen, based on at least one of a resolution of an image corresponding to the first content and an attribute of an output screen requested by the first control signal.

Figure 11:
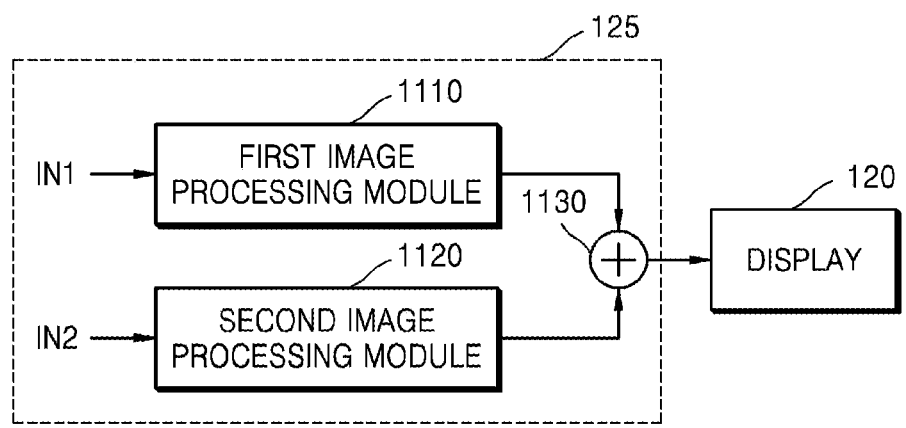
FIG. 11 is a diagram illustrating an example configuration of an image processing unit included in a display device, according to various embodiments.

FIG. 11 is a diagram illustrating an example configuration of an image processing unit included in a display device, according to various embodiments. In FIG. 11, the same elements as those in FIGS. 3A and 3B are denoted by the same reference numerals.

When a full screen includes a plurality of partial screens as described with reference to FIG. 10, a plurality of views are included in one screen, and thus, the full screen may be referred to as a multi-view screen.

To generate a multi-view screen, the image processing unit 125 may include a plurality of image processing modules. Although the image processing unit 125 includes two image processing modules (e.g., 1110 and 1120) in FIG. 10, the image processing unit 125 may include two or more image processing modules.

As described above, when a full screen including a playback screen corresponding to first content and a first partial screen corresponding to a first control signal is to be output, the image processing unit 125 may generate the playback screen and the first partial screen and may generate one full screen by combining the playback screen with the first partial screen under the control of the processor 110.

Referring to FIG. 11, the image processing unit 125 may include a plurality of image processing modules (e.g., 1110 and 1120) which are connected in parallel and a mixer 1130 configured to generate one full screen by mixing images output from the plurality of image processing modules. Each of the modules may include various circuitry and/or executable program instructions.

For example, the image processing unit 125 may include a first image processing module 1110 and a second image processing module 1120.

The first image processing module 1110 may receive an image signal IN1 corresponding to first content and may generate and output an image indicating a playback screen of the first content based on the received image signal IN1.

The second image processing module 1120 may receive an image signal IN2 for generating an image corresponding to a first control signal and may generate and output the image corresponding to the first control signal based on the received image signal IN2.

The mixer 1130 may mix the image output from the first image processing module 1110 with the image output from the second image processing module 1120 and output the same to the display 120. Accordingly, the display 120 may display a full screen including a playback screen of the first content and a partial screen corresponding to the first control signal.

Figure 12:
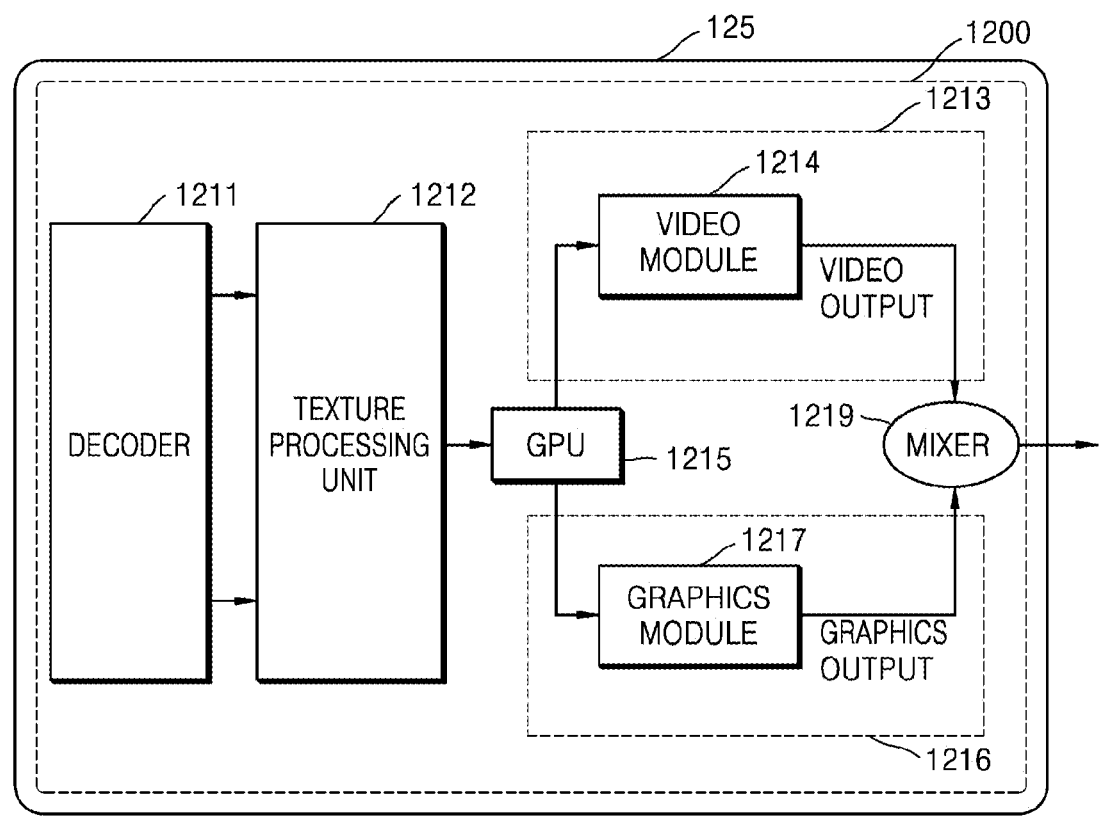
FIG. 12 is a diagram illustrating an example configuration of an image processing unit included in a display device, according to various embodiments.

FIG. 12 is a block diagram illustrating an example configuration of an image processing unit included in a display device, according to various embodiments. FIG. 12 is a diagram describing each of a plurality of image processing modules (e.g., 1110 and 1120) included in the image processing unit 125 described with reference to FIG. 1.

Referring to FIG. 12, a block 1200 represents a detailed configuration of each of the plurality of image processing modules (e.g., 1110 and 1120) included in the image processing unit 125. The plurality of image processing modules (e.g., 1110 and 1120) included in the image processing unit 125 may have the same configuration and shape. In FIG. 12, the following will be described assuming that the block 1200 is the first image processing module 1110 described with reference to FIG. 11. Also, the following will be described assuming that the image processing unit 125 of FIG. 12 is included in the display device 301.

A screen output from the display device 301 may be an image generated by mixing two different images as shown in the full screen 220 of FIG. 2A.

Referring back to FIG. 2A, the game image 201 may be entirely displayed on a screen and the home menu screen 221 may be displayed on the game image 201 to output the full screen 220. In this case, in order to generate and output the full screen 220, the first image processing module 1110 may include a video module 1214 for generating the game image 201 and a graphics module 1217 for generating the home menu screen 221.

In detail, it is assumed that the display device 301 receives an image signal corresponding to content (e.g., game content) that a user wants to view and generates an image corresponding to the received image signal. The display device 301 may generate an output image by mixing the image corresponding to the received image signal with another image. Hereinafter, for convenience of explanation, the image corresponding to the received image signal is referred to as a 'first image'. In detail, the first image may include an image corresponding to the game content that the user wants to view. An image displayed on at least a portion of the first image is referred to as a 'second image'. In detail, the second image may be an image displayed overlapping on at least a partial area of the first image.

In the full screen 220 of FIG. 2A, the game image 201 may be a first image, and an image corresponding to the home menu screen 221 may be a second image. In the above example, an image that is finally output through the display 120 (specifically, an image corresponding to a full screen) is an image obtained by mixing the first image that is an image corresponding to the game content with the second image indicating the home menu screen 221 additionally displayed on the first image.

For example, the first image may refer to a content image itself generated by converting an image signal corresponding to an image output by playing content into an image.

For example, the second image may be at least one of subtitles, an icon, an onscreen display (OSD), a sub-window, a menu screen, a frame image, and an object image displayed in at least a partial area of the first image. The subtitles may include text. Also, the sub-window is an image displayed in a partial area of a screen and may be referred to as a sub-window, a sub-screen, or a floating window. Also, the object image may indicate a certain effect or a virtual object applied to the first image.

Also, the second image may be an image that may be generated by adjusting transparency such as a shadow effect. Also, the first image may be a general image in which transparency is not adjusted.

Hereinafter, for convenience of explanation, an image signal for generating the first image is referred to as a 'first image resource', and an image signal for generating the second image is referred to as a 'second image resource'.

For example, based on reception of a control signal for requesting to output a home menu screen, the processor 110 may control the image processing unit 125 to generate an image (specifically, a first image) corresponding to the game image 201 and an image (specifically, a second image) corresponding to the home menu screen 221 and generate an image corresponding to the full screen 220 by mixing the two images.

The following will be described assuming that the first image processing module 1110 generates an image corresponding to a full screen using a first image with a second image, such as the full screen 220 of FIG. 2.

Referring to FIG. 12, the first image processing module 1110 may include a decoder 1211, a graphics processing unit (GPU) (e.g., including graphics processing circuitry) 1215, the video module (e.g., including various circuitry and/or executable program instructions) 1214, the graphics module (e.g., including various circuitry and/or executable program instructions) 1217, and a mixer 1219. Also, the first image processing module 1110 may further include a texture processing unit (e.g., including various circuitry and/or executable program instructions) 1212.

The decoder 1211 receives and decodes an image signal. The image signal may be referred to as an image resource or data for generating an image.

For example, the decoder 1211 may receive a first image resource and a second image resource and may decode the first and second image resources. Accordingly, the decoder 1211 may output the decoded first image resource and the decoded second image resource.

The texture processing unit 1212 may convert the image resource output from the decoder 1211 into a texture memory. For example, the texture processing unit 1212 may convert each of the decoded first image resource and the decoded second image resource into a texture memory.

When a decoded image resource is converted into a texture memory, it may mean that the decoded image resource is stored in a two-dimensional (2D) memory area corresponding to a 2D image to generate an image. Accordingly, although the texture processing unit 1212 is illustrated in FIG. 12, the texture processing unit 1212 may be referred to as a memory, a video memory, or a graphics memory. Also, the texture processing unit 1212 may add texture information to the decoded image resource and may store the same in a memory area.

Also, the texture processing unit 1212 may include a plurality of memories (not shown) respectively corresponding to image resources received by an image input unit 730. For example, the texture processing unit 1212 may include a memory (not shown) for storing the decoded first image resource and a memory for storing the decoded second image resource.

Alternatively, the first image processing module 1110 may not include the texture processing unit 1212. In this case, data passing through the decoder 1211 may be directly transmitted to the GPU 1215.

The GPU 1215 may render input data (e.g., data stored in the texture processing unit 1212) and may output a rendering result to at least one of the video module 1214 and the graphics module 1217.

In detail, when the GPU 1215 outputs the rendering result to the video module 1214, the GPU 1215 may convert the rendering result into a data format suitable for the video module 1214 and may output the same to the video module 1214. When the GPU 1215 outputs the rendering result to the graphics module 1217, the GPU 1215 may convert the rendering result into a data format suitable for the graphics module 1217 and may output the same to the graphics module 1217.

For example, the GPU 1215 may output data having a data format to be processed by the video module 1214 as the rendering result to the video module 1214. For example, data output to the video module 1214 may have a YUV data format. Also, the GPU 1215 may output data having a data format to be processed by the graphics module 1217 as the rendering result to the graphics module 1217. For example, data output to the graphics module 1217 may have an RGBA format.

In detail, the GPU 1215 may determine whether to process input data (specifically, a rendering result) in the video module 1214 or the graphics module 1217, and may output the input data (specifically, the rendering result) to the video module 1214 or the graphics module 1217.

The video module 1214 may process the rendered first image resource on a first plane and may generate a first image. The first plane may refer to a memory area used to generate the first image. For example, the first plane may store an image frame corresponding to the first image resource. When the image frame is stored in the first plane, it may refer, for example, to pixel values of respective pixels of the image frame being written to the first plane.

The graphics module 1217 may process the rendered second image resource on a second plane and may generate a second image. The second plane may refer to a memory area used to generate the second image. The second plane may refer to a memory area used to generate the second image. For example, the second plane may store an image frame corresponding to the second image resource. When the image frame is stored in the second plane, it may refer, for example, to pixel values of respective pixels of the image frame being written to the first plane.

Referring to FIG. 12, a block 1213 may represent a first path or a first pipeline for generating and/or processing an image on the first plane, and data generated and/or processed in the block 1213 may have a YUV format. A block 1216 may present a second path or a second pipeline for generating and/or processing an image on the second plane, and data generated and/or processed in the block 1216 may have an RGBA format.

For example, the video module 1214 may be a module supporting high-resolution output, and the graphics module 1217 may be a module supporting low-resolution output compared to the video module 1214. For example, the video module 1214 may be a module supporting output of game content having a 4K resolution, and the graphics module 1217 may be a module supporting output of 2K resolution. In another example, the video module 1214 may be a module supporting output of 8K resolution, and the graphics module 1217 may be a module supporting output of 1K, 2K, or 4K resolution.

The mixer 1219 may generate an output image based on the first and second images respectively generated by the video module 1214 and the graphics module 1217. In detail, the mixer 1219 may generate the output image by mixing the first image generated by the video module 1214 with the second image generated by the graphics module 1217. The output image generated by the mixer 1219 may be displayed as a full screen on the display 120.

Hereinafter, examples of an image generated through the image processing unit 125 of FIG. 12 will be described in greater detail with reference to FIGS. 13 and 14.

Figure 13:
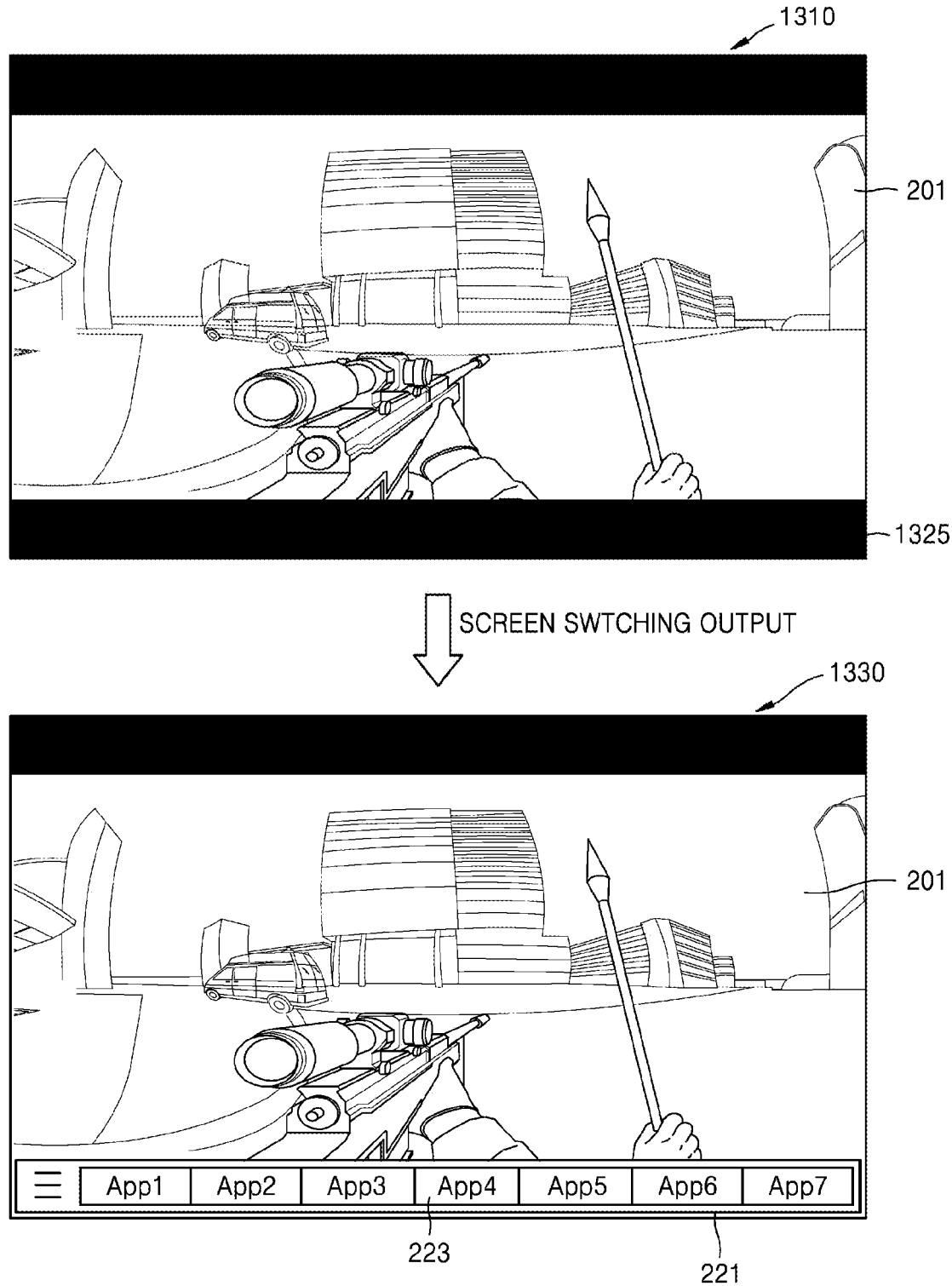
FIG. 13 is a diagram illustrating an example operation of switching an output screen based on a control signal received by a display device, according to various embodiments.

FIG. 13 is a diagram illustrating an example operation of switching an output screen based on a control signal received by a display device, according to various embodiments. In FIG. 13, the same elements as those in FIG. 2A are denoted by the same reference numerals.

Based on at least one of an attribute of a first control signal, an attribute of video output corresponding to the first control signal, and an attribute of an application executed in response to the first control signal, when the video output corresponding to the first control signal is a video output to be output on a partial area of a full screen, the video output corresponding to the first control signal may be displayed overlapping on a playback screen of first content.

Accordingly, when the video output corresponding to the first control signal is determined or identified as a video output displayed only in a portion of the full screen, the processor 110 may control the video output corresponding to the first control signal to be displayed using an overlapping display method.

For example, when the processor 110 receives a control signal for requesting to output a home menu screen from the second control device 101 during playback of game content, the processor 110 may perform an operation corresponding to the first control signal to minimize/reduce inconvenience of a game user who is watching the game content.

For example, when the video output corresponding to the first control signal is displayed using an overlapping display method, based on a resolution of an image corresponding to the first content, the processor 110 may generate a full screen 1330 including a partial screen including the playback image (e.g., 201) of the first content and a partial screen (e.g., 221) including the video output corresponding to the first control signal.

Referring to FIG. 13, when an aspect ratio of the display 120 is 16:9 and an aspect ratio of an image corresponding to the game content that is being played is 21:9, a full screen 1310 displayed when the game content is played may include a playback image 1320 of the game content and black areas (e.g., 1325). The full screen 1310 may be the same as the full screen 481 described with reference to FIG. 7D.

Based on a resolution of an image corresponding to the first content, the processor 110 may obtain information about a size and an arrangement of an area (e.g., black area) where the playback image 1320 is not output on the full screen 1310. For example, when the display 120 supports up to 8K resolution and is expressed as 7680 horizontal pixels and 4320 vertical pixels and a resolution of an image corresponding to the first content is known, the processor 110 may determine how many areas (e.g., black areas) where an image corresponding to the first content is not displayed exist in the display 120 and where they are located in the display 120. Also, when the processor 110 knows an attribute of the video output corresponding to the first control signal, the processor 110 may determine at least one of a size, a resolution, and a position of a display area for the video output corresponding to the first control signal.

Accordingly, based on an image corresponding to the first content (e.g., an image of a playback image) and an attribute of the video output corresponding to the first control signal, the processor 110 may control the image processing unit 125 to display an interface screen (e.g., the home menu screen 221) corresponding to the first control signal in an area (e.g., area 1325) where the playback image 1320 of the game content is not displayed in the full screen 1310.

For example, when a control signal for requesting to output an image 1350 corresponding to a home menu screen is received from the second control device 101 while the game content is being played, the processor 110 may control the image processing unit 125 to display the image 1350 corresponding to the home menu screen in an area (e.g., the area 1325) where the playback image 1320 of the game content is not displayed in the full screen 1310. For example, the image processing unit 125 may generate a first image 201 that is a playback image of the game content through the video module 1214, may generate the home menu screen 221 through the graphics module 1217, and may generate the full screen 1330 by mixing the first image 201 with the home menu screen 221 using the mixer 1219. Accordingly, the display 120 may display an image generated by the image processing unit 125.

As described with reference to FIG. 13, based on a resolution of an image corresponding to the first content, the processor 110 according to a disclosed embodiment may generate the full screen 1330 including the first image 201 that is a playback image of the game content and the home menu screen 221 to minimize/reduce inconvenience of a game user who is watching the game content.

For example, based on the first control signal being identified as not a control signal for requesting video output, the processor 110 may perform an operation corresponding to the first control signal in a background environment while playback of the first content is maintained. An example where an operation corresponding to the first control signal is performed in a background environment will be described in greater detail below with reference to FIG. 14.

For example, when a control signal is a control signal generated by selecting a volume key for requesting volume up, the processor 110 may control the audio processing unit 140 and the audio output unit 150 in a background environment to increase a volume of audio output while playback of the game content is maintained.

Figure 14:
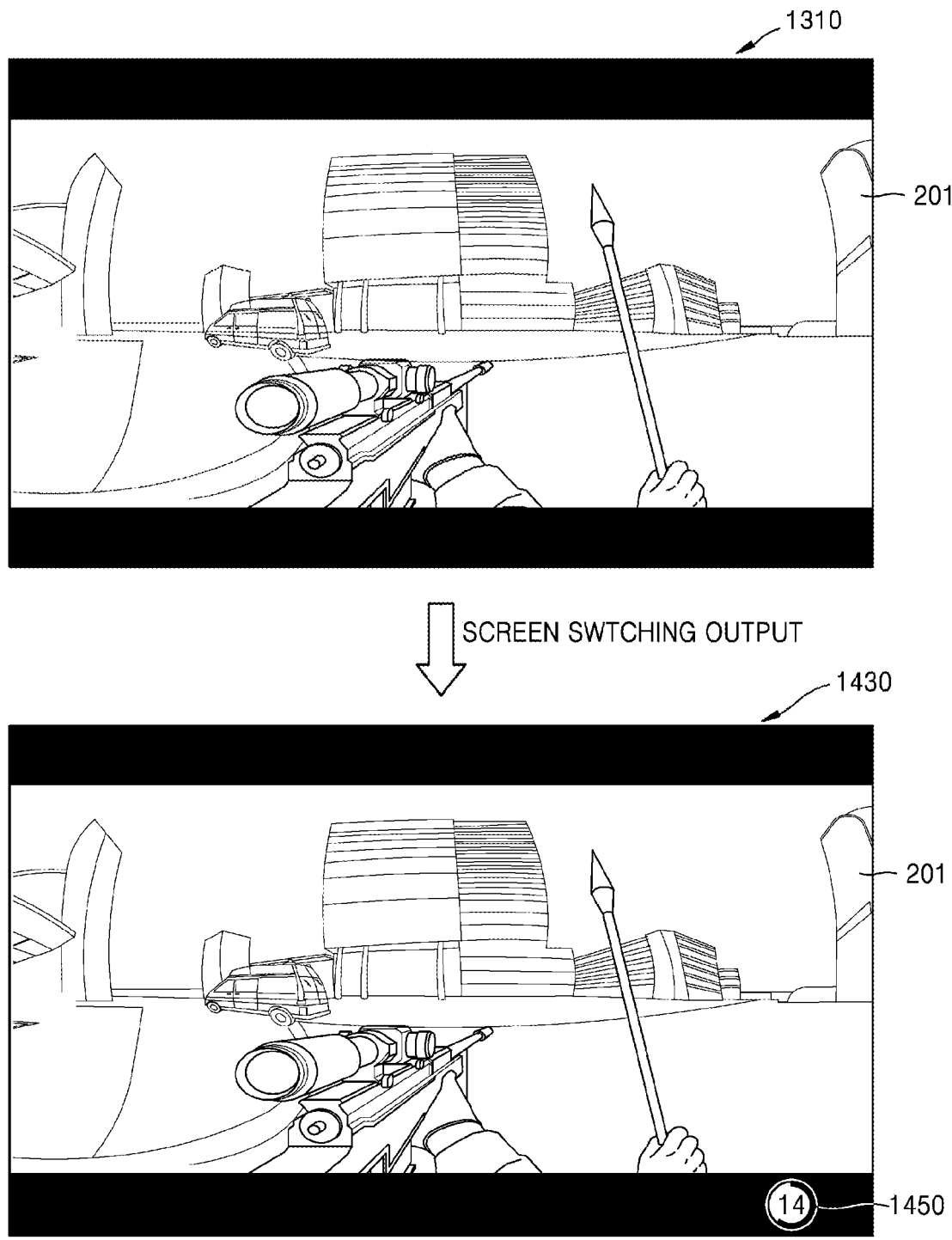
FIG. 14 is a diagram illustrating an example operation of switching an output screen based on a control signal received by a display device, according to various embodiments.

FIG. 14 is a diagram illustrating an example operation of switching an output screen based on a control signal received by a display device, according to various embodiments. The same elements in FIG. 14 as those in FIG. 13 are denoted by the same reference numerals.

Referring to FIGS. 12 and 14, the image processing unit 125 may generate the first image 201 that is a playback image of game content through the video module 1214, may generate an icon 1450 through the graphics module 1217, and may generate a full screen 1430 by mixing the first image 201 with the icon 1450 using the mixer 1219. Accordingly, the display 120 may display an image generated by the image processing unit 125.

The processor 110 may control the first image 201 that is a playback image of the game content to be continuously displayed by maintaining playback of the game content. The processor 110 may control the full screen 1430 to be displayed so that the icon 1450 indicating that an operation according to a first control signal is performed does not cover the first image 201. For example, the icon 1450 may be an indicator indicating that a volume has increased by 14 due to volume up. The icon 1450 corresponding to an operation performed in a background environment may be displayed in a semi-transparent state so as not to interfere with a game user watching the game content.

In a disclosed embodiment, the processor 110 may perform screen splitting, based on the first control signal being identified as a control signal for requesting video output in operation S910 described with reference to FIG. 9. A full screen output according to screen splitting will be described below in detail with reference to FIGS. 15 and 16.

Figure 15:
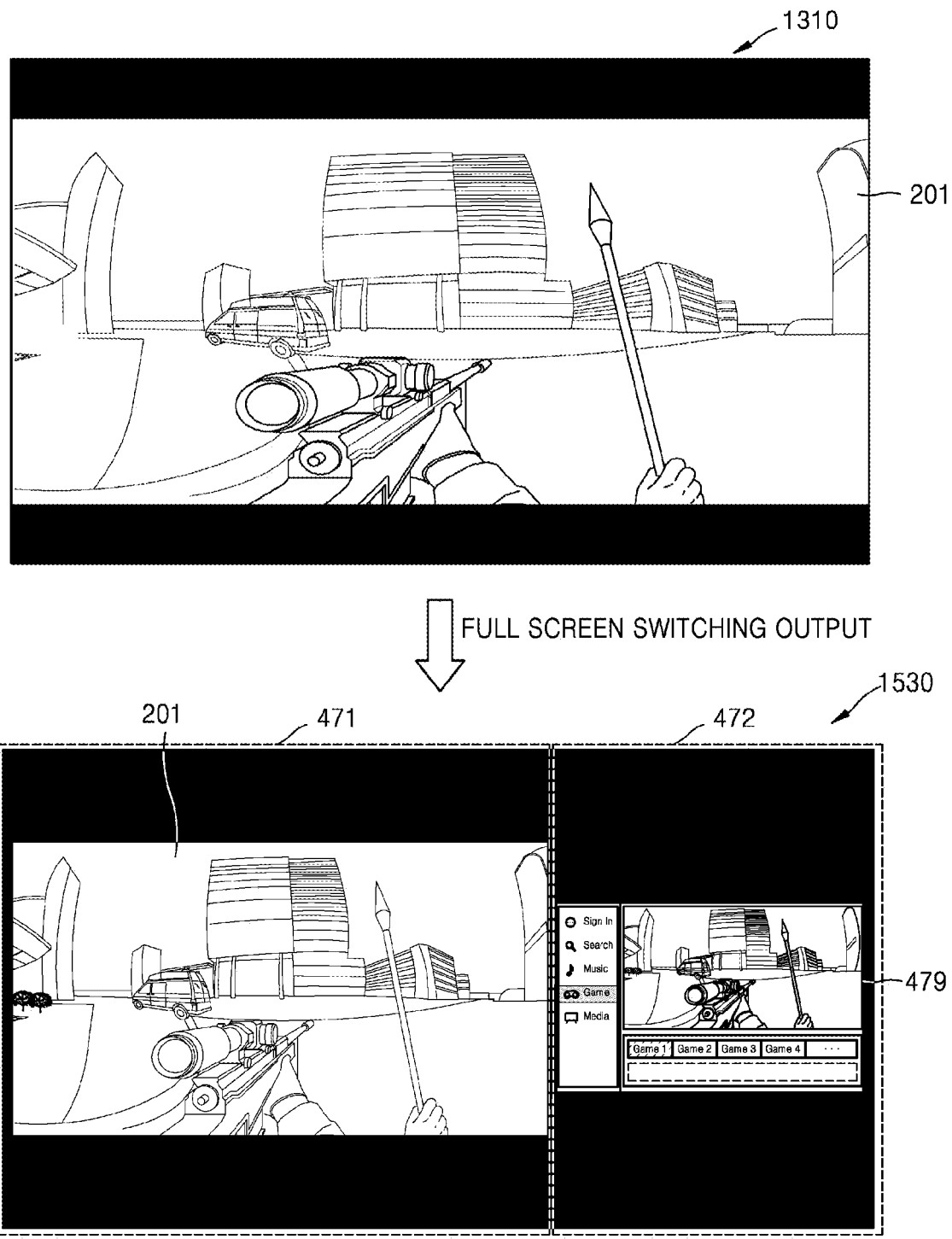
FIG. 15 is a diagram illustrating an example operation of switching an output screen based on a control signal received by a display device, according various embodiments.

FIG. 15 is a diagram illustrating an example operation of switching an output screen based on a control signal received by a display device, according to various embodiments. In FIG. 15, the same elements as those in FIGS. 4B and 13 are denoted by the same reference numerals. Hence, the same description as that made with reference to FIGS. 4B and 13 may not be repeated.

Figure 16:
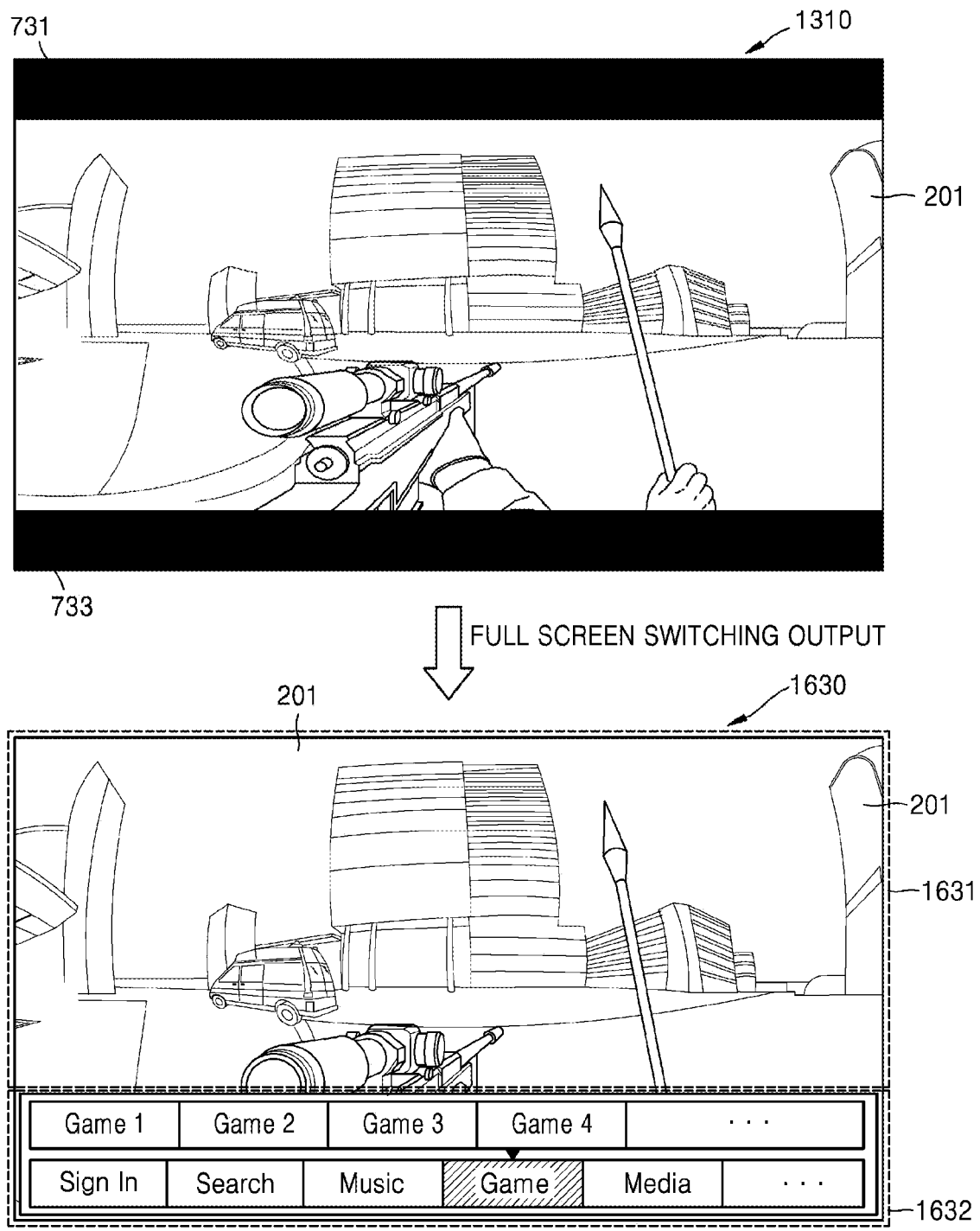
FIG. 16 is a diagram illustrating an example operation of switching an output screen based on a control signal received by a display device, according to various embodiments.

FIG. 16 is a diagram illustrating an example operation of switching an output screen based on a control signal received by a display device, according to various embodiments. In FIG. 16, the same elements as those in FIGS. 7E and 13 are denoted by the same reference numerals. Hence, the same description as that made with reference to FIGS. 7E and 13 may not be repeated.

For example, when it is determined that a first control signal is a control signal for requesting video output, the processor 110 may perform screen splitting to split a full screen into two partial screens. For example, the processor 110 may split a full screen into two partial screens and may respectively display a playback screen of game content and a first user interface screen in the two partial screens.

Also, when a first control signal is identified as a control signal for requesting video output corresponding to a full screen, the processor 110 may split a screen of the display device 301 into a plurality of partial screens and may control the playback screen of the first content and the first user interface screen corresponding to the first control signal to be respectively output on the plurality of partial screens.

For example, based on at least one of the first control signal and an attribute of video output corresponding to the first control signal, when it is identified that the video output corresponding to the first control signal corresponds to a full screen, the processor 110 may split a screen of the display device 301 into a plurality of partial screens and may control the playback screen of the first content and the first user interface screen corresponding to the first control signal to be respectively output on the plurality of partial screens.

Referring to the example of FIG. 15, when a first control signal received from the second control device 101 is a control signal for requesting to output the game home screen 479, the processor 110 may split a full screen 1530 into the partial screen 471 where the game image 201 corresponding to game content that is being played is to be output and the partial screen 472 where the game home screen 479 is to be output. The processor 110 may respectively display the game image 201 and the game home screen 479 in the two partial screens 471 and 472.

For example, the processor 110 may perform screen splitting to maximize/improve screen use efficiency. For example, the processor 110 may split a full screen into the partial screen 471 where the game image 201 is to be output and the partial screen 472 where the game home screen 479 is to be output so as to minimize/reduce a black area in the full screen 1530.

Referring back to FIG. 11, the first image processing module 1110 of the image processing unit 125 may generate the partial screen 471 including the game image 201 corresponding to the game content and the second image processing module 1120 may generate the partial screen 472 including the game home screen 479. The mixer 1130 may output the full screen 1530 obtained by mixing the partial screen 471 generated by the first image processing module 1110 with the partial screen 472 generated by the second image processing module 1120. Accordingly, the display 120 may display the full screen 470.

Referring to the example of FIG. 16, a layout of a full screen 1630 may be different from a layout of the full screen 470 described with reference to FIG. 15. A layout of a full screen may vary according to screen splitting.

Referring to FIG. 16, the full screen 1630 may be split into a first partial screen 1631 and a second partial screen 1632. The partial screen 1631 and the partial screen 1632 respectively correspond to the area 736 and the area 737 described with reference to FIG. 7E, and thus, a detailed description thereof may not be repeated here.

The processor 110 may perform screen splitting to maximize/improve screen use efficiency, based on an attribute of an image included in each of a plurality of partial screens (e.g., a size, a shape, a resolution, and/or an aspect ratio). For example, the processor 110 may split a screen of the full screen 1630 to minimize/reduce a black area in the full screen 1630.

Referring back to FIG. 11, the first image processing module 1110 of the image processing unit 125 may generate the partial screen 1631 including the first image 201 corresponding to game content, and the second image processing module 1120 may generate the partial screen 1632 including the game home screen 291. The mixer 1130 may output the full screen 1630 obtained by mixing the partial screen 1631 generated by the first image processing module 1110 with the partial screen 1632 generated by the second image processing module 1120. Accordingly, the display 120 may display the full screen 1630.

Figure 17:
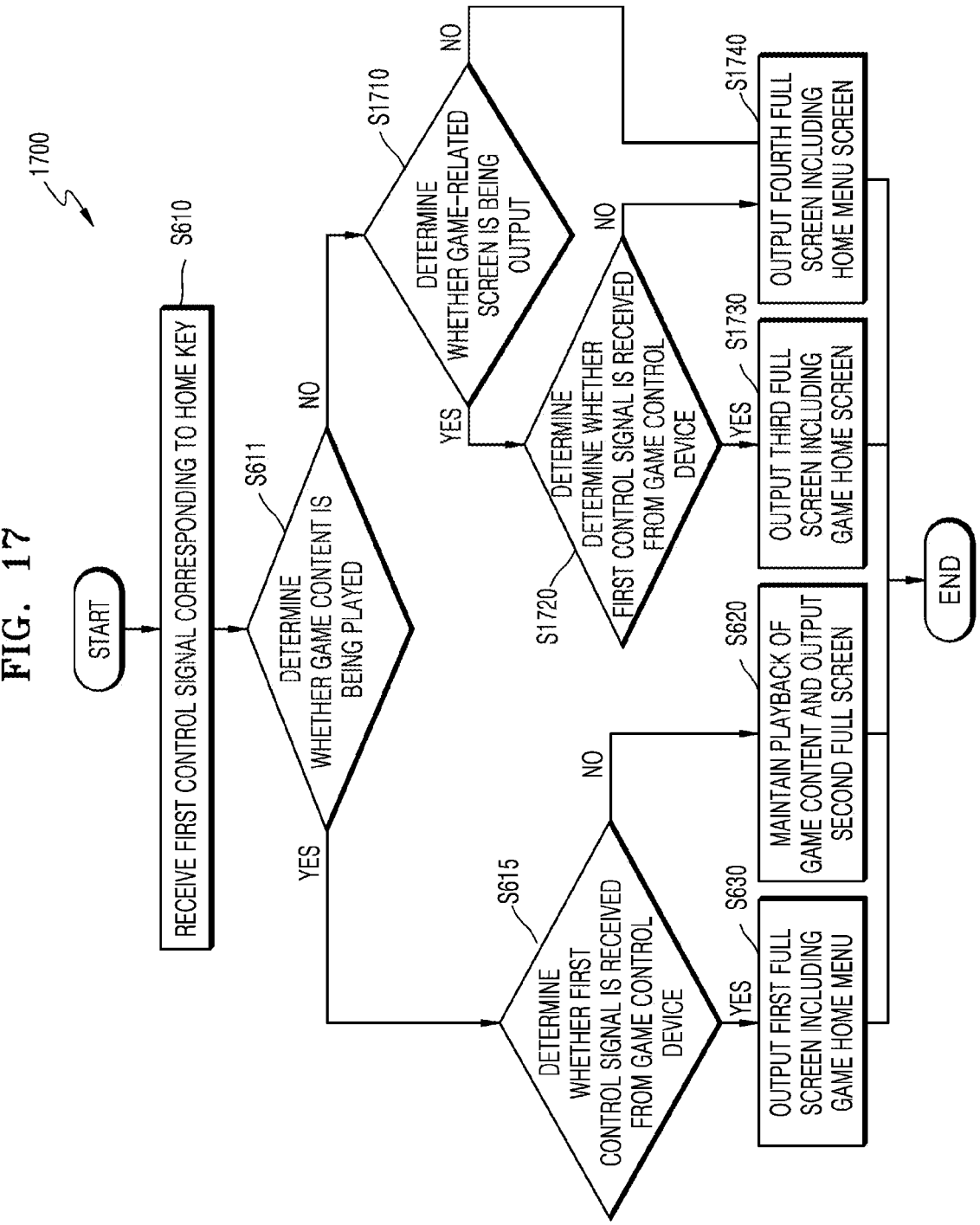
FIG. 17 is a flowchart illustrating an example method of operating a display device, according to various embodiments.

FIG. 17 is a flowchart illustrating an example method of operating a display device, according to various embodiments. An operation method 1700 of a display device of FIG. 17 may be a flowchart illustrating operations performed by the display device 100, 300, or 301 according to a disclosed embodiment described with reference to FIGS. 1 to 3B. Also, in the operation method 1700 of the display device of FIG. 17, the same elements as those in FIG. 6 are denoted by the same reference numerals. Accordingly, when operations included in the operation method 1700 of the display device are descried, the same description as that made for operations performed by the display device 100, 300, or 301 of FIGS. 1 to 16 may not be repeated.

Also, the following will be described assuming that the operation method 1700 of the display device is performed by the display device 301 of FIG. 3B.

Referring to FIG. 17, in the operation method 1700 of the display device, when a first control signal is received in operation S610, it may be identified or determined whether game content is being played (S611). For example, the processor 110 may determine or identify whether the display device 301 is playing the game content at a time when the first control signal is received.

When it is determined in operation S611 that the display device 301 is playing the game content, operation S615 described with reference to FIG. 6 may be performed.

When it is determined in operation S611 that the display device 301 is not playing the game content, the operation method 1700 of the display device may determine or identify whether the display device 301 is outputting a game-related screen (S1710).

For example, when a service different from a game service is provided from among a plurality of services provided by the display device 301, the display device 301 may not be playing the game content and may not output a game-related screen.

For example, when a service different from a game service is provided from among a plurality of services provided by the display device 301, the operation method 1700 of the display device may enter operation S1725.

For example, a game-related screen may not be a game playback image, but may be a screen output while a game application is executed. For example, a game-related screen may be a game setting screen or a game chatting screen.

For example, the processor 110 may determine or identify whether the display device 301 is not playing the game content but is outputting a game-related screen at a time when the first control signal is received. For example, the processor 110 may identify whether the display device 301 is executing a game application but is not playing the game content at a time when the first control signal is received. For example, the processor 110 may identify whether the display device 301 is performing a game-related setting or a game-related additional service (e.g., a game-related chatting service) at a time when the first control signal is received.

When it is identified in operation S1710 that the display device 301 is outputting a game-related screen, the processor 110 may identify whether the first control signal is received from the game control device 102 (S1720). Operation S1720 may be performed by the processor 110.

When it is identified in operation S1720 that the first control signal is received from the game control device 102, a full screen including a game home screen may be displayed (S1730).

When it is identified in operation S1720 that the first control signal is not received from the game control device 102, a full screen including a home menu screen may be displayed (S1740).

When it is identified in operation S1710 that the display device 301 does not output a game-related screen, a full screen including a home menu screen may be displayed (S1740).

Operations S1730 and S1740 may be performed by the display 120 under the control of the processor 110.

In FIG. 17, in order to distinguish full screens respectively output in operations S630, S620, S1730, and S1740, the full screens are displayed as a first full screen, a second full screen, a third full screen, and a fourth full screen. Hereinafter, examples of full screens output in operations S620, S1730, and S1740 will be described in greater detail below with reference to FIGS. 18 to 20.

Figure 18:
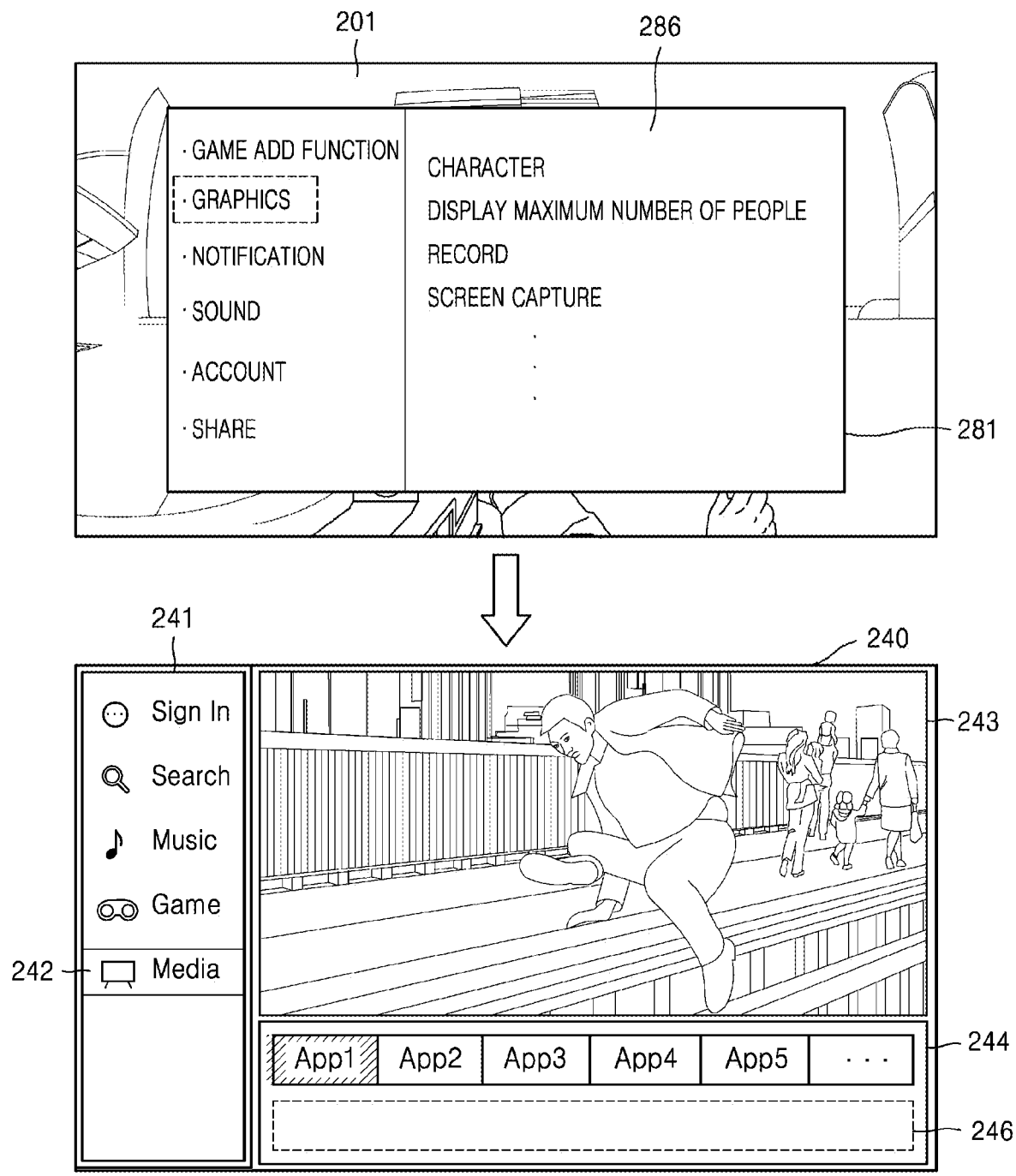
FIG. 18 is a diagram illustrating an example operation of switching an output screen based on a control signal received by a display device, according to various embodiments.

FIG. 18 is diagram illustrating an example operation of switching an output screen based on a control signal received by a display device, according to various embodiments. The same elements in FIG. 18 as those in FIGS. 2C and 2H are denoted by the same reference numerals.

The operation method 1700 of the display device may perform operation S1720 when game content is not being played but a game-related screen is being output.

For example, when it is identified that a first control signal is not received from the game control device 102 (for example, when it is identified that the first control signal is received from a control device different from the game control device 102) while the display device 301 is displaying the game setting screen 281 that is a game-related screen on the display 120, the operation method 1700 of the display device may perform operation S1740.

Referring to the example of FIG. 18, as operation S1740 is performed, based on the first control signal being received from a control device (e.g., the TV control device 101) different from the game control device 102 while the display device 301 is displaying the game setting screen 281, the home menu screen 240 may be displayed as a full screen.

For example, when a game user is not currently playing a game through the display device 301, there is no need to consider inconvenience to the game user that may occur due to interruption of the game being played. Accordingly, when the game is not being played (e.g., only a game-related screen is being displayed) and a first control signal corresponding to a home key is received from a control device (e.g., the TV control device 101) different from the game control device 102, the display device 301 may operate to output a home menu screen in response to the first control signal without ignoring the received first control signal. Accordingly, the display device 301 may operate to meet the intention of another user using the display device 301 (e.g., a user who wants to control the display device 301 using the TV control device 101).

Figure 19:
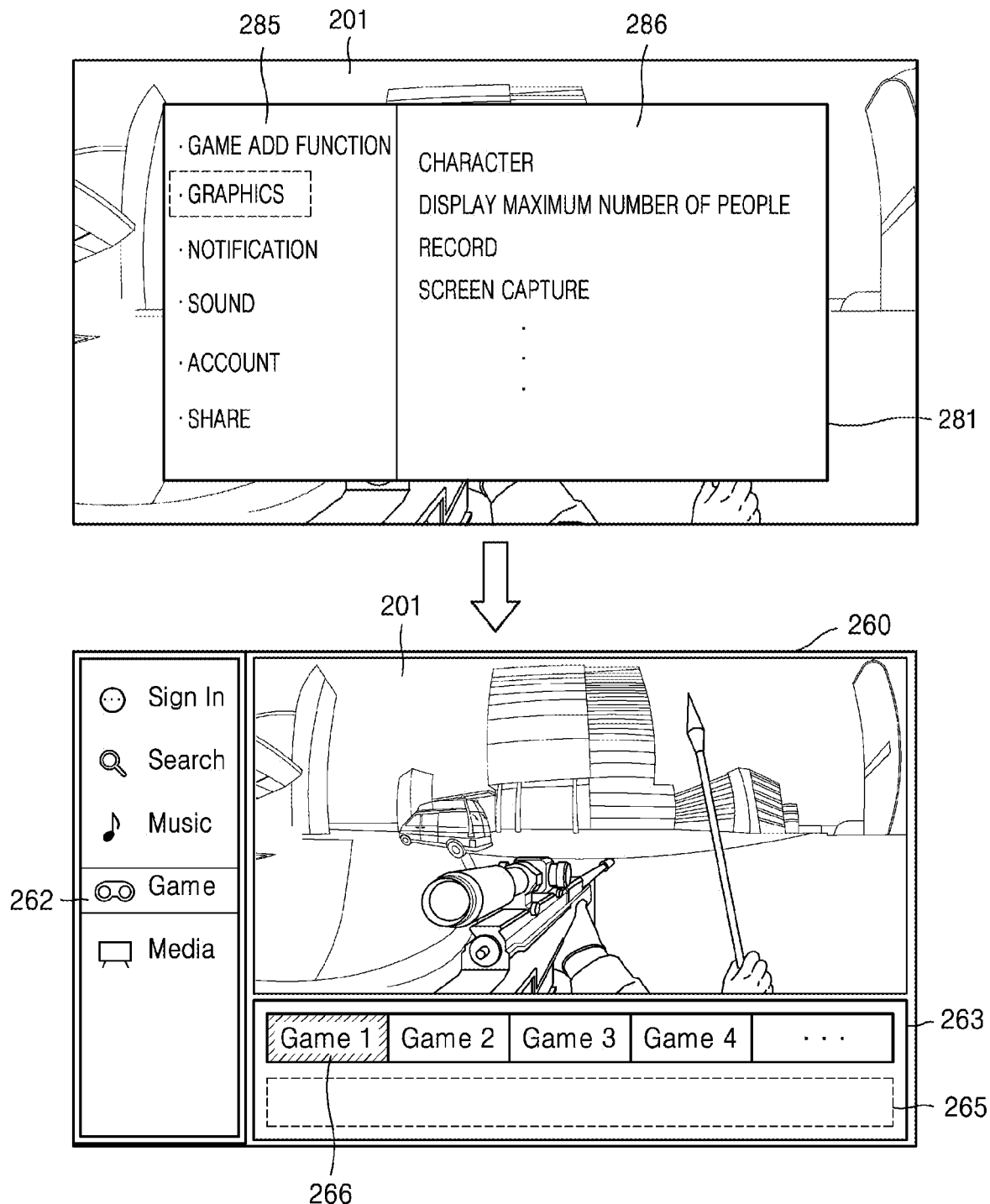
FIG. 19 is a diagram illustrating an example operation of switching an output screen based on a control signal received by a display device, according to various embodiments.

FIG. 19 is a diagram illustrating an example operation of switching an output screen based on a control signal received by a display device, according to various embodiments. The same elements in FIG. 19 as those in FIGS. 2E and 2H are denoted by the same reference numerals.

The operation method 1700 of the display device may perform operation S1720 when game content is not being played but a game-related screen is being output.

For example, when a first control signal is received from the game control device 102 while the display device 301 is displaying the game setting screen 281 that is a game-related screen on the display 120, the operation method 1700 of the display device may perform operation S1740.

Referring to the example of FIG. 18, as operation S1740 is performed, based on the first control signal being received from the game control device 102 while the display device 301 is displaying the game setting screen 281, the game home screen 260 may be displayed as a full screen.

For example, when a game user is not currently playing a game through the display device 301 but is watching a game-related screen (e.g., 281), the game user generally wants to use a game service through the display device 301. Accordingly, even when only the game-related screen is being displayed, if the game user selects a home key through the game control device 102 and the first control signal corresponding to the selection is received by the display device 301, the game user is highly likely to request a game home screen that is a game-related home screen. Hence, the game home screen 260 may be displayed as a full screen by reflecting the intension of the game user.

Figure 20:
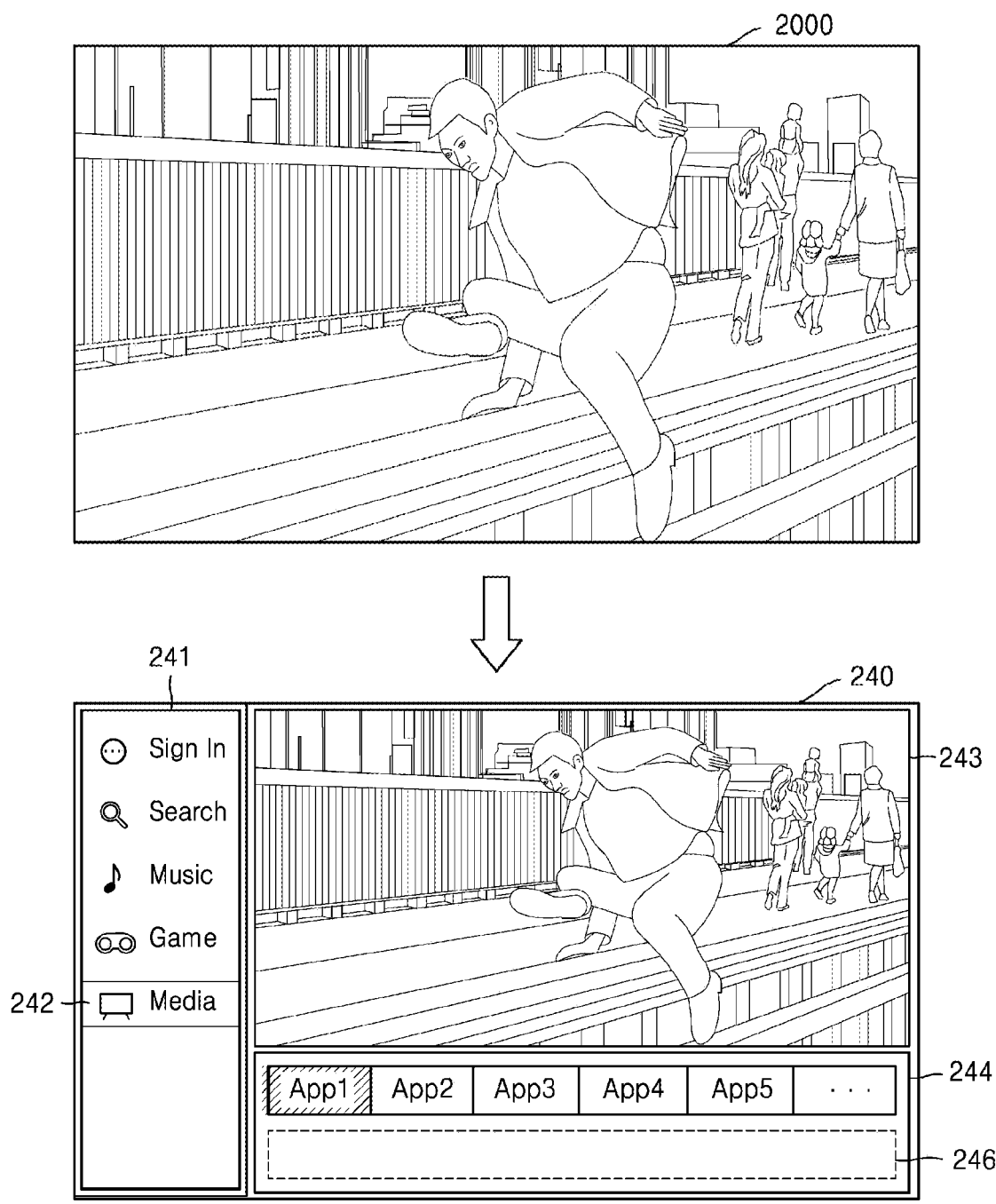
FIG. 20 is a diagram illustrating an example operation of switching an output screen based on a control signal received by a display device, according to various embodiments.

FIG. 20 is a diagram illustrating an example operation of switching an output screen based on a control signal received by a display device, according to various embodiments. The same elements in FIG. 20 as those in FIG. 2C are denoted by the same reference numerals.

The operation method 1700 of the display device may identify whether a game-related screen is being output when game content is not being played (S1710). Operation S1710 may be performed by the processor 110.

When it is identified in operation S1710 that the display device 301 is not outputting a game-related screen, the operation method 1700 of the display device may output a full screen including a home menu screen (S1750).

Referring to the example of FIG. 20, the display device 301 is not playing game content and is displaying a screen (e.g., a movie playback screen 2000) that is not a game-related screen. When a first control signal received while the movie playback screen 2000 is being displayed is not received from the game control device 102 (e.g., when received from the TV control device 101 different from the game control device 102), the display device 301 may output the home menu screen 240 as a full screen based on the received first control signal.

For example, when a game user is not currently playing a game through the display device 301, there is no need to consider inconvenience to the game user that may occur due to interruption of the game being played. Accordingly, when a game is not being played and a first control signal corresponding to a home key is received from a control device (e.g., the TV control device 101) different from the game control device 102 while a screen unrelated to a game (e.g., the movie playback screen 2000) is being displayed, the display device 301 may operate to output a home menu screen in response to the first control signal without ignoring the received first control signal. Accordingly, the display device 301 may operate to meet the intention of another user using the display device 301 (e.g., a user who wants to control the display device 301 using the TV control device 101).

Figure 21:
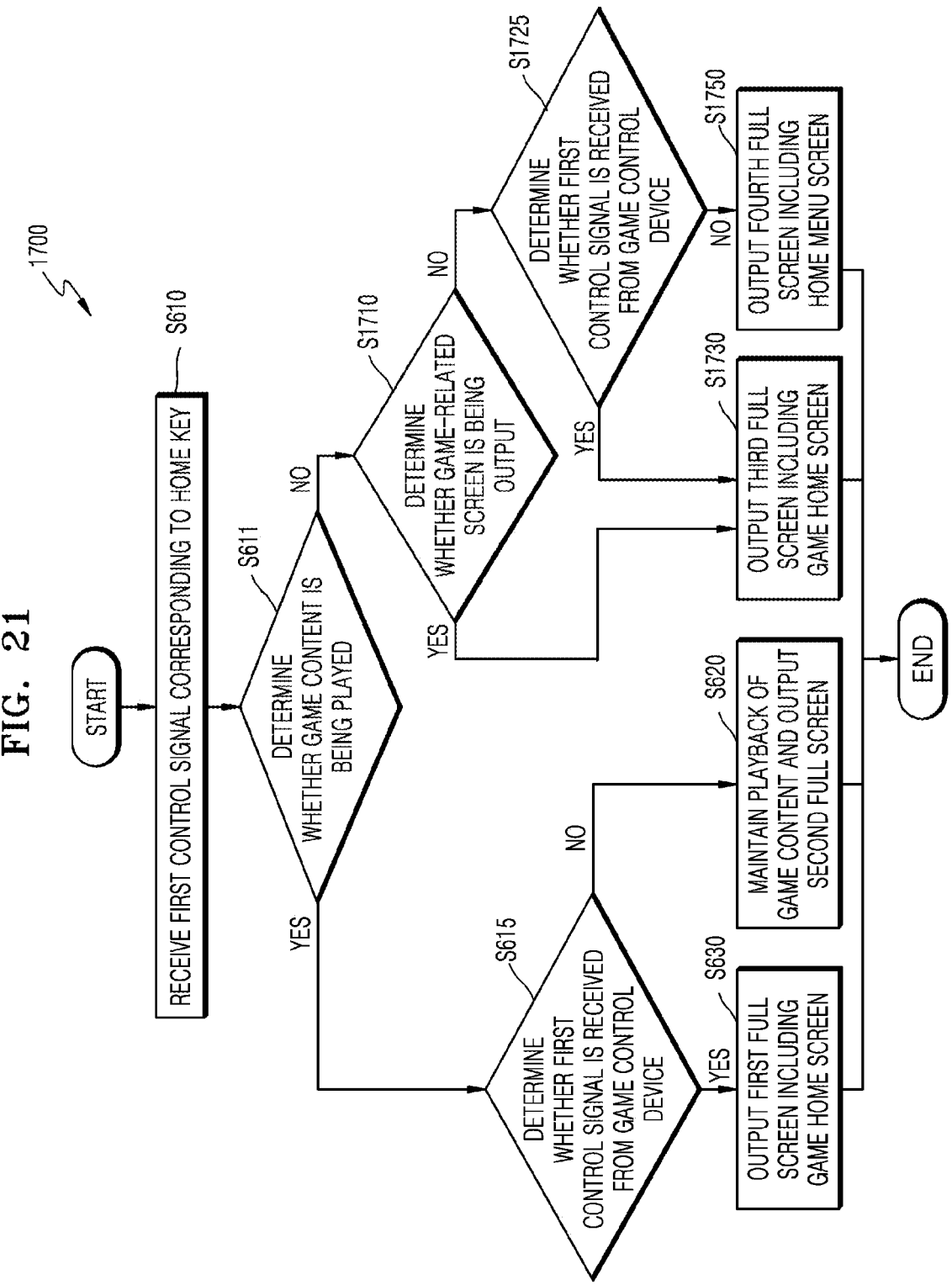
FIG. 21 is a flowchart illustrating an example method of operating a display device, according to various embodiments.

FIG. 21 is a flowchart illustrating an example method of operating a display device, according to various embodiments. An operation method 2100 of a display device of FIG. 21 may be a flowchart illustrating operations performed by the display device 100, 300, or 301 according to a disclosed embodiment described with reference to FIGS. 1 to 3B. Also, in the operation method 2100 of the display device of FIG. 21, the same elements as those in FIGS. 6 and 17 are denoted by the same reference numerals. Accordingly, when operations included in the operation method 2100 of the display device are described, the same description as that made for operations performed by the display device 100, 300, or 301 of FIGS. 1 to 20 may not be repeated here.

Also, the following will be described assuming that the operation method 2100 of the display device is performed by the display device 301 of FIG. 3B.

Referring to FIG. 21, after operation S1710, the operation method 2100 of the display device may perform operation S1725.

For example, when the display device 301 does not output a game-related screen, the operation method 2100 of the display device may identify whether a received first control signal is received from the game control device 102 (S1725). Operation S1725 may be performed by the processor 110.

When it is identified in operation S1725 that the first control signal is received from the game control device 102, the operation method 1700 of the display device may perform operation S1730. Operation S1730 included in the operation method 2100 of the display device will be described below in detail with reference to FIG. 23.

When it is identified in operation S1725 that the first control signal is not received from the game control device 102 (specifically, when it is identified that the first control signal is received from a control device different from the game control device 102), the operation method 1700 of the display device may perform operation S1750. Operation S1750 included in the operation method 2100 of the display device will be described below in detail with reference to FIG. 22.

Operations S1740 and S1750 may be performed by the display 120 under the control of the processor 110. Also, in FIG. 21, in order to distinguish full screens respectively output in operations S630, S620, S1730, and S1750, the full screens are displayed as a first full screen, a second full screen, a third full screen, and a fourth full screen.

Figure 22:
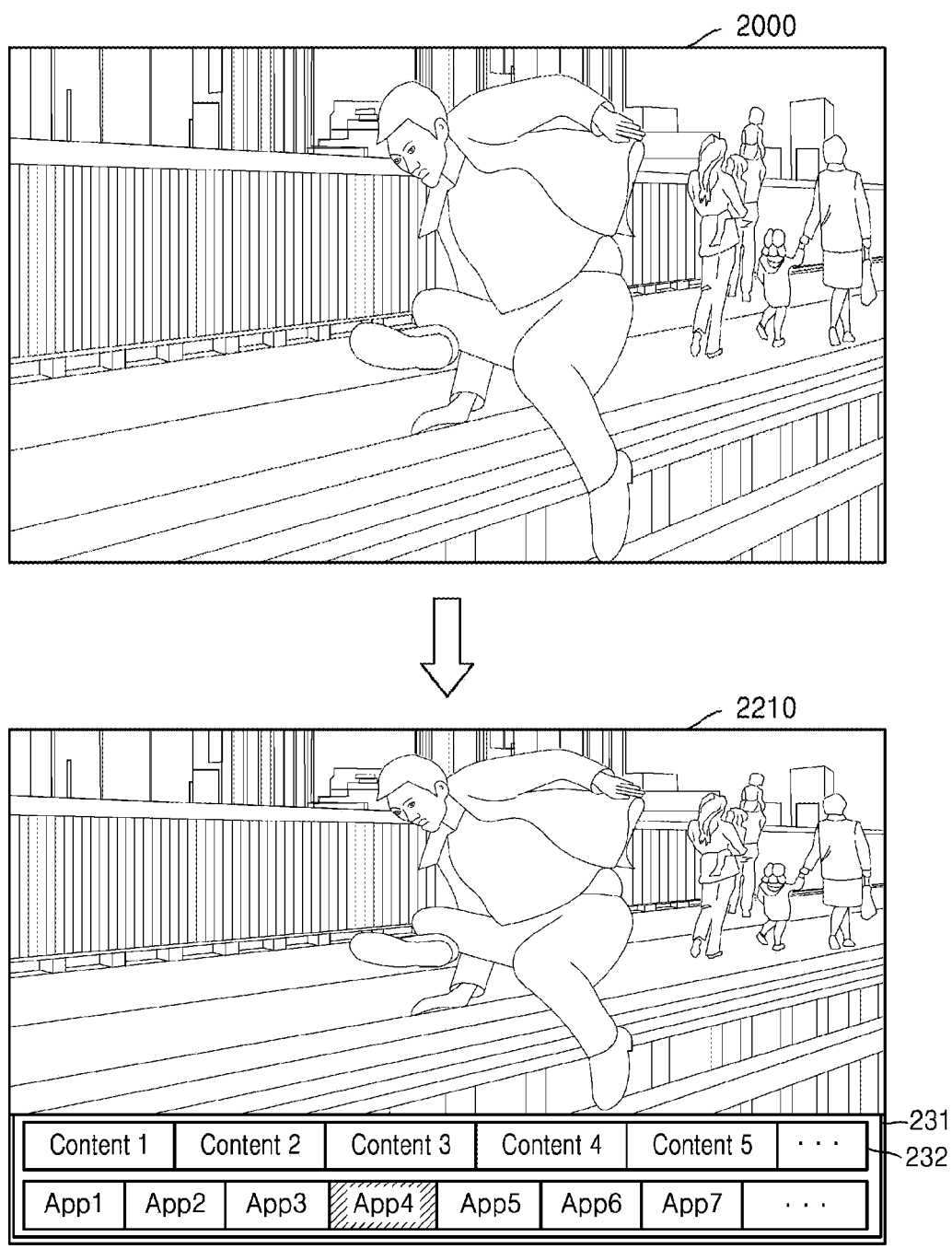
FIG. 22 is a diagram illustrating an example operation of switching an output screen based on a control signal received by a display device, according to various embodiments.

FIG. 22 is a diagram illustrating an example operation of switching an output screen based on a control signal received by a display device, according to various embodiments. The same elements in FIG. 22 as those in FIGS. 2B and 20 are denoted by the same reference numerals.

Referring to the example of FIG. 22, the display device 301 is not playing game content and is displaying a screen (e.g., the movie playback screen 2000) that is not a game-related screen. When a first control signal received while the movie playback screen 2000 is being displayed is not received from the game control device 102 (e.g., when received from the TV control device 101 that is a control device different from the game control device 102), the display device 301 may output a home menu screen 2210 including the home menu 231 as a full screen based on the received first control signal.

Figure 23:
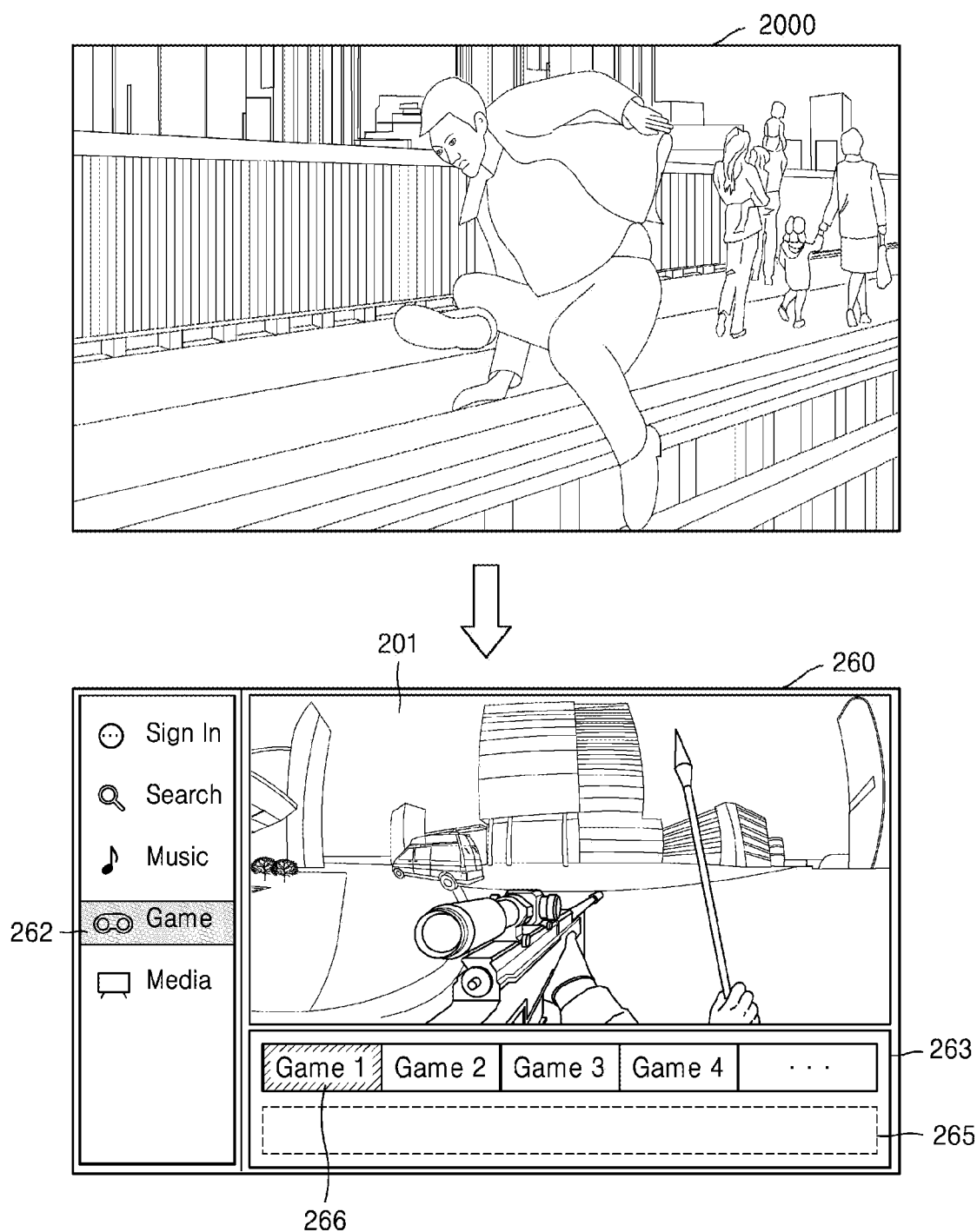
FIG. 23 is a diagram illustrating an example operation of switching an output screen based on a control signal received by a display device, according to various embodiments.

FIG. 23 is a diagram illustrating an example operation of switching an output screen based on a control signal received by a display device, according to various embodiments. The same elements in FIG. 22 as those in FIGS. 2E and 20 are denoted by the same reference numerals.

Referring to the example of FIG. 22, the display device 301 is not playing game content and is displaying a screen (e.g., the movie playback screen 2000) that is not a game-related screen. When it is identified that the first control signal received while the movie playback screen 2000 is being displayed is received from the game control device 102, the display device 301 may output the game home screen 260 as a full screen based on the received first control signal.

For example, the game control device 102 is a control device for using and controlling a game. Accordingly, it is highly like that a home key received from the game control device 102 was selected according to a user's intention to use a game. Accordingly, even when a game is not being played and a game-related screen is not being output, a first control signal corresponding to a home key received from the game control device 102 is highly like to be a control signal for requesting to call a game home screen. Hence, operation S1750 may be performed to meet the intention of the game user.

As described with reference to FIGS. 1 to 23, according to a display device and an operation method thereof according to a disclosed embodiment, the display device that receives a control signal from any one of a plurality of different control devices including the same key may operate to better meet a user's intention, thereby increasing user satisfaction.

For example, according to a display device and an operation method thereof according to a disclosed embodiment, a control signal received from any one of a plurality of remote control devices may be processed so that playback of a game is not stopped regardless of the intention of a user playing the game. Accordingly, because the game is not suddenly stopped regardless of the intention of the user playing the game through the display device, the game user may not experience inconvenience. Accordingly, according to the display device and the operation method thereof according to a disclosed embodiment, the satisfaction of the user playing the game through the display device may be increased.

Also, according to a display device and an operation method thereof according to a disclosed embodiment, screen switching corresponding to a control signal may be performed based on a type of a control device that transmits the control signal and content or a screen that is currently being output by the display device. Accordingly, the display device may operate to better meet the intention of a user using the display device, thereby increasing user satisfaction.

An operation method of a display device according to an embodiment of the present disclosure may be implemented as a program command executable by various computer means and may be recorded on a non-transitory computer-readable medium. Also, an embodiment may be implemented in a computer-readable recording medium having recorded thereon at least one program including instructions for executing an operation method of a display device.

The computer-readable medium may include program commands, data files, data structures, and the like separately or in combinations. The program commands recorded on the computer-readable medium may be specially designed and configured for the present disclosure or may be well-known to and be usable by one of ordinary skill in the art of computer software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device specially configured to store and execute program commands such as a ROM, a random-access memory (RAM), or a flash memory. Examples of the program commands include advanced language code that may be executed by a computer using an interpreter or the like as well as machine language code made by a compiler.

A machine-readable storage medium may be provided as a non-transitory storage medium. Here, a 'non-transitory' storage medium may not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

According to an embodiment, methods according to various embodiments of the present disclosure may be provided in a computer program product. The computer program product is a product purchasable between a seller and a purchaser. The computer program product may be distributed in the form of a machine-readable storage medium (e.g., a compact disc read-only memory (CD-ROM)), or distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

While the disclosure has been illustrated and described with reference to various example embodiments, it will be understood that the various example embodiments are intended to be illustrative, not limiting. It will also be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device comprising:
   a display;
   a communication interface, comprising circuitry, configured to communicate with a control device comprising a plurality of keys including a first key; and
   at least one processor, comprising processing circuitry, individually and/or collectively
   configured to execute at least one instruction to cause the display device to:
   control the display to display a content in a full screen,
   while displaying the content in the full screen, receive a control signal corresponding to the first key, the control signal being for requesting a configuration menu,
   identify whether the display device is playing a game content,
   based on the display device not playing the game content:
   display a first user interface comprising a plurality of menus required for setting an operation of the display device, in a partial area on the full screen. while maintaining displaying the content in the full screen, wherein the plurality of menus of the first user interface are for a configuration for overall functions provided by the display device, and control the first user interface using control signals received from the control device after displaying the first user interface, and based on the display device playing the game content:

display a second user interface comprising a plurality of menus for setting a configuration required to play the game content in the partial area on the full screen-, while maintaining displaying the content in the full screen, and control the second user interface using control signals received from the control device after displaying the second user interface.

2. The display device of claim 1, wherein the control device is a game control device dedicated to perform control related to a game service.

3. The display device of claim 1, wherein the first key comprises a setting key.

4. The display device of claim 1, wherein the at least one processor, individually and/or collectively, is configured to execute at least one instruction to cause the display device to:

based on the content being identified as a broadcasting content, display the first user interface.

5. The display device of claim 1, wherein the first user interface comprises:

an area to display the plurality of menus which are selectable by a user; and an area to display sub-menus corresponding to one of the plurality of menus, which is selected by the user, wherein the plurality of menus comprise a networking setting menu, and the sub-menus comprises sub-menus corresponding to the networking setting menu.

6. The display device of claim 1, wherein the second user interface comprises:

an area to display the plurality of menus required for a configuration to play a game; and an area to display sub-menus corresponding to one of the plurality of menus, which is selected by a user.

7. The display device of claim 1, wherein the at least one processor is configured to execute at least one instruction to cause the display device to:

based on receiving a second control signal corresponding to a home key for requesting for outputting a home menu screen, display a home menu screen corresponding to a game category among a plurality of categories, when the content is the game content.

8. The display device of claim 1, wherein the at least one processor is configured to execute at least one instruction to cause the display device to:

based on receiving a second control signal corresponding to a home key for requesting for outputting a home menu screen, display a home menu screen corresponding to a basic category for providing media contents among a plurality of categories, when the content is not the game content.

9. The display device of claim 1, wherein the plurality of menus in the first user interface varies depending on at least one of a manufacturer, model, or product specifications of the display device, and the plurality of menus in the second user interface varies depending on at least one of a game content provider or a type of game content.

10. A method for operating a display device, the method comprising:

displaying a content in a full screen, while displaying the content in the full screen, receiving a control signal corresponding to a first key from a control device comprising a plurality of keys, the control signal being for requesting a configuration menu, identifying whether the display device is playing a game content, based on the display device not playing the game content:

displaying a first user interface sereen for comprising a plurality of menus required for setting an operation of the display device, in a partial area on the full screen, while maintaining displaying the content in the full screen, wherein the plurality of menus of the first user interface are for a configuration for overall functions provided by the display device, and controlling the first user interface using control signals received from the control device after displaying the first user interface, and based on the display device playing the game content:

displaying a second user interface comprising a plurality of menus for setting a configuration required to play the game content, in the partial area on the full screen, while maintaining displaying the content in the full screen, and controlling the second user interface using control signals received from the control device after displaying the second user interface.

11. The method of claim 10, wherein the control device is a game control device dedicated to perform control related to a game service.

12. The method of claim 10, wherein the first key comprises a setting key.

13. The method of claim 10, comprising:

based on the content being identified as a broadcasting content, displaying the first user interface.

14. The method of claim 10, wherein the first user interface comprises:

an area to display the plurality of menus which are selectable by a user; and an area to display sub-menus corresponding to one of the plurality of menus, which is selected by the user, wherein the plurality of menus comprise a networking setting menu, and the sub-menus comprises sub-menus corresponding to the networking setting menu.

15. The method of claim 10 wherein the second user interface comprises:

an area to display the plurality of menus required for a configuration to play a game; and an area to display sub-menus corresponding to one of the plurality of menus, which is selected by a user.

16. The method of claim 10, comprising:

based on receiving a second control signal corresponding to a home key for requesting for outputting a home menu screen, displaying a home menu screen corresponding to a game category among a plurality of categories, when the content is the game content.

17. The method of claim 10, further comprising:

based on receiving a second control signal corresponding to a home key for requesting for outputting a home menu screen, displaying a home menu screen corresponding to a basic category for providing media contents among a plurality of categories, when the content is not the game content.

18. A non-transitory computer-readable recording medium having stored thereon at least one instruction which, when executed by a processor of a display device, causes the display device to:
- displaying a content in a full screen,
- while displaying the content in the full screen, receiving a control signal corresponding to a first key from a control device comprising a plurality of keys, the control signal being for requesting a configuration menu,
- identifying whether the display device is playing a game content,
- based on the display device not playing the game content:
- displaying a first user interface comprising a plurality of menus required for setting an operation of the display device, in a partial area on the full screen, while maintaining displaying the content in the full screen, wherein the plurality of menus of the first user interface are for a configuration for overall functions provided by the display device, and
- controlling the first user interface using control signals received from the control device after displaying the first user interface, and
- based on the display device playing the game content:
- displaying a second user interface comprising a plurality of menus for setting a configuration required to play the game content, in the partial area on the full screen, while maintaining displaying the content in the full screen, and
- controlling the second user interface using control signals received from the control device after displaying the second user interface.

19. The non-transitory computer-readable recording medium of claim 18, wherein the control device is a game control device dedicated to perform control related to a game service.

20. The non-transitory computer-readable recording medium of claim 18, wherein the first key comprises a setting key.

21. The non-transitory computer-readable recording medium of claim 18, wherein the at least one instruction, when executed by the processor of the display device, causes the display device to:
- based on the content being identified as a broadcasting content, display the first user interface.

22. The non-transitory computer-readable recording medium of claim 18, wherein the first user interface comprises:
- an area to display the plurality of menus which are selectable by a user; and
- an area to display sub-menus corresponding to one of the plurality of menus, which is selected by the user,
- wherein the plurality of menus comprise a networking setting menu, and
- the sub-menus comprises sub-menus corresponding to the networking setting menu.

23. The non-transitory computer-readable recording medium of claim 18, wherein the second user interface comprises:
- an area to display the plurality of menus required for a configuration to play a game; and
- an area to display sub-menus corresponding to one of the plurality of menus, which is selected by a user.

* * * * *